US012058512B2

(12) United States Patent
Aoki et al.

(10) Patent No.: US 12,058,512 B2
(45) Date of Patent: Aug. 6, 2024

(54) INFORMATION PROCESSING APPARATUS, INFORMATION PROCESSING METHOD, AND PROGRAM

(71) Applicant: FUJIFILM CORPORATION, Tokyo (JP)

(72) Inventors: Takashi Aoki, Saitama (JP); Fuminori Irie, Saitama (JP); Kazunori Tamura, Saitama (JP); Masahiko Miyata, Saitama (JP); Yasunori Murakami, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 283 days.

(21) Appl. No.: 17/647,602

(22) Filed: Jan. 11, 2022

(65) Prior Publication Data

US 2022/0132261 A1    Apr. 28, 2022

Related U.S. Application Data

(63) Continuation of application No. PCT/JP2020/027696, filed on Jul. 16, 2020.

(30) Foreign Application Priority Data

Jul. 26, 2019 (JP) ................. 2019-138236

(51) Int. Cl.
*H04S 7/00* (2006.01)
*H04N 13/117* (2018.01)
(Continued)

(52) U.S. Cl.
CPC ............. *H04S 7/30* (2013.01); *H04N 13/117* (2018.05); *H04N 13/282* (2018.05);
(Continued)

(58) Field of Classification Search
CPC ....................................................... H04S 7/30
See application file for complete search history.

(56) References Cited

U.S. PATENT DOCUMENTS 11,057,720 B1\*  7/2021  Frieding ............. H04R 25/554
2016/0080684 A1\*  3/2016  Farrell .................... H04N 5/77
                                                                386/227
(Continued)

FOREIGN PATENT DOCUMENTS

JP    2017-229011 A   12/2017
JP    2018-19294 A     2/2018
(Continued)

OTHER PUBLICATIONS

English language translation of the following: Office action dated Dec. 20, 2022 from the JPO in a Japanese patent application No. 2021-536932 corresponding to the instant patent application.
(Continued)

*Primary Examiner* — Kyle M Lotfi
(74) *Attorney, Agent, or Firm* — SOLARIS Intellectual Property Group, PLLC

(57) ABSTRACT

An information processing apparatus acquires a plurality of pieces of sound information, sound collection device position information, and target subject position information. In addition, the information processing apparatus specifies a target sound of a region corresponding to a position of a target subject from the plurality of pieces of sound information based on the acquired sound collection device position information and the acquired target subject position information. Further, the information processing apparatus generates target subject emphasis sound information indicating a sound including a target subject emphasis sound in which the specified target sound is emphasized more than a sound emitted from a region different from the region corresponding to the position of the target subject indicated (Continued)

by the acquired target subject position information in a case in which a virtual viewpoint video is generated.

20 Claims, 36 Drawing Sheets

(51) Int. Cl.
*H04N 13/282* (2018.01)
*H04N 13/332* (2018.01)
*H04N 13/383* (2018.01)
*H04R 1/40* (2006.01)
*H04R 3/00* (2006.01)

(52) U.S. Cl.
CPC ......... *H04N 13/332* (2018.05); *H04N 13/383* (2018.05); *H04R 1/406* (2013.01); *H04R 3/005* (2013.01); *H04R 2201/401* (2013.01); *H04S 2400/15* (2013.01)

(56) References Cited

U.S. PATENT DOCUMENTS

| | | | |
|---|---|---|---|
| 2018/0035235 | A1 | 2/2018 | Funakoshi |
| 2019/0088017 | A1 | 3/2019 | Sato et al. |
| 2019/0250873 | A1* | 8/2019 | Blume ................. G16H 20/40 |
| 2020/0358415 | A1 | 11/2020 | Aoyama et al. |

FOREIGN PATENT DOCUMENTS

| | | |
|---|---|---|
| JP | 2018-106297 A | 7/2018 |
| JP | 2019-57059 A | 4/2019 |
| WO | 2019/093155 A1 | 5/2019 |

OTHER PUBLICATIONS

International Search Report issued in International Application No. PCT/JP2020/027696 on Oct. 13, 2020.
Written Opinion of the ISA issued in International Application No. PCT/JP2020/027696 on Oct. 13, 2020.

* cited by examiner

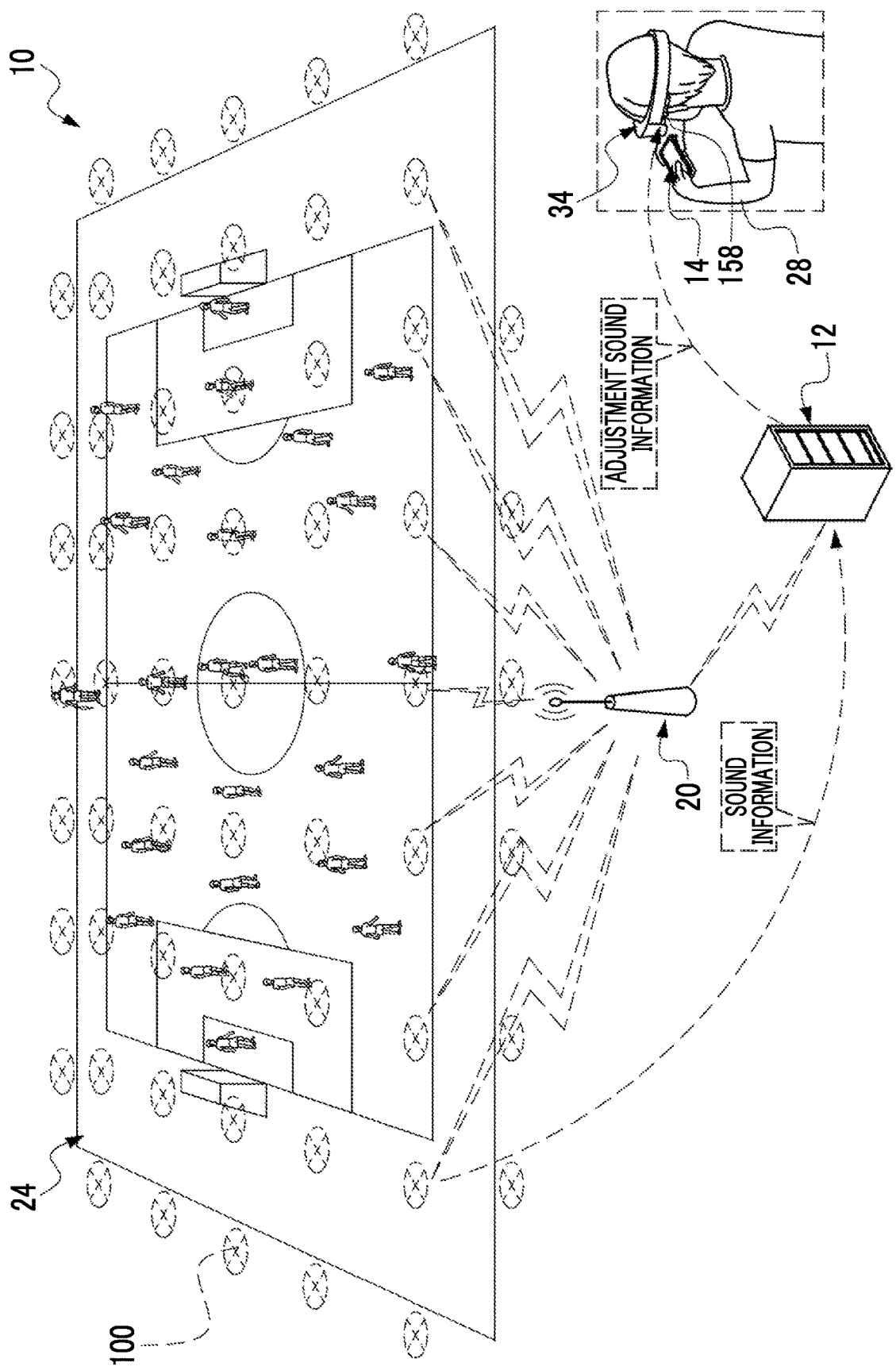

INFORMATION PROCESSING APPARATUS, INFORMATION PROCESSING METHOD, AND PROGRAM

CROSS-REFERENCE TO RELATED APPLICATIONS

This application is a continuation application of International Application No. PCT/JP2020/027696, filed Jul. 16, 2020, the disclosure of which is incorporated herein by reference in its entirety. Further, this application claims priority from Japanese Patent Application No. 2019-138236 filed Jul. 26, 2019, the disclosure of which is incorporated herein by reference in its entirety.

BACKGROUND

1. Technical Field

The technology of the present disclosure relates to an information processing apparatus, an information processing method, and a program.

2. Related Art

JP2018-019294A discloses an information processing system that processes an image and a sound corresponding to any viewpoint based on a plurality of image signals imaged by a plurality of imaging apparatuses and a plurality of sound collection signals collected in a plurality of sound collection points. The information processing system discloses in JP2018-019294A comprises an acquisition unit that acquires a viewpoint position and a visual line direction with respect to an imaging target, a decision unit that decides, depending on the viewpoint position and the visual line direction, a listening point which is a reference for generating a sound signal corresponding to the image depending on the viewpoint position and the visual line direction, the image being based on the plurality of image signals, and a sound generation unit that generates the sound signal depending on the listening point based on the plurality of sound collection signals. In addition, here, the decision unit further decides a listening range which is a spatial range which is a reference for selecting the sound collection point of the sound collection signal used for generating the sound signal, and the sound generation unit generates the sound signal depending on the listening point and the listening range based on the plurality of sound collection signals.

SUMMARY

One embodiment according to the technology of the present disclosure provides an information processing apparatus, an information processing method, and a program which can contribute to listening to a sound emitted from a region corresponding to a position of a target subject indicated by a generated virtual viewpoint video.

A first aspect according to the technology of the present disclosure relates to an information processing apparatus including an acquisition unit that acquires a plurality of pieces of sound information indicating sounds obtained by a plurality of sound collection devices, a sound collection device position information indicating a position of each of the plurality of sound collection devices, and a target subject position information indicating a position of a target subject in an imaging region, a specifying unit that specifies a target sound of a region corresponding to the position of the target subject from the plurality of pieces of sound information based on the sound collection device position information and the target subject position information which are acquired by the acquisition unit, and a generation unit that generates target subject emphasis sound information indicating a sound including a target subject emphasis sound in which the target sound specified by the specifying unit is emphasized more than a sound emitted from a region different from the region corresponding to the position of the target subject indicated by the target subject position information acquired by the acquisition unit based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information in a case in which a virtual viewpoint video is generated by using a plurality of images obtained by imaging the imaging region by a plurality of imaging apparatuses in a plurality of directions.

A second aspect according to the technology of the present disclosure relates to the information processing apparatus according to the first aspect, in which the generation unit selectively executes a first generation process of generating the target subject emphasis sound information, and a second generation process of generating integration sound information indicating an integration sound obtained by integrating a plurality of the sounds obtained by the plurality of sound collection devices based on the sound information acquired by the acquisition unit.

A third aspect according to the technology of the present disclosure relates to the information processing apparatus according to the second aspect, in which the generation unit executes the first generation process in a case in which the angle of view indicated by the angle-of-view information is less than a reference angle of view, and executes the second generation process in a case in which the angle of view indicated by the angle-of-view information is equal to or more than the reference angle of view.

A fourth aspect according to the technology of the present disclosure relates to the information processing apparatus according to any one of the first to third aspects, in which indication information for indicating a position of a target subject image showing the target subject in an imaging region image showing the imaging region is received by a reception unit in a state in which the imaging region image is displayed by a display device, and the acquisition unit acquires the target subject position information based on correspondence information indicating a correspondence between a position in the imaging region and a position in the imaging region image showing the imaging region, and the indication information received by the reception unit.

A fifth aspect according to the technology of the present disclosure relates to the information processing apparatus according to any one of the first to third aspects, in which an observation direction of a person who observes an imaging region image showing the imaging region is detected by a detection unit in a state in which the imaging region image is displayed by a display device, and the acquisition unit acquires the target subject position information based on correspondence information indicating a correspondence between a position in the imaging region and a position in the imaging region image showing the imaging region, and a detection result by the detection unit.

A sixth aspect according to the technology of the present disclosure relates to the information processing apparatus according to the fifth aspect, in which the detection unit includes an imaging element, and detects a visual line direction of the person as the observation direction based on an eye image obtained by imaging eyes of the person by the imaging element.

A seventh aspect according to the technology of the present disclosure relates to the information processing apparatus according to the fifth aspect, in which the display device is a head mounted display mounted on the person, and the detection unit is provided on the head mounted display.

An eighth aspect according to the technology of the present disclosure relates to the information processing apparatus according to the seventh aspect, in which a plurality of the head mounted displays are present, and the acquisition unit acquires the target subject position information based on the detection result by the detection unit provided on a specific head mounted display among the plurality of head mounted displays, and the correspondence information.

A ninth aspect according to the technology of the present disclosure relates to the information processing apparatus according to any one of the fifth to eighth aspects, in which the generation unit does not generate the target subject emphasis sound information in a case in which a frequency at which the observation direction changes per unit time is equal to or more than a predetermined frequency.

A tenth aspect according to the technology of the present disclosure relates to the information processing apparatus according to any one of the fifth to eighth aspects, further including an output unit that is able to output the target subject emphasis sound information generated by the generation unit, in which the output unit does not output the target subject emphasis sound information generated by the generation unit in a case in which a frequency at which the observation direction changes per unit time is equal to or more than a predetermined frequency.

An eleventh aspect according to the technology of the present disclosure relates to the information processing apparatus according to any one of the fifth to eighth aspects, in which the generation unit generates comprehensive sound information indicating a comprehensive sound obtained by integrating a plurality of the sounds obtained by the plurality of sound collection devices, and intermediate sound information indicating an intermediate sound in which the target sound is emphasized more than the comprehensive sound and suppressed more than the target subject emphasis sound, and the information processing apparatus further includes an output unit that outputs the comprehensive sound information, the intermediate sound information, and the target subject emphasis sound information, which are generated by the generation unit, in order of the comprehensive sound information, the intermediate sound information, and the target subject emphasis sound information in a case in which a frequency at which the observation direction changes per unit time is equal to or more than a predetermined frequency.

A twelfth aspect according to the technology of the present disclosure relates to the information processing apparatus according to any one of the first to eleventh aspects, in which the target subject emphasis sound information is information indicating a sound including the target subject emphasis sound and not including the sound emitted from the different position.

A thirteenth aspect according to the technology of the present disclosure relates to the information processing apparatus according to any one of the first to twelfth aspects, in which the specifying unit specifies a positional relationship between the position of the target subject and the plurality of sound collection devices by using the sound collection device position information and the target subject position information, which are acquired by the acquisition unit, and the sound indicated by each of the plurality of pieces of sound information is a sound adjusted to be smaller as the sound is positioned farther from the position of the target subject depending on the positional relationship specified by the specifying unit.

A fourteenth aspect according to the technology of the present disclosure relates to the information processing apparatus according to any one of the first to thirteenth aspects, in which a virtual viewpoint target subject image showing the target subject included in the virtual viewpoint video is an image that is in focus more than images in a periphery of the virtual viewpoint target subject image in the virtual viewpoint video.

A fifteenth aspect according to the technology of the present disclosure relates to the information processing apparatus according to any one of the first to fourteenth aspects, in which the sound collection device position information is information indicating the position of the sound collection device fixed in the imaging region.

A sixteenth aspect according to the technology of the present disclosure relates to the information processing apparatus according to any one of the first to fourteenth aspects, in which at least one of the plurality of sound collection devices is attached to the target subject.

A seventeenth aspect according to the technology of the present disclosure relates to the information processing apparatus according to any one of the first to fourteenth aspects, in which the plurality of sound collection devices are attached to a plurality of objects including the target subject in the imaging region.

An eighteenth aspect according to the technology of the present disclosure relates to an information processing method including acquiring a plurality of pieces of sound information indicating sounds obtained by a plurality of sound collection devices, a sound collection device position information indicating a position of each of the plurality of sound collection devices in an imaging region, and a target subject position information indicating a position of a target subject in the imaging region, specifying a target sound of a region corresponding to the position of the target subject from the plurality of pieces of sound information based on the acquired sound collection device position information and the acquired target subject position information, and generating target subject emphasis sound information indicating a sound including a target subject emphasis sound in which the specified target sound is emphasized more than a sound emitted from a region different from the region corresponding to the position of the target subject indicated by the acquired target subject position information based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information in a case in which a virtual viewpoint video is generated by using a plurality of images obtained by imaging the imaging region by a plurality of imaging apparatuses in a plurality of directions.

A nineteenth aspect according to the technology of the present disclosure relates to a program causing a computer to execute a process including acquiring a plurality of pieces of sound information indicating sounds obtained by a plurality of sound collection devices, a sound collection device position information indicating a position of each of the plurality of sound collection devices in an imaging region, and a target subject position information indicating a position of a target subject in the imaging region, specifying a target sound of a region corresponding to the position of the target subject from the plurality of pieces of sound information based on the acquired sound collection device position information and the acquired target subject position information, and generating target subject emphasis sound information indicating a sound including a target subject emphasis sound in which the specified target sound is emphasized more than a sound emitted from a region different from the region corresponding to the position of the target subject indicated by the acquired target subject position information based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information in a case in which a virtual viewpoint video is generated by using a plurality of images obtained by imaging the imaging region by a plurality of imaging apparatuses in a plurality of directions.

BRIEF DESCRIPTION OF THE DRAWINGS

Exemplary embodiments of the technology of the disclosure will be described in detail based on the following figures, wherein:

FIG. 4B is a conceptual diagram showing a first modification example of the disposition of the plurality of sound collection devices provided in the information processing system according to the embodiment;

DETAILED DESCRIPTION

An example of an embodiment according to the technology of the present disclosure will be described with reference to the accompanying drawings.

First, the terms used in the following description will be described.

CPU refers to an abbreviation of "central processing unit". RAM refers to an abbreviation of "random access memory". DRAM refers to an abbreviation of "dynamic random access memory". SRAM refers to an abbreviation of "static random access memory". ROM refers to an abbreviation of "read only memory". SSD refers to an abbreviation of "solid state drive". HDD refers to an abbreviation of "hard disk drive". EEPROM refers to an abbreviation of "electrically erasable and programmable read only memory". I/F refers to an abbreviation of "interface". IC refers to an abbreviation of "integrated circuit". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electro-luminescence". GPU refers to an abbreviation of "graphics processing unit". LAN refers to an abbreviation of "local area network". 3D refers to an abbreviation of "3 dimension". USB refers to an abbreviation of "universal serial bus". HMD refers to an abbreviation of "head mounted display". fps refers to an abbreviation of "frame per second". GPS refers to an abbreviation of "global positioning system". In addition, in the description of the present specification, "same" means the same in the sense of including an error generally allowed in the technical field to which the technology of the present disclosure belongs, in addition to the exact same.

Figure 1:
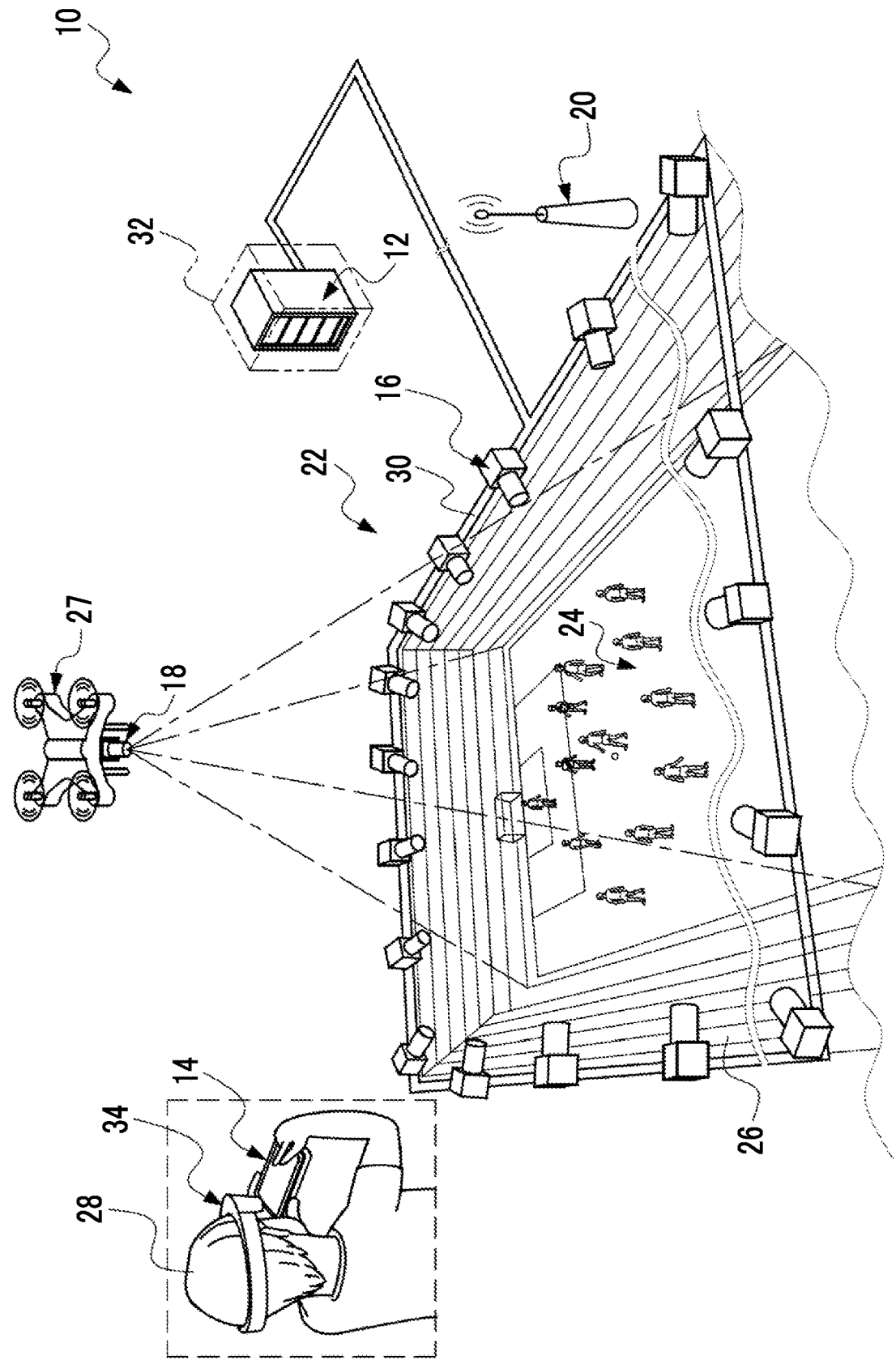
FIG. 1 is a schematic perspective diagram showing an example of an external configuration of an information processing system according to an embodiment.

For example, as shown in FIG. 1, an information processing system 10 comprises an information processing apparatus 12, a smartphone 14, a plurality of imaging apparatuses 16, an imaging apparatus 18, a wireless communication base station (hereinafter, simply referred to as "base station") 20, and an HMD 34. Note that the number of the base stations 20 is not limited to one, and a plurality of the base stations 20 may be present. Further, the communication standards used in the base station 20 include a wireless communication standard including a Long Term Evolution (LTE) standard and a wireless communication standard including a WiFi (802.11) standard and/or a Bluetooth (registered trademark) standard.

The imaging apparatuses 16 and 18 are devices for imaging having a CMOS image sensor, and each have an optical zoom function and/or a digital zoom function. Note that another type of image sensor, such as a CCD image sensor, may be adopted instead of the CMOS image sensor. Hereinafter, for convenience of description, in a case in which a distinction is not necessary, the imaging apparatus 18 and the plurality of imaging apparatuses 16, are referred to as "plurality of imaging apparatuses" without reference numeral.

The plurality of imaging apparatuses 16 are installed in a soccer stadium 22. Each of the plurality of imaging apparatuses 16 is disposed so as to surround a soccer field 24, and images a region including the soccer field 24 as an imaging region in a plurality of directions. Here, an aspect example is described in which each of the plurality of imaging apparatuses 16 is disposed so as to surround the soccer field 24. However, the technology of the present disclosure is not limited to this, and the disposition of the plurality of imaging apparatuses 16 is decided depending on a virtual viewpoint video to be generated. The plurality of imaging apparatuses 16 may be disposed so as to surround the whole soccer field 24, or the plurality of imaging apparatuses 16 may be disposed so as to surround a specific part thereof. The imaging apparatus 18 is installed in an unmanned aerial vehicle (for example, a multi rotorcraft type unmanned aerial vehicle), and images the region including the soccer field 24 as the imaging region in a bird's-eye view from the sky. The imaging region of the region including the soccer field 24 in a bird's-eye view from the sky refers to an imaging face on the soccer field 24 by the imaging apparatus 18.

The information processing apparatus 12 is installed in a control room 32. The plurality of imaging apparatuses 16 and the information processing apparatus 12 are connected to each other via a LAN cable 30, and the information processing apparatus 12 controls the plurality of imaging apparatuses 16 and acquires an image obtained by being imaged by each of the plurality of imaging apparatuses 16. Note that although the connection using a wired communication method by the LAN cable 30 is described as an example here, the technology of the present disclosure is not limited to this, and the connection using a wireless communication method may be used.

The base station 20 transmits and receives various pieces of information to and from the information processing apparatus 12, the smartphone 14, the HMD 34, and the unmanned aerial vehicle 27 via the wireless communication. That is, the information processing apparatus 12 is connected to the smartphone 14, the HMD 34, and the unmanned aerial vehicle 27 via the base station 20 in the wirelessly communicable manner. The information processing apparatus 12 controls the unmanned aerial vehicle 27 by wirelessly communicating with the unmanned aerial vehicle 27 via the base station 20, and acquires the image obtained by being imaged by the imaging apparatus 18 from the unmanned aerial vehicle 27.

The information processing apparatus 12 is a device corresponding to a server, and the smartphone 14 and the HMD 34 are devices corresponding to a client terminal with respect to the information processing apparatus 12. Note that, in the following, in a case in which a distinction is not necessary, the smartphone 14 and the HMD 34 are referred to as "terminal device" without reference numeral.

The information processing apparatus 12 and the terminal device wirelessly communicate with each other via the base station 20, so that the terminal device requests the information processing apparatus 12 to provide various services, and the information processing apparatus 12 provides the services to the terminal device in response to the request from the terminal device.

The information processing apparatus 12 acquires a plurality of the images from the plurality of imaging apparatuses, and transmits a video generated based on the acquired plurality of images to the terminal device via the base station 20.

In the example shown in FIG. 1, a viewer 28 owns the smartphone 14, and the HMD 34 is mounted on a head of the viewer 28. The video transmitted from the information processing apparatus 12 (hereinafter, also referred to as "distribution video") is received by the terminal device, and the distribution video received by the terminal device is visually recognized by the viewer 28 through the terminal device. In the soccer stadium 22, spectator seats 26 are provided so as to surround the soccer field 24. The viewer 28 may visually recognize the distribution video at the spectator seat 26, or may visually recognize the distribution video at a place (for example, at home) other than the spectator seat 26, and a place in which the viewer 28 visually recognizes the distribution video may be any place as long as the wireless communication with the information processing apparatus 12 is possible. Note that the viewer 28 is an example of a "person" according to the technology of the present disclosure.

Figure 2:
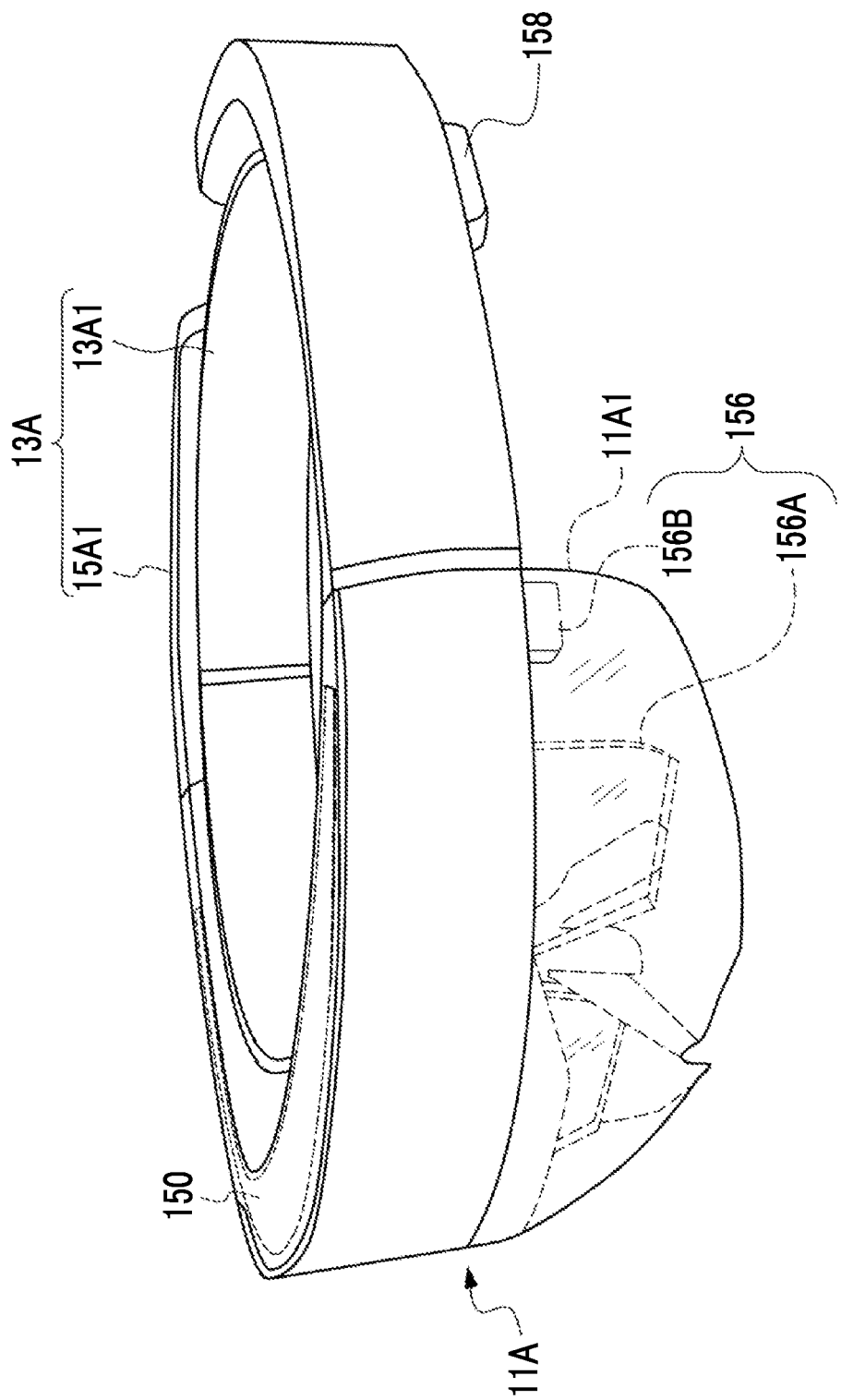
FIG. 2 is a schematic perspective diagram showing an example of an external configuration of a HMD provided in the information processing system according to the embodiment.

For example, as shown in FIG. 2, the HMD 34 comprises a body part 11A, a mounting part 13A, and a speaker 158. The HMD 34 is mounted on the viewer 28. In a case in which the HMD 34 is mounted on the viewer 28, the body part 11A is positioned from the forehead to front of the viewer 28, and the mounting part 13A is positioned in the upper half of the head of the viewer 28. The speaker 158 is attached to the mounting part 13A and is positioned on the left side head of the viewer 28.

The mounting part 13A is a band-shaped member having a width of about several centimeters, and comprises an inner ring 13A1 and an outer ring 15A1. The inner ring 13A1 is formed in an annular shape and is fixed in a state of being closely attached to the upper half of the head of the viewer 28. The outer ring 15A1 is formed in a shape in which an occipital side of the viewer 28 is cut out. The outer ring 15A1 bends outward from an initial position or shrinks inward from a bent state toward the initial position depending on adjustment of a size of the inner ring 13A1.

The body part 11A comprises a protective frame 11A1, a computer 150, and a display 156. The computer 150 controls the whole HMD 34. The protective frame 11A1 is one transparent plate curved so as to cover the whole both eyes of the viewer 28, and is made of, for example, plastic having light transmittance.

The display 156 comprises a screen 156A and a projection unit 156B, and the projection unit 156B is controlled by the computer 150. The screen 156A is disposed inside the protective frame 11A1. The screen 156A is assigned to each of both eyes of the viewer 28. The screen 156A is made of a transparent material similar to the protective frame 11A1. The viewer 28 visually recognizes a real space via the screen 156A and the protective frame 11A1 with the naked eye. That is, the HMD 34 is a transmission type HMD.

The screen 156A is positioned at a position facing the eyes of the viewer 28, and the distribution video is projected on an inner surface of the screen 156A (surface on the viewer 28 side) by the projection unit 156B under the control of the computer 150. Since the projection unit 156B is a well-known device, the detailed description thereof will be omitted. However, the projection unit 156B is a device including a display element, such as a liquid crystal, which displays the distribution video and projection optical system that projects the distribution video displayed on the display element toward the inner surface of the screen 156A. The screen 156A is realized by using a half mirror that reflects the distribution video projected by the projection unit 156B and transmits the light in the real space. The projection unit 156B projects the distribution video on the inner surface of the screen 156A at a predetermined frame rate (for example, 60 fps). The distribution video is reflected by the inner surface of the screen 156A and is incident on the eyes of the viewer 28. As a result, the viewer 28 visually recognizes the distribution video. Note that the half mirror has been described as an example of the screen 156A here, but the technology of the present disclosure is not limited to this, and the screen 156A itself may be used as the display element, such as the liquid crystal. In addition, in addition to the screen projection type HMD shown here, a retina projection HMD that directly irradiates the retina of the eyes of the viewer 28 with a laser may be adopted.

The speaker 158 is connected to the computer 150 and outputs the sound under the control of the computer 150. That is, under the control of the computer 150, the speaker 158 receives an electric signal indicating the sound, converts the received electric signal into the sound, and outputs the converted sound, so that audible display of various pieces of information is realized. Here, the speaker 158 is integrated with the computer 150, but the sound output by a separate headphone (including earphones) connected to the computer 150 by wire or wirelessly may be adopted.

Figure 3:
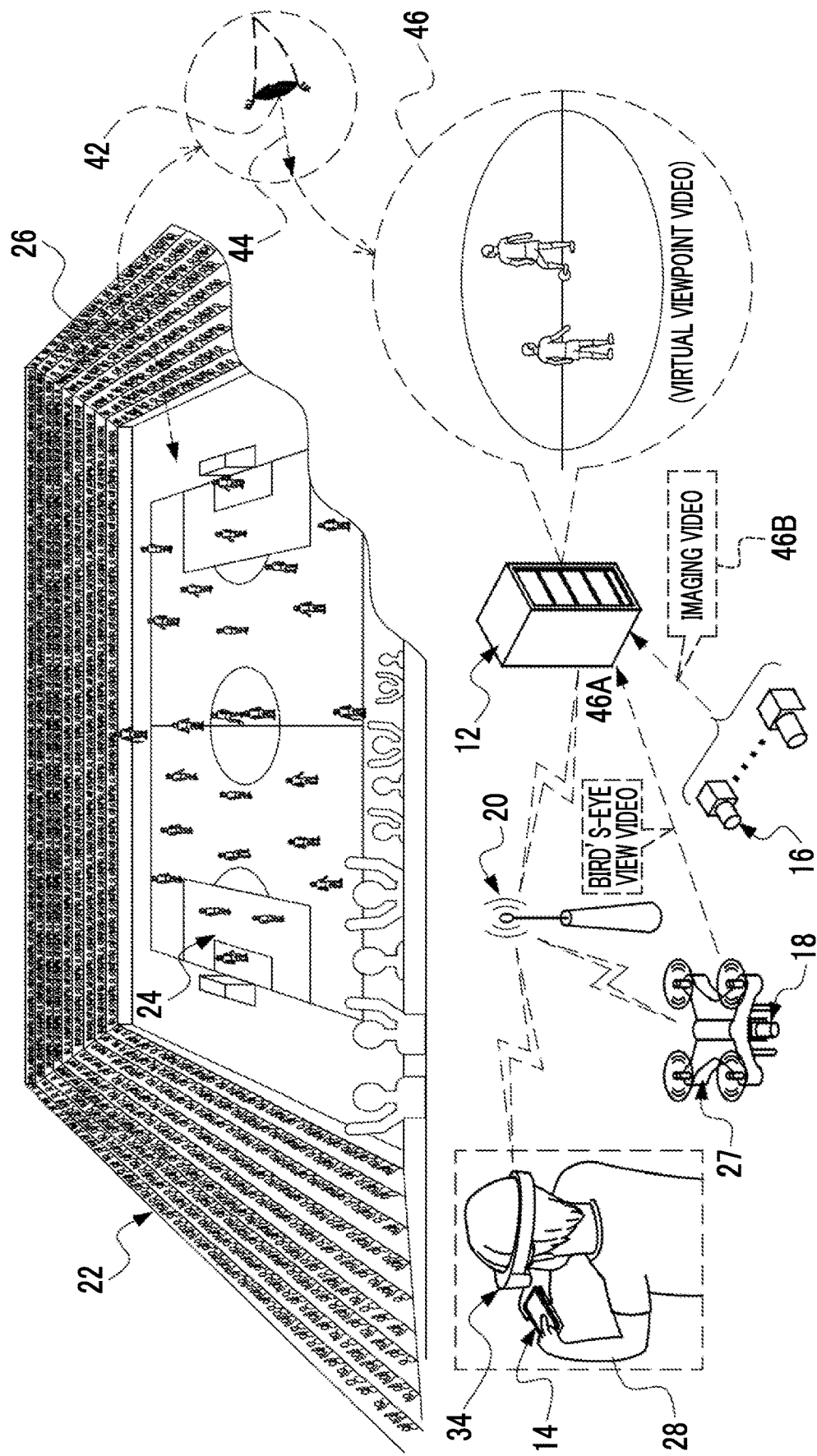
FIG. 3 is a conceptual diagram showing an example of a relationship between an information processing apparatus provided in the information processing system according to the embodiment and peripheral device thereof.

For example, as shown in FIG. 3, the information processing apparatus 12 acquires a bird's-eye view video 46A showing the region including the soccer field 24 in a case of being observed from the sky from the unmanned aerial vehicle 27. The bird's-eye view video 46A is a moving image obtained by imaging the region including the soccer field 24 as the imaging region (hereinafter, also simply referred to as "imaging region") in a bird's-eye view from the sky by the imaging apparatus 18 of the unmanned aerial vehicle 27. Note that, here, although a case in which the bird's-eye view video 46A is the moving image is described as an example, the bird's-eye view video 46A is not limited to this, and may be a still image showing the region including the soccer field 24 in a case of being observed from the sky.

The information processing apparatus 12 acquires an imaging video 46B showing the imaging region in a case of being observed from each position of the plurality of imaging apparatuses 16 from each of the plurality of imaging apparatuses 16. The imaging video 46B is a moving image obtained by imaging the imaging region by each of the plurality of imaging apparatuses 16 in the plurality of directions. Note that, here, although a case in which the imaging video 46B is the moving image is described as an example, the imaging video 46B is not limited to this, and may be a still image showing the imaging region in a case of being observed from each position of the plurality of imaging apparatuses 16.

The bird's-eye view video 46A and the imaging video 46B are videos obtained by imaging the images in the plurality of directions in which the regions including the soccer field 24 are different from each other, and are examples of "a plurality of images" according to the technology of the present disclosure.

The information processing apparatus 12 generates a virtual viewpoint video 46 by using the bird's-eye view video 46A and the imaging video 46B. The virtual viewpoint video 46 is video showing the imaging region in a case in which the imaging region is observed from a viewpoint position and a visual line direction different from a viewpoint position and a visual line direction of each of the plurality of imaging apparatuses. In the example shown in FIG. 3, the virtual viewpoint video 46 refers to the virtual viewpoint video showing the imaging region in a case in which the imaging region is observed from a viewpoint position 42 and a visual line direction 44 in a spectator seat 26. Examples of the virtual viewpoint video 46 include a moving image using 3D polygons.

The moving image is described as an example of the virtual viewpoint video 46 here, but the technology of the present disclosure is not limited to this, and a still image using the 3D polygons may be used. Here, an aspect example is described in which the bird's-eye view video 46A obtained by being imaged by the imaging apparatus 18 is also used for generating the virtual viewpoint video 46, but the technology of the present disclosure is not limited to this. For example, the bird's-eye view video 46A is not used for generating the virtual viewpoint video 46, and only a plurality of the imaging videos 46B obtained by being imaged by the plurality of imaging apparatuses 16 may be used for generating the virtual viewpoint video 46. That is, the virtual viewpoint video 46 may be generated only from the videos obtained by being imaged by the plurality of imaging apparatuses 16 without using the video obtained by the imaging apparatus 18 (for example, a multi rotorcraft type unmanned aerial vehicle). Note that in a case in which the video obtained from the imaging apparatus 18 (for example, a multi rotorcraft type unmanned aerial vehicle) is used, a more accurate virtual viewpoint video can be generated.

The information processing apparatus 12 selectively transmits the bird's-eye view video 46A, the imaging video 46B, and the virtual viewpoint video 46 as the distribution video to the terminal device.

Figure 4A:
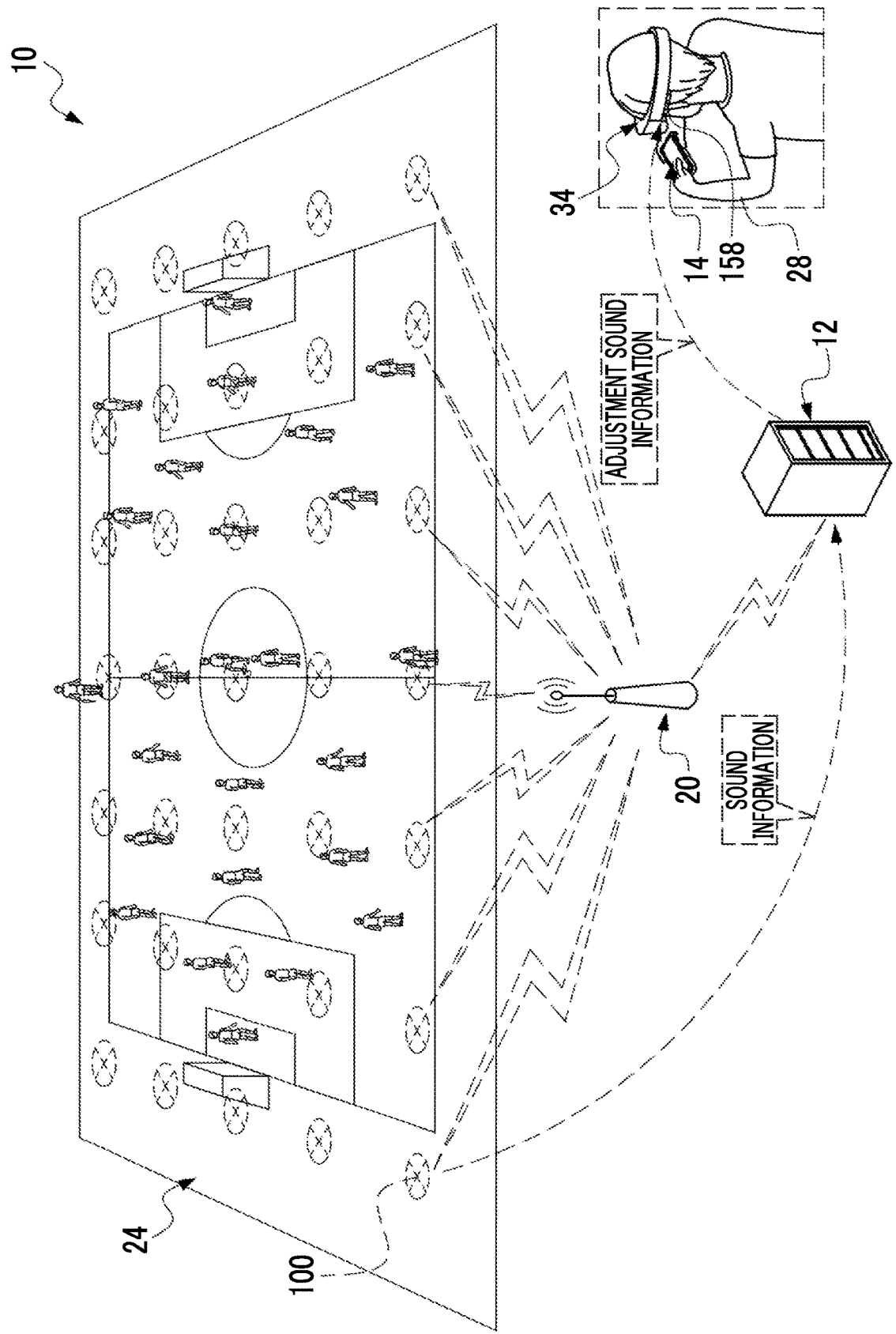
FIG. 4A is a conceptual diagram showing a disposition example of a plurality of sound collection devices provided in the information processing system according to the embodiment.

For example, as shown in FIG. 4A, the information processing system 10 comprises a plurality of sound collection devices 100. The sound collection device 100 performs the sound collection. Here, collecting the sound refers to capturing the sound, that is, the sound collection. In addition, the sound collection device 100 transmits sound information indicating the captured sound, that is, the collected sound. The plurality of sound collection devices 100 are present in the imaging region, and the installation positions of the plurality of sound collection devices 100 are fixed in the imaging region. In the present embodiment, "presence" refers to, for example, presence in a state of being spaced in a regular disposition. Note that the meaning of "presence" in the technology of the present disclosure also includes the meaning of presence in a state of being scattered irregularly or regularly.

Figure 4C:
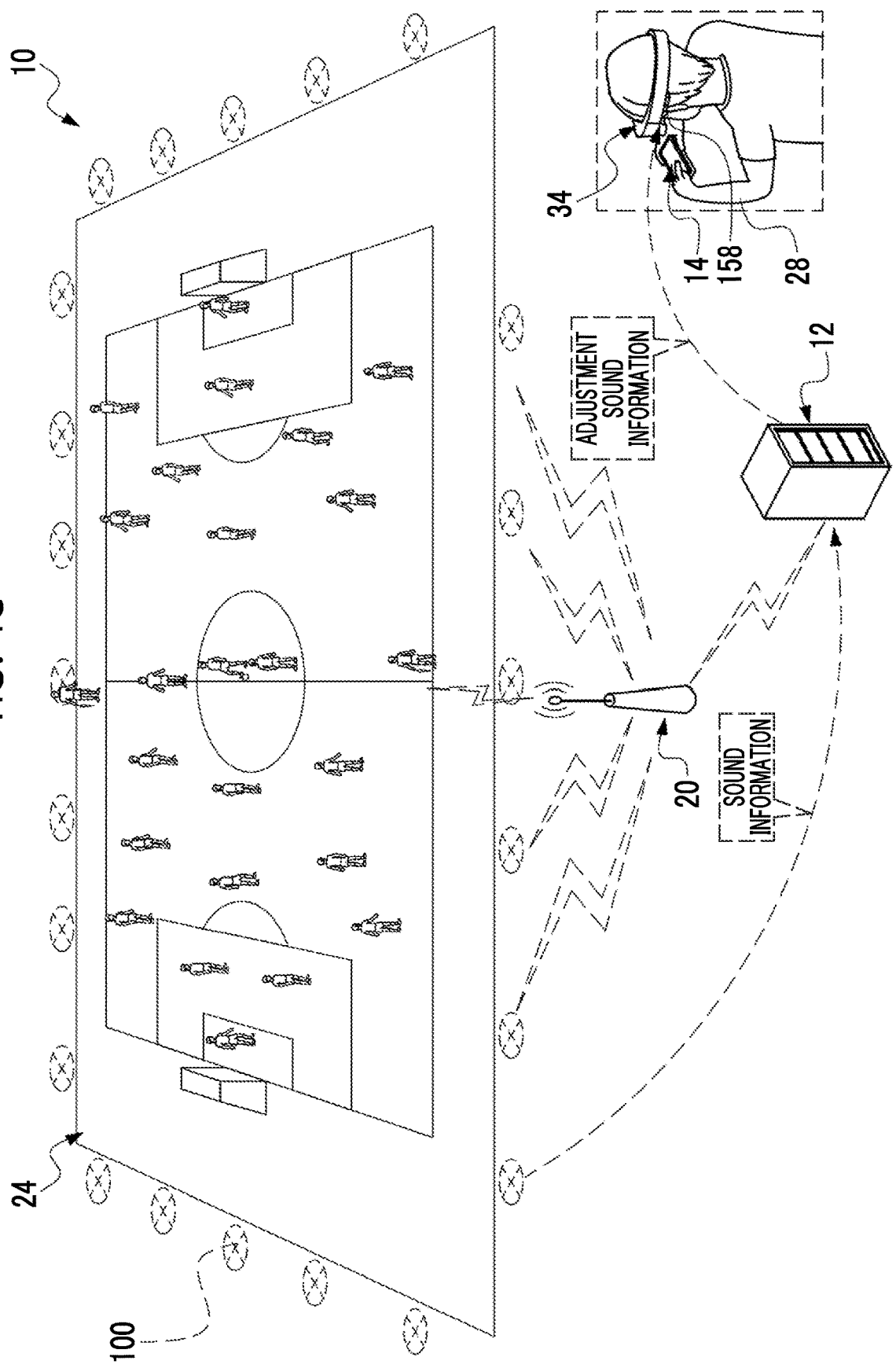
FIG. 4C is a conceptual diagram showing a second modification example of the disposition of the plurality of sound collection devices provided in the information processing system according to the embodiment.

In addition, in the example shown in FIG. 4A, the plurality of sound collection devices 100 are scattered in the imaging region, but the plurality of sound collection devices 100 do not necessarily have to be scattered in the imaging region. For example, the plurality of sound collection devices 100 may be aligned without gaps. In addition, the plurality of sound collection devices 100 do not necessarily have to be present in the imaging region. For example, as shown in FIGS. 4B and 4C, the plurality of sound collection devices 100 may be present outside the imaging region and perform the sound collection in the imaging region by a microphone having high directivity. In the example shown in FIG. 4B, the sound is collected by the plurality of sound collection devices 100 that are present in the imaging region and the plurality of sound collection devices 100 that are present outside the imaging region. In addition, in the example shown in FIG. 4C, the sound collection devices 100 are not present in the imaging region, and the plurality of sound collection devices 100 are present outside the imaging region, and the plurality of sound collection devices having directivity in the imaging region collect the sound in the imaging region.

In the example shown in FIG. 4A, the plurality of sound collection devices 100 are embedded in the soccer field 24 in a matrix. Specifically, the sound collection devices 100 are disposed at predetermined intervals (for example, at intervals of 5 meters) from one end to the other end of a side line and from one end to the other end of a goal line. In the example shown in FIG. 4A, 35 sound collection devices 100 are disposed in a matrix in the soccer field 24, but the number of the sound collection devices 100 is not limited to this, and need only be plural. In addition, the plurality of sound collection devices 100 do not need to be disposed in a matrix. For example, the plurality of sound collection devices 100 may be disposed concentrically, spirally, or the like, and need only be present in the soccer field 24.

The plurality of sound collection devices 100 are connected to the information processing apparatus 12 via the base station 20 in a wirelessly communicable manner. Each of the plurality of sound collection devices 100 exchanges various pieces of information with the information processing apparatus 12 by performing the wireless communication with the information processing apparatus 12 via the base station 20. For example, each of the plurality of sound collection devices 100 transmits the sound information to the information processing apparatus 12 in response to a request from the information processing apparatus 12. The information processing apparatus 12 generates adjustment sound information based on a plurality of pieces of the sound information transmitted from the plurality of sound collection devices 100. The adjustment sound information is information indicating an adjustment sound obtained by adjusting at least a partial sound of the plurality of sounds indicated by the plurality of pieces of sound information. The information processing apparatus 12 transmits the generated and obtained adjustment sound information to the HMD 34. The HMD 34 receives the adjustment sound information transmitted from the information processing apparatus 12 to output the adjustment sound indicated by the received adjustment sound information from the speaker 158.

Figure 5:
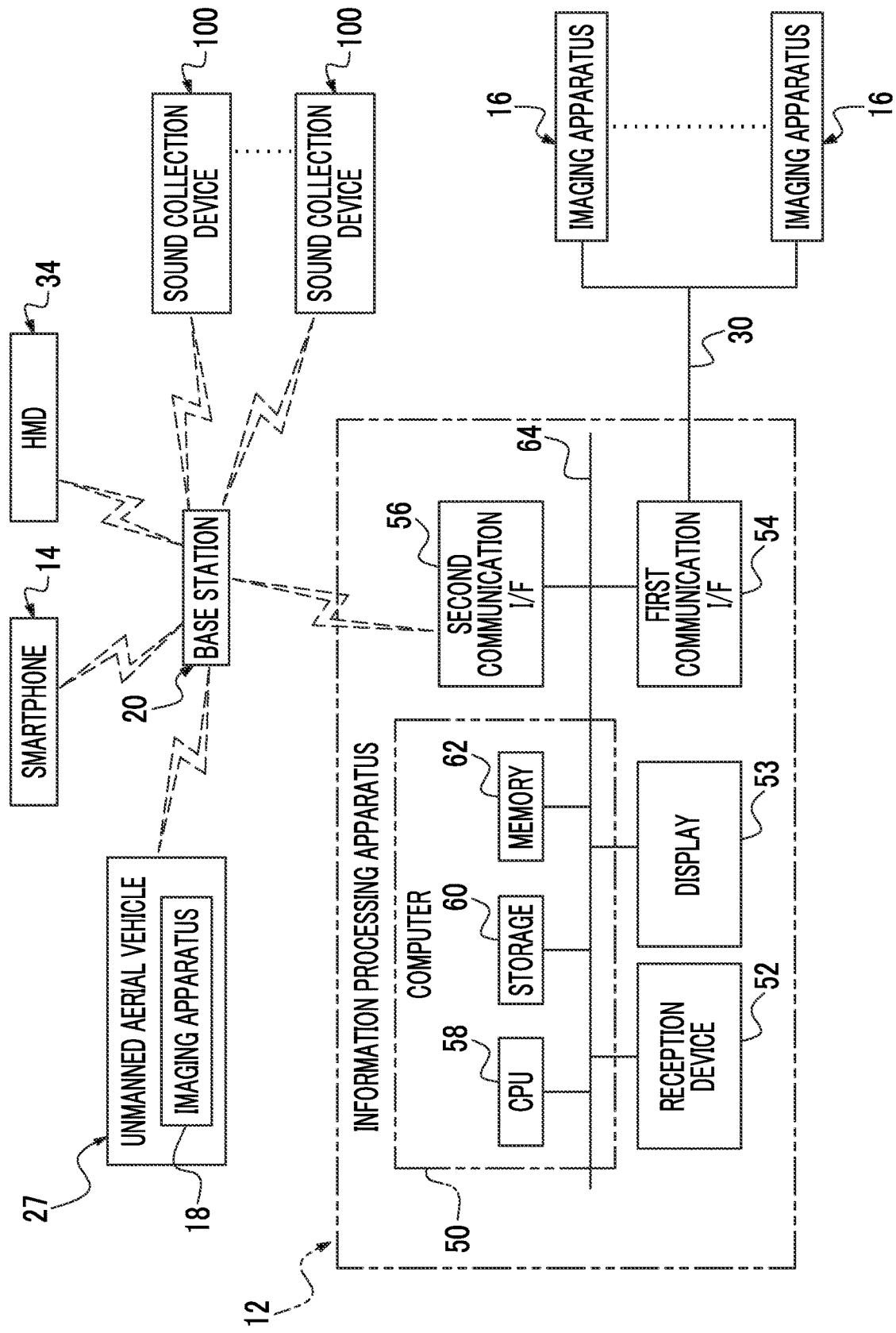
FIG. 5 is a block diagram showing an example of a hardware configuration of an electric system of the information processing apparatus according to the embodiment.

For example, as shown in FIG. 5, the information processing apparatus 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other via a bus line 64. In the example shown in FIG. 5, for convenience of illustration, one bus line is shown as the bus line 64, but a data bus, an address bus, a control bus, and the like are included in the bus line 64.

The CPU 58 controls the whole information processing apparatus 12. Various parameters and various programs are stored in the storage 60. The storage 60 is a non-volatile storage device. Here, a flash memory is adopted as an example of the storage 60, but the technology of the present disclosure is not limited to this, and an EEPROM, an HDD, an SSD, or the like may be used. The memory 62 is a volatile storage device. Various pieces of information are transitorily stored in the memory 62. The memory 62 is used as a work memory by the CPU 58. Here, an RAM is adopted as an example of the memory 62, but the technology of the present disclosure is not limited to this, and another type of volatile storage device may be used.

The reception device 52 receives the instruction from a user or the like of the information processing apparatus 12. Examples of the reception device 52 include a touch panel, a hard key, and a mouse. The reception device 52 is connected to the bus line 64, and the CPU 58 acquires the instruction received by the reception device 52. The display 53 is connected to the bus line 64 and displays various pieces of information under the control of the CPU 58. Examples of the display 53 include a liquid crystal display. Note that another type of display, such as an organic EL display or an inorganic EL display, may be adopted as the display 53 without being limited to the liquid crystal display.

The first communication I/F 54 is connected to the LAN cable 30. The first communication I/F 54 is realized by, for example, a device configured by circuits (for example, an ASIC, an FPGA, and/or a PLD). The first communication I/F 54 is connected to the bus line 64 and controls the exchange of various pieces of information between the CPU 58 and the plurality of imaging apparatuses 16. For example, the first communication I/F 54 controls the plurality of imaging apparatuses 16 in response to the request of the CPU 58. In addition, the first communication I/F 54 acquires the imaging video 46B (see FIG. 3) obtained by being imaged by each of the plurality of imaging apparatuses 16, and outputs the acquired imaging video 46B to the CPU 58.

The second communication I/F 56 is connected to the base station 20 in the wirelessly communicable manner. The second communication I/F 56 is realized by, for example, a device configured by circuits (for example, an ASIC, an FPGA, and/or a PLD). The second communication I/F 56 is connected to the bus line 64. The second communication I/F 56 controls the exchange of various pieces of information between the CPU 58 and the unmanned aerial vehicle 27 by the wireless communication method via the base station 20. In addition, the second communication I/F 56 controls the exchange of various pieces of information between the CPU 58 and the smartphone 14 by the wireless communication method via the base station 20. In addition, the second communication I/F 56 controls the exchange of various pieces of information between the CPU 58 and the HMD 34 by the wireless communication method via the base station 20. In addition, the second communication I/F 56 controls the exchange of various pieces of information between the CPU 58 and the plurality of sound collection devices 100 by the wireless communication method via the base station 20.

Figure 6:
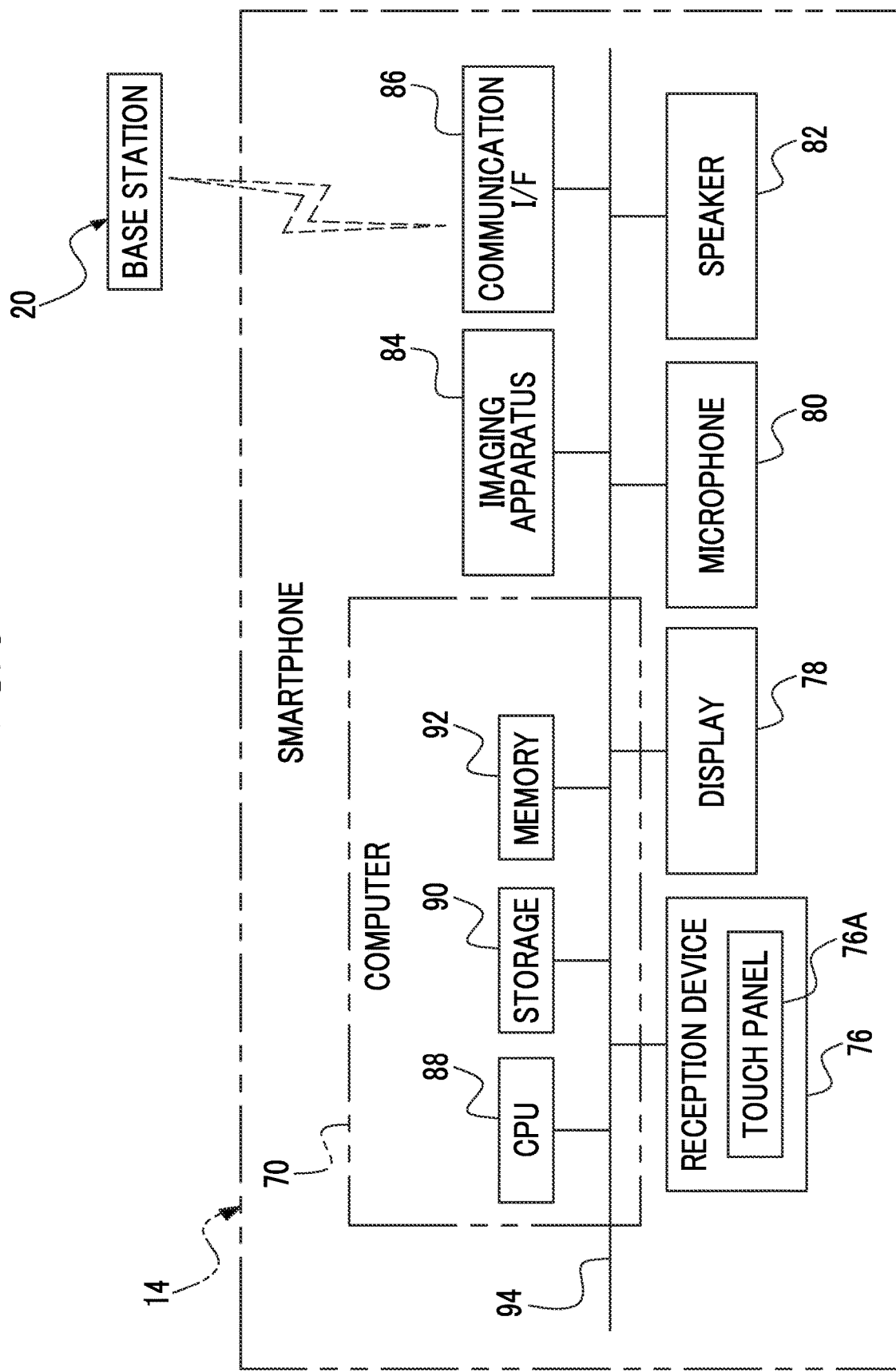
FIG. 6 is a block diagram showing an example of a hardware configuration of an electric system of a smartphone according to the embodiment.

For example, as shown in FIG. 6, the smartphone 14 comprises a computer 70, a reception device 76, a display 78, a microphone 80, a speaker 82, an imaging apparatus 84, and a communication I/F 86. The computer 70 comprises a CPU 88, a storage 90, and a memory 92, and the CPU 88, the storage 90, and the memory 92 are connected to each other via a bus line 94. In the example shown in FIG. 6, for convenience of illustration, one bus line is shown as the bus line 94. However, the bus line 94 is configured by a serial bus or is configured to include a data bus, an address bus, a control bus, and the like. In addition, in the example shown in FIG. 6, the CPU 88, the reception device 76, the display 78, the microphone 80, the speaker 82, the imaging apparatus 84, and the communication I/F 86 are connected by a common bus, but the CPU 88 and each device may be connected by a dedicated bus or a dedicated communication line.

The CPU 88 controls the whole smartphone 14. Various parameters and various programs are stored in the storage 90. The storage 90 is a non-volatile storage device. Here, an EEPROM is adopted as an example of the storage 90, but the technology of the present disclosure is not limited to this, and a mask ROM, an HDD, an SSD, or the like may be used. Various pieces of information are transitorily stored in the memory 92, and the memory 92 is used as a work memory by the CPU 88. Here, a DRAM is adopted as an example of the memory 92, but the technology of the present disclosure is not limited to this, and another type of the storage device, such as an SRAM, may be used.

The reception device 76 receives the instruction from the viewer 28. Examples of the reception device 76 include a touch panel 76A, and a hard key. The reception device 76 is connected to the bus line 94, and the CPU 88 acquires the instruction received by the reception device 76.

The display 78 is connected to the bus line 94 and displays various pieces of information under the control of the CPU 88. Examples of the display 78 include a liquid crystal display. Note that another type of display, such as an organic EL display, may be adopted as the display 78 without being limited to the liquid crystal display.

The smartphone 14 comprises a touch panel display, and the touch panel display is realized by the touch panel 76A and the display 78. That is, the touch panel display is formed by superimposing the touch panel 76A on a display region of the display 78. In addition, in the present embodiment, the touch panel 76A is provided independently, but the touch panel 28 may be a so-called in-cell type touch panel built in the display 78.

The microphone 80 performs the sound collection (collects sound) and converts the collected sound into the electric signal. The microphone 80 is connected to the bus line 94. The CPU 88 acquires the electric signal obtained by converting the sound collected by the microphone 80 via the bus line 94.

The speaker 82 converts the electric signal into the sound. The speaker 82 is connected to the bus line 94. The speaker 82 receives the electric signal output from the CPU 88 via the bus line 94, converts the received electric signal into the sound, and outputs the sound obtained by converting the electric signal to the outside of the smartphone 14. The imaging apparatus 84 acquires an image showing a subject by imaging the subject. The imaging apparatus 84 is connected to the bus line 94. The image obtained by imaging the subject by the imaging apparatus 84 is acquired by the CPU 88 via the bus line 94.

The communication I/F 86 is connected to the base station 20 in the wirelessly communicable manner. The communication I/F 86 is realized by, for example, a device configured by circuits (for example, an ASIC, an FPGA, and/or a PLD). The communication I/F 86 is connected to the bus line 94. The communication I/F 86 controls the exchange of various pieces of information between the CPU 88 and an external device by the wireless communication method via the base station 20. Here, examples of the "external device" include the information processing apparatus 12, the unmanned aerial vehicle 27, and the HMD 34.

Figure 7:
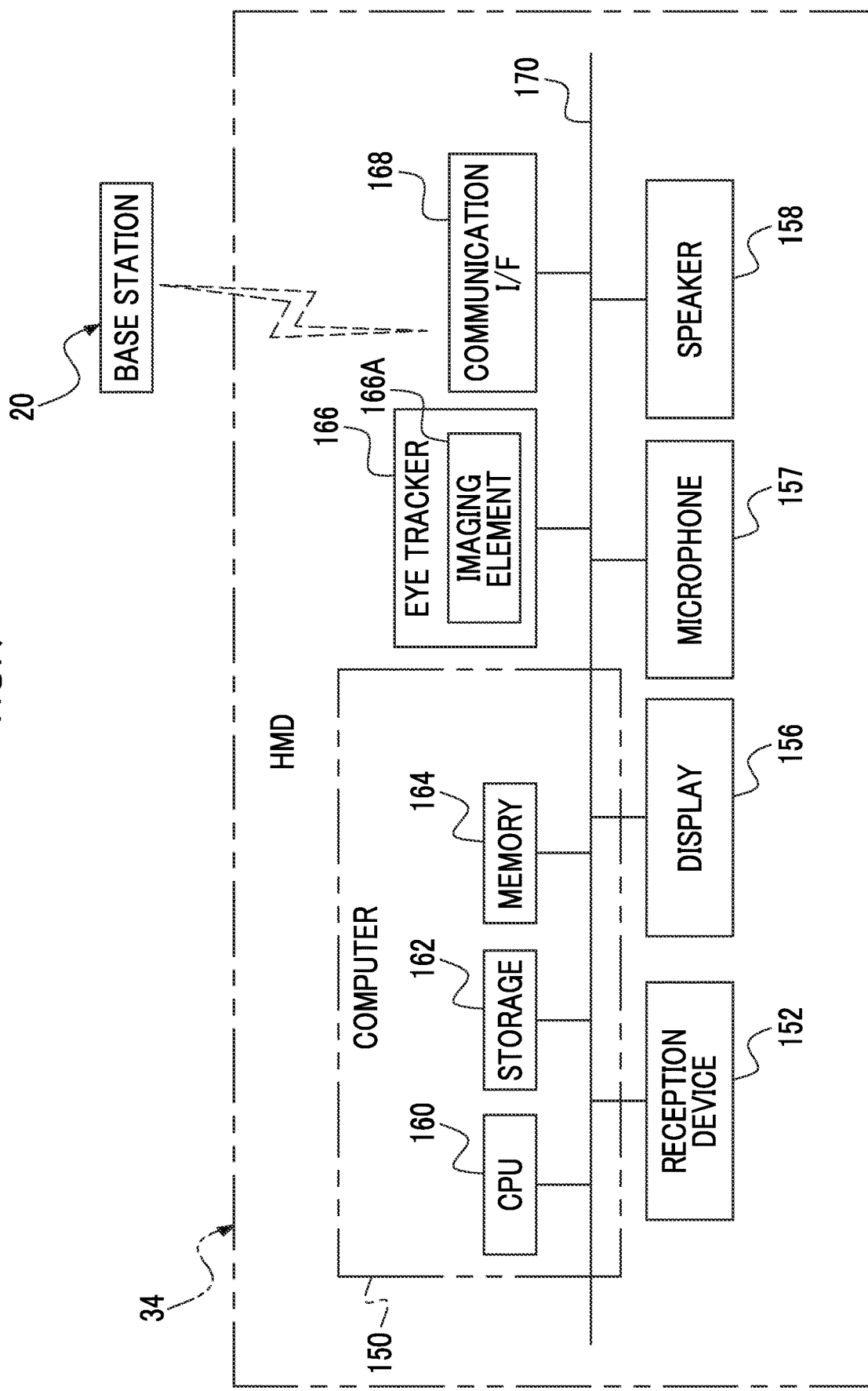
FIG. 7 is a block diagram showing an example of a hardware configuration of an electric system of the HMD according to the embodiment.

For example, as shown in FIG. 7, the HMD 34 is an example of a "display device" according to the technology of the present disclosure, and comprises the computer 150, a reception device 152, the display 156, a microphone 157, the speaker 158, an eye tracker 166, and a communication I/F 168.

The computer 150 comprises a CPU 160, a storage 162, and a memory 164, and the CPU 160, the storage 162, and the memory 164 are connected via a bus line 170. In the example shown in FIG. 7, for convenience of illustration, one bus line is shown as the bus line 170, but a data bus, an address bus, a control bus, and the like are included in the bus line 170.

The CPU 160 controls the whole HMD 34. Various parameters and various programs are stored in the storage 162. The storage 162 is a non-volatile storage device. Here, an EEPROM is adopted as an example of the storage 162, but the technology of the present disclosure is not limited to this, and a mask ROM, an HDD, an SSD, or the like may be used. The memory 164 is a volatile storage device. Various pieces of information are transitorily stored in the memory 164, and the memory 164 is used as a work memory by the CPU 160. Here, a DRAM is adopted as an example of the memory 164, but the technology of the present disclosure is not limited to this, and another type of volatile storage device, such as an SRAM, may be used.

The reception device 152 receives the instruction from the viewer 28. Examples of the reception device 152 include a remote controller and/or a hard key. The reception device 152 is connected to the bus line 170, and the CPU 160 acquires the instruction received by the reception device 152.

The display 156 is a display that can display the distribution video visually recognized by the viewer 28. The display 156 is connected to the bus line 170 and displays various pieces of information under the control of the CPU 160.

The microphone 157 performs the sound collection (collects sound) and converts the collected sound into the sound information which is the electric signal. The microphone 157 is connected to the bus line 170. The CPU 160 acquires the sound information obtained by converting the sound collected by the microphone 157 via the bus line 170.

The speaker 158 converts the electric signal into the sound. The speaker 158 is connected to the bus line 170. The speaker 158 receives the electric signal output from the CPU 160 via the bus line 170, converts the received electric signal into the sound, and outputs the sound obtained by converting the electric signal to the outside of the HMD 34.

The eye tracker 166 comprises an imaging element 166A. Here, a CMOS image sensor is adopted as the imaging element 166A. Note that the imaging element 166A is not limited to the CMOS image sensor, and another type of image sensor, such as a CCD image sensor, may be adopted. The eye tracker 166 uses the imaging element 166A to image both eyes of the viewer 28 depending on a predetermined frame rate (for example, 60 fps). The eye tracker detects the visual line direction of the viewer 28 (hereinafter, also simply referred to as the "visual line direction") based on an eye image (image showing the eyes of the viewer 28) obtained by imaging both eyes of the viewer 28.

That is, the eye tracker 166 detects the visual line direction based on the image obtained by imaging by the imaging element 166A as the observation direction (hereinafter, also simply referred to as the "observation direction") of the viewer 28 who observes the target subject image (hereinafter, also simply referred to as the "target subject image") showing the target subject in the distribution video in a state in which the distribution video (for example, the virtual viewpoint video 46) is displayed on the display 156. Note that the eye tracker 166 is an example of a "detection unit (detector)" according to the technology of the present disclosure.

The communication I/F 168 is connected to the base station 20 in a wirelessly communicable manner. The communication I/F 168 is realized by, for example, a device configured by circuits (for example, an ASIC, an FPGA, and/or a PLD). The communication I/F 168 is connected to the bus line 170. The communication I/F 168 controls the exchange of various pieces of information between the CPU 160 and an external device by the wireless communication method via the base station 20. Here, examples of the "external device" include the information processing apparatus 12, the unmanned aerial vehicle 27, and the smartphone 14.

Figure 8:
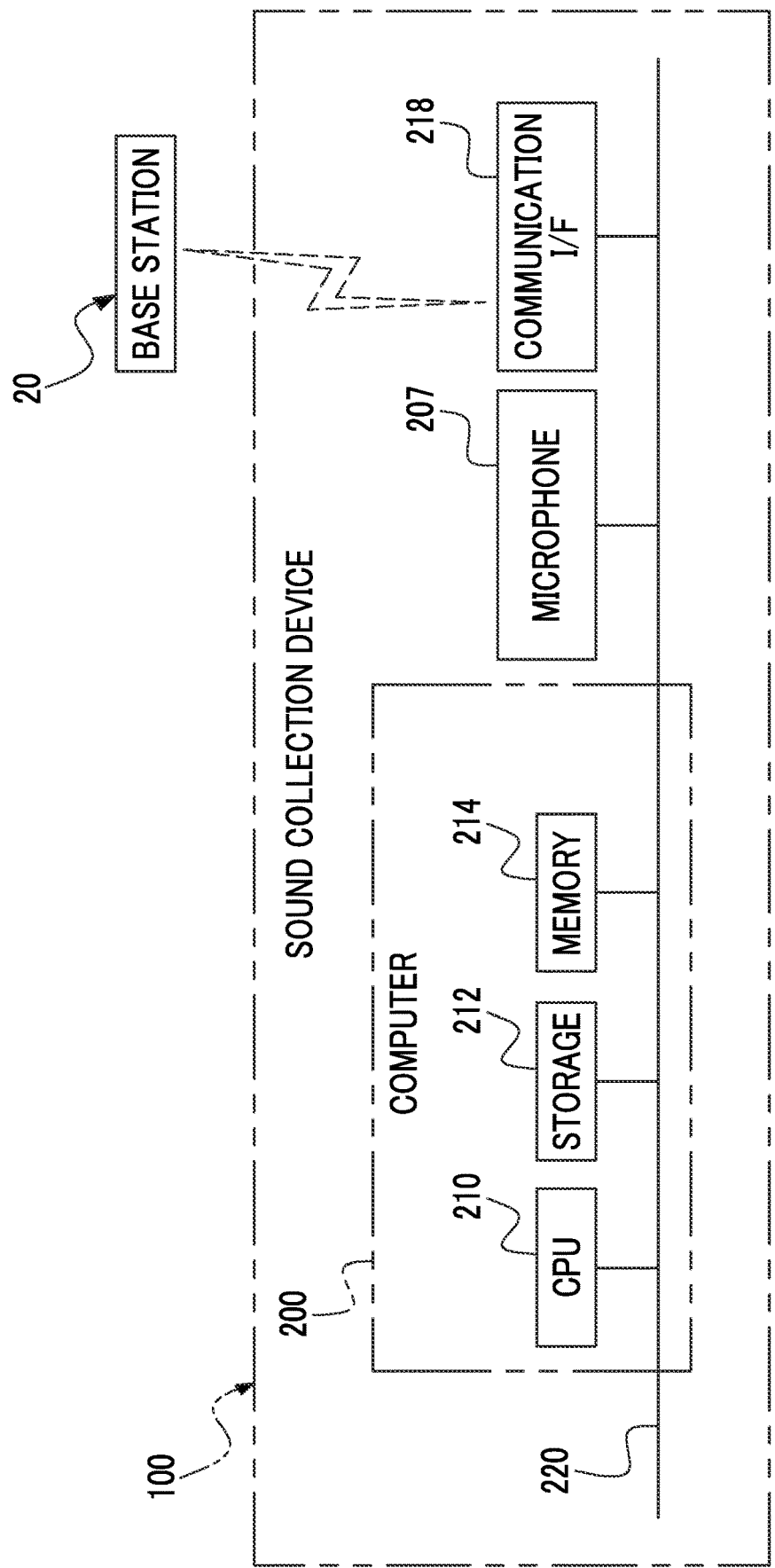
FIG. 8 is a block diagram showing an example of a hardware configuration of an electric system of the sound collection device according to the embodiment.

For example, as shown in FIG. 8, the sound collection device 100 comprises a computer 200, a microphone 207, and a communication I/F 218. The computer 200 comprises a CPU 210, a storage 212, and a memory 214, and the CPU 210, the storage 212, and the memory 214 are connected via a bus line 220. In the example shown in FIG. 8, for convenience of illustration, one bus line is shown as the bus line 220, but a data bus, an address bus, a control bus, and the like are included in the bus line 220.

The CPU 210 controls the whole sound collection device 100. Various parameters and various programs are stored in the storage 212. The storage 212 is a non-volatile storage device. Here, an EEPROM is adopted as an example of the storage 212, but the technology of the present disclosure is not limited to this, and a mask ROM, an HDD, an SSD, or the like may be used. The memory 214 is a volatile storage device. Various pieces of information are transitorily stored in the memory 214, and the memory 214 is used as a work memory by the CPU 210. Here, a DRAM is adopted as an example of the memory 214, but the technology of the present disclosure is not limited to this, and another type of volatile storage device, such as an SRAM, may be used.

The microphone 207 performs the sound collection (collects sound) and converts the collected sound into the electric signal. The microphone 207 is connected to the bus line 220. The CPU 210 acquires the electric signal obtained by converting the sound collected by the microphone 207 via the bus line 220.

The communication I/F 218 is connected to the base station 20 in the wirelessly communicable manner. The communication I/F 218 is realized by, for example, a device configured by circuits (an ASIC, an FPGA, and/or a PLD). The communication I/F 218 is connected to the bus line 220. The communication I/F 218 controls the exchange of various pieces of information between the CPU 210 and the information processing apparatus 12 by the wireless communication method via the base station 20.

Figure 9:
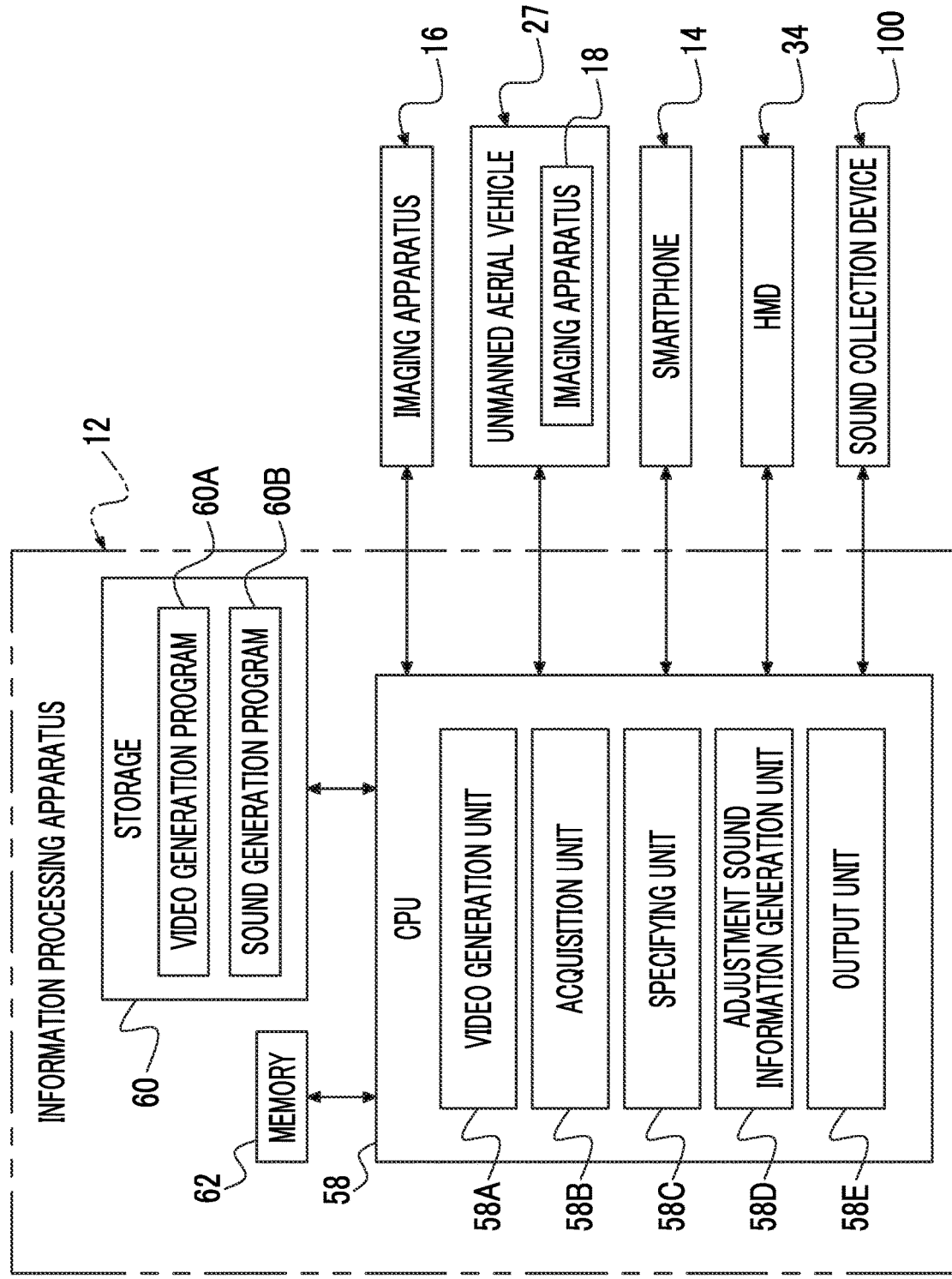
FIG. 9 is a block diagram showing an example of a main function of the information processing apparatus according to the embodiment.

For example, as shown in FIG. 9, in the information processing apparatus 12, the storage 60 stores a video generation program 60A and a sound generation program 60B. Note that, in the following, in a case in which a distinction is not necessary, the video generation program 60A and the sound generation program 60B are referred to as a "information processing apparatus program" without reference numeral.

The CPU 58 is an example of a "processor" according to the technology of the present disclosure, and the memory 62 is an example of a "memory" according to the technology of the present disclosure. The CPU 58 reads out the information processing apparatus program from the storage 60, and expands the readout information processing apparatus program in the memory 62. The CPU 58 controls the whole information processing apparatus 12 according to the information processing apparatus program expanded in the memory 62, and exchanges various pieces of information with the plurality of imaging apparatuses, the unmanned aerial vehicle 27, the terminal device, and the plurality of sound collection devices 100.

The CPU 58 reads out the video generation program 60A from the storage 60, and expands the readout video generation program 60A in the memory 62. The CPU 58 is operated as a video generation unit 58A and an acquisition unit 58B according to the video generation program 60A expanded in the memory 62. The CPU 58 is operated as the video generation unit 58A and the acquisition unit 58B to execute a video generation process (see FIG. 20), which will be described below.

The CPU 58 reads out the sound generation program 60B from the storage 60, and expands the readout sound generation program 60B in the memory 62. The CPU 58 is operated as the acquisition unit 58B, a specifying unit 58C, an adjustment sound information generation unit 58D, and an output unit 58E according to the sound generation program 60B expanded in the memory 62. The CPU 58 is operated as the acquisition unit 58B, the specifying unit 58C, the adjustment sound information generation unit 58D, and the output unit 58E to execute a sound generation process (see FIGS. 21 and 22) described below. Note that the adjustment sound information generation unit 58D is an example of a "generation unit" according to the technology of the present disclosure.

Figure 10:
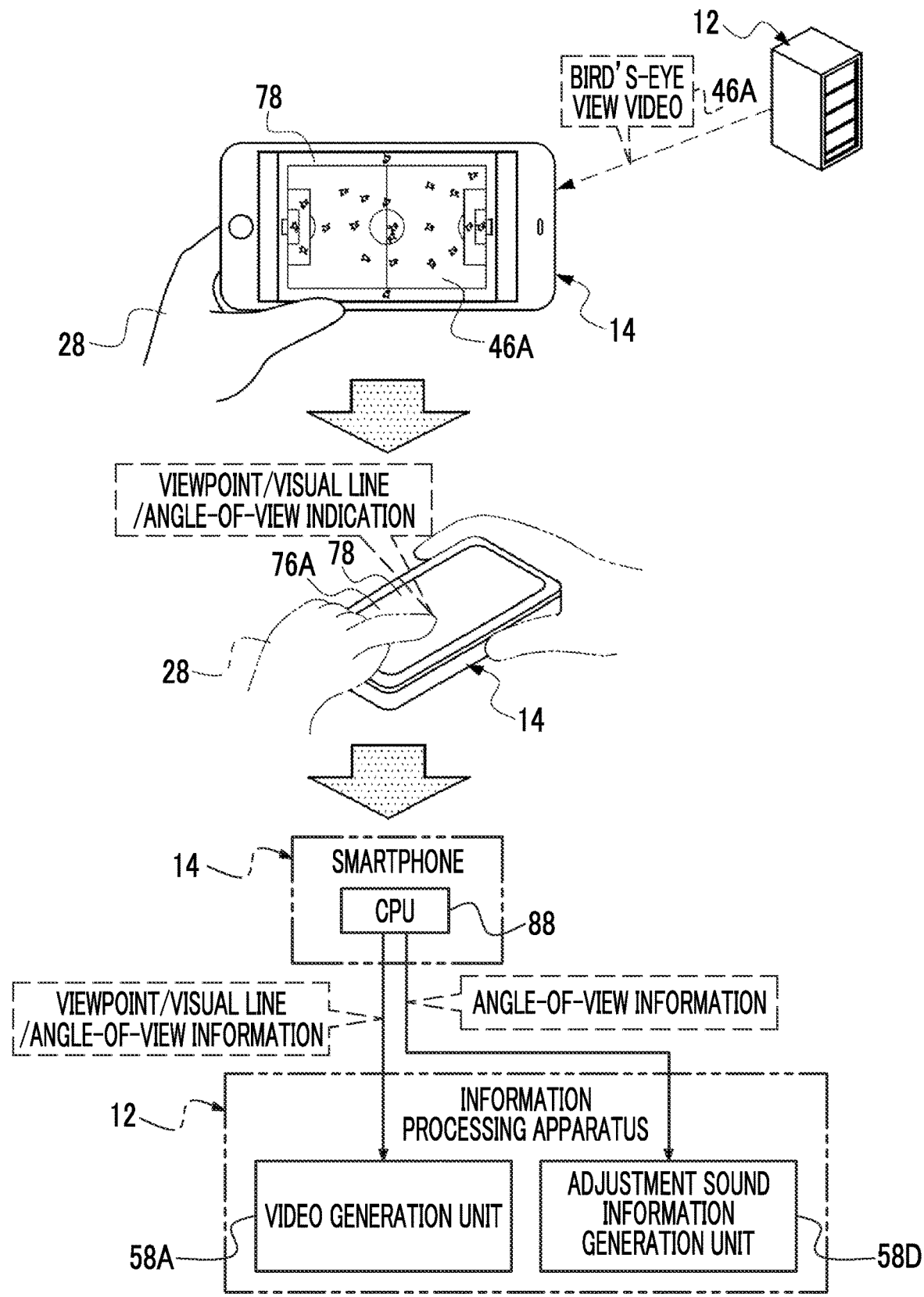
FIG. 10 is a conceptual diagram showing an example of an aspect in which a viewpoint/visual line/angle-of-view indication is given to the smartphone according to the embodiment.

For example, as shown in FIG. 10, the information processing apparatus 12 transmits the bird's-eye view video 46A to the smartphone 14. The smartphone 14 receives the bird's-eye view video 46A transmitted from the information processing apparatus 12. The bird's-eye view video 46A received by the smartphone 14 is displayed on the display 78 of the smartphone 14.

In a state in which the bird's-eye view video 46A is displayed on the display 78, the viewer 28 selectively gives a viewpoint indication, a visual line indication, and an angle-of-view indication to the smartphone 14. The viewpoint indication refers to an indication of a position of a virtual viewpoint with respect to the imaging region (hereinafter, referred to as the "virtual viewpoint"). The visual line indication refers to an indication of a direction of a virtual visual line with respect to the imaging region (hereinafter, referred to as the "virtual visual line"). The angle-of-view indication refers to an indication of an angle of view with respect to the imaging region (hereinafter, simply referred to as the "angle of view"). Hereinafter, for convenience of description, in a case in which a distinction is not necessary, the viewpoint indication, the visual line indication, and the angle-of-view indication are referred to as a "viewpoint/visual line/angle-of-view indication". The position of the virtual viewpoint is also referred to as a "virtual viewpoint position". In addition, the direction of the "virtual visual line" is also referred to as a "virtual visual line direction".

Examples of the viewpoint indication include a touch operation on the touch panel 76A. Instead of the touch operation, a tap operation or a double tap operation may be used. Examples of the visual line indication include a slide operation on the touch panel 76A. Instead of the slide operation, a flick operation may be used. Examples of the angle-of-view indication include a pinch operation on the touch panel 76A. The pinch operation is roughly classified into a pinch-in operation and a pinch-out operation. The pinch-in operation is an operation performed in a case in which the angle of view is widened, and the pinch-out operation is an operation performed in a case in which the angle of view is narrowed.

Viewpoint information indicating the virtual viewpoint position as indicated by the viewpoint indication, visual line direction information indicating the virtual visual line direction as indicated by the visual line indication, and angle-of-view information indicating the angle of view as indicated by the angle-of-view indication are transmitted to the information processing apparatus 12 by the CPU 88 of the smartphone 14. Note that in the following, for convenience of description, in a case in which a distinction is not necessary, the viewpoint information, the visual line direction information, and the angle-of-view information are referred to as a "viewpoint/visual line/angle-of-view information".

The viewpoint/visual line/angle-of-view information transmitted by the CPU 88 of the smartphone 14 is received by the video generation unit 58A, and the angle-of-view information transmitted by the CPU 88 of the smartphone 14 is received by the adjustment sound information generation unit 58D.

Figure 11:
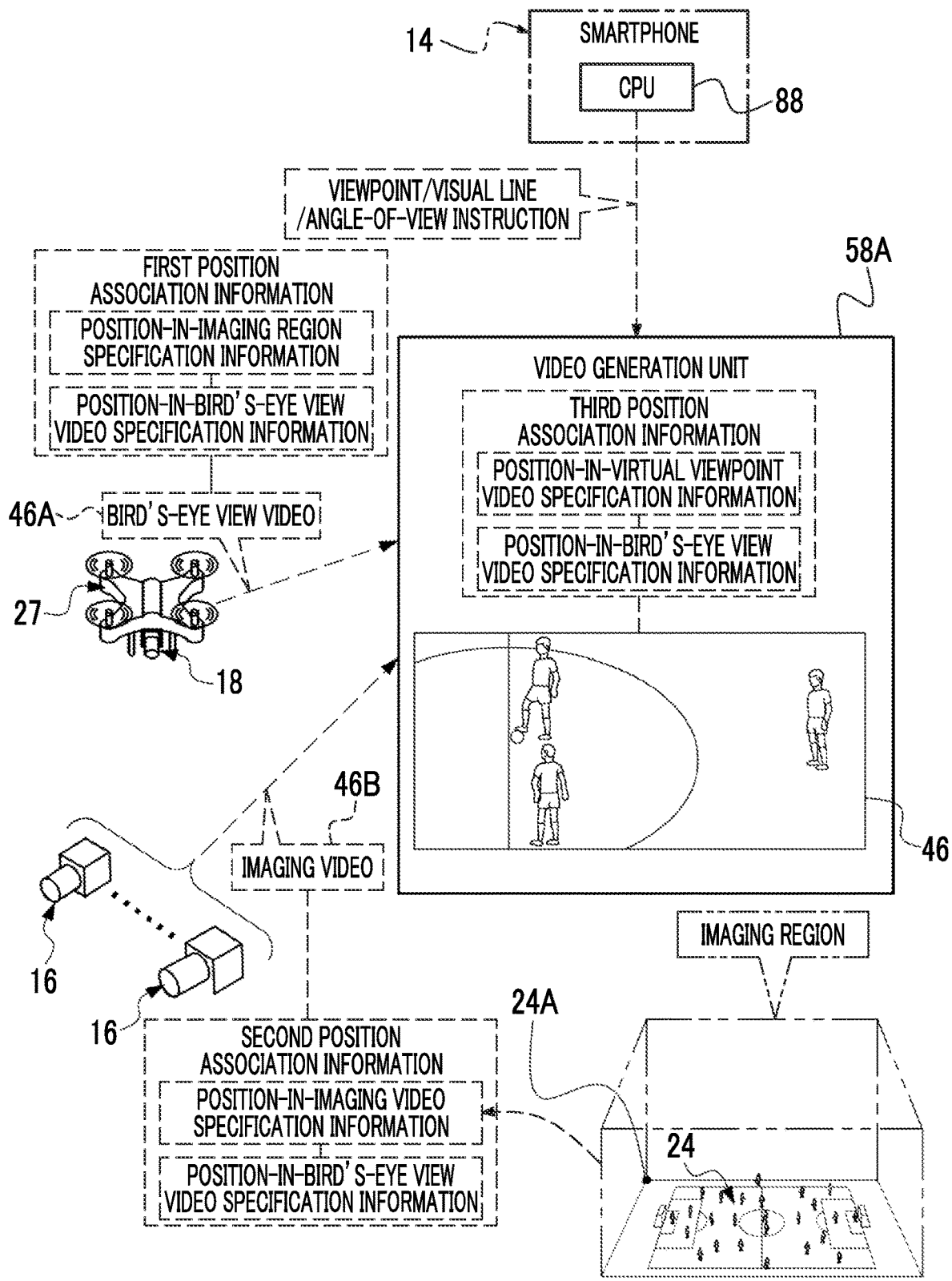
FIG. 11 is a conceptual diagram provided for describing an example of a process content of a video generation unit of the information processing apparatus according to the embodiment.

For example, as shown in FIG. 11, the video generation unit 58A acquires the bird's-eye view video 46A from the unmanned aerial vehicle 27, and acquires the imaging video 46B from each of the plurality of imaging apparatuses 16. The bird's-eye view video 46A is provided with first position association information, and the imaging video 46B is provided with second position association information.

The first position association information is information indicating a correspondence between a position in the imaging region and a position in the bird's-eye view video 46A (for example, a position of a pixel). In the first position association information, position-in-imaging region specification information (for example, a three-dimensional coordinate) for specifying the position in the imaging region and position-in-bird's-eye view video specification information for specifying the position in the bird's-eye view video 46A are associated with each other. Note that, for example, as shown in FIG. 11, the imaging region is a rectangular parallelepiped three-dimensional region with the soccer field 24 as the bottom plane, and the position-in-imaging region specification information is expressed by the three-dimensional coordinate with one of four corners of the soccer field 24 as an origin 24A.

The second position association information is information indicating a correspondence between the position in the imaging region and the position in the imaging video 46B (for example, the position of the pixel). In the second position association information, the position-in-imaging region specification information (for example, the three-dimensional coordinate) for specifying the position in the imaging region and position-in-imaging video specification information for specifying the position in the imaging video 46B are associated with each other.

The video generation unit 58A generates the virtual viewpoint video 46 by using the bird's-eye view video 46A acquired from the unmanned aerial vehicle 27 and the imaging video 46B acquired from each of the plurality of imaging apparatuses 16 based on the viewpoint/visual line/angle-of-view information. The virtual viewpoint video 46 is provided with third position association information. The third position association information is information indicating a correspondence between the position in the imaging region and the position in the virtual viewpoint video 46 (for example, the position of the pixel), and is an example of "correspondence information" according to the technology of the present disclosure. The third position association information is generated by the video generation unit 58A based on the first position association information and the second position association information.

Figure 12:
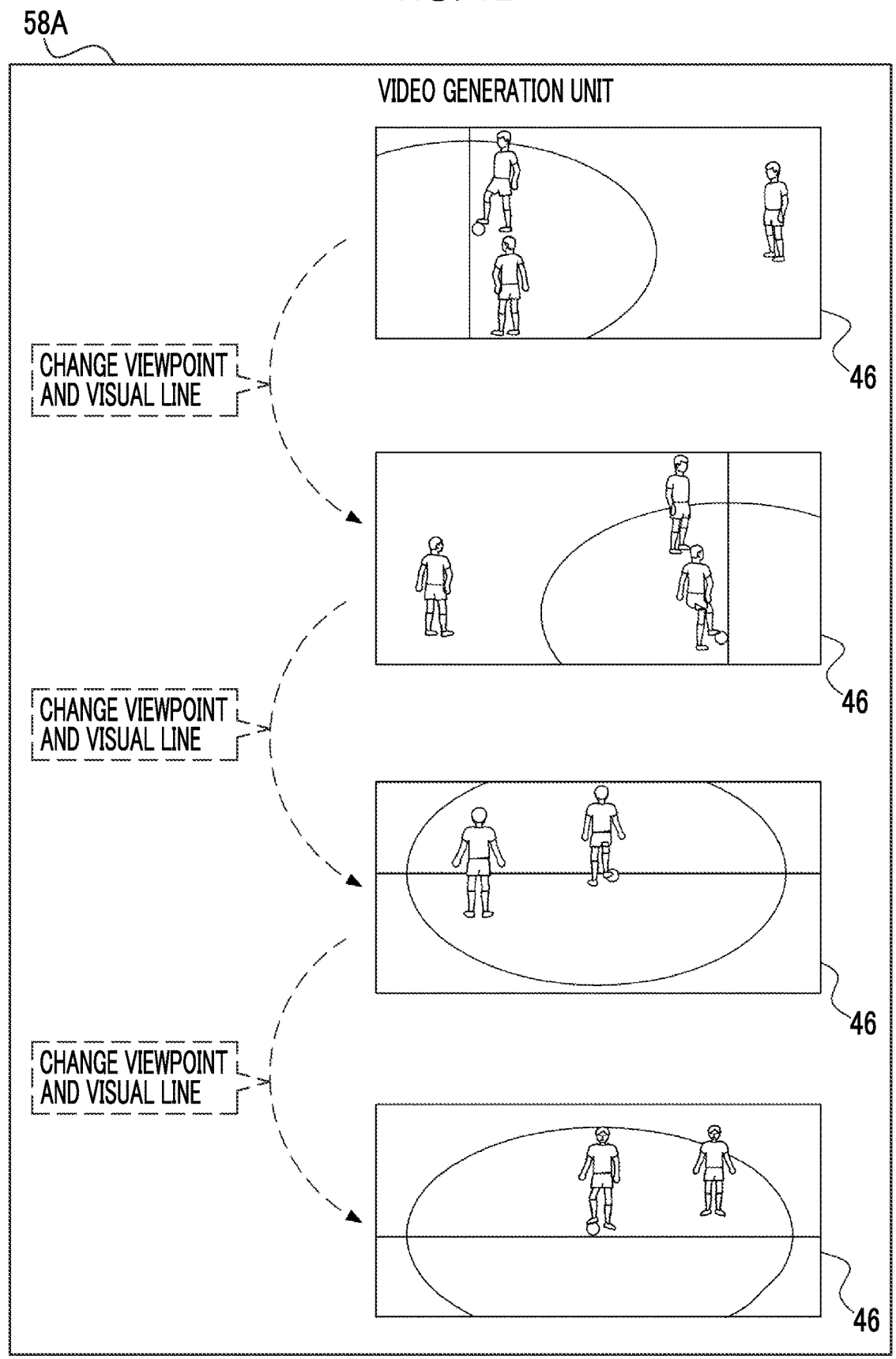
FIG. 12 is a state transition diagram showing an example of an aspect in a case in which a viewpoint position and a visual line direction of a virtual viewpoint video generated by the video generation unit of the information processing apparatus according to the embodiment are changed.

Note that, here, since the virtual viewpoint video 46 is generated, the third position association information is an example of the "correspondence information" according to the technology of the present disclosure. However, in a case in which the virtual viewpoint video 46 is not generated by the video generation unit 58A and the bird's-eye view video 46A is used as it is instead of the virtual viewpoint video 46, the first position association information is an example of the "correspondence information" according to the technology of the present disclosure. In addition, in a case in which the virtual viewpoint video 46 is not generated by the video generation unit 58A and the imaging video 46B is used as it is instead of the virtual viewpoint video 46, the second position association information is an example of the "correspondence information" according to the technology of the present disclosure. For example, as shown in FIG. 12, in a case in which the viewpoint information and the visual line direction information are changed, the video generation unit 58A regenerates the virtual viewpoint video 46 with the changes in the viewpoint information and the visual line direction information. In a case in which the virtual viewpoint video 46 is regenerated by the video generation unit 58A according to the viewpoint information and the visual line direction information, the third position association information is also regenerated by the video generation unit 58A based on the first position association information and the second position association information. Moreover, the regenerated third position association information is provided to the latest virtual viewpoint video 46 by the video generation unit 58A.

Figure 13:
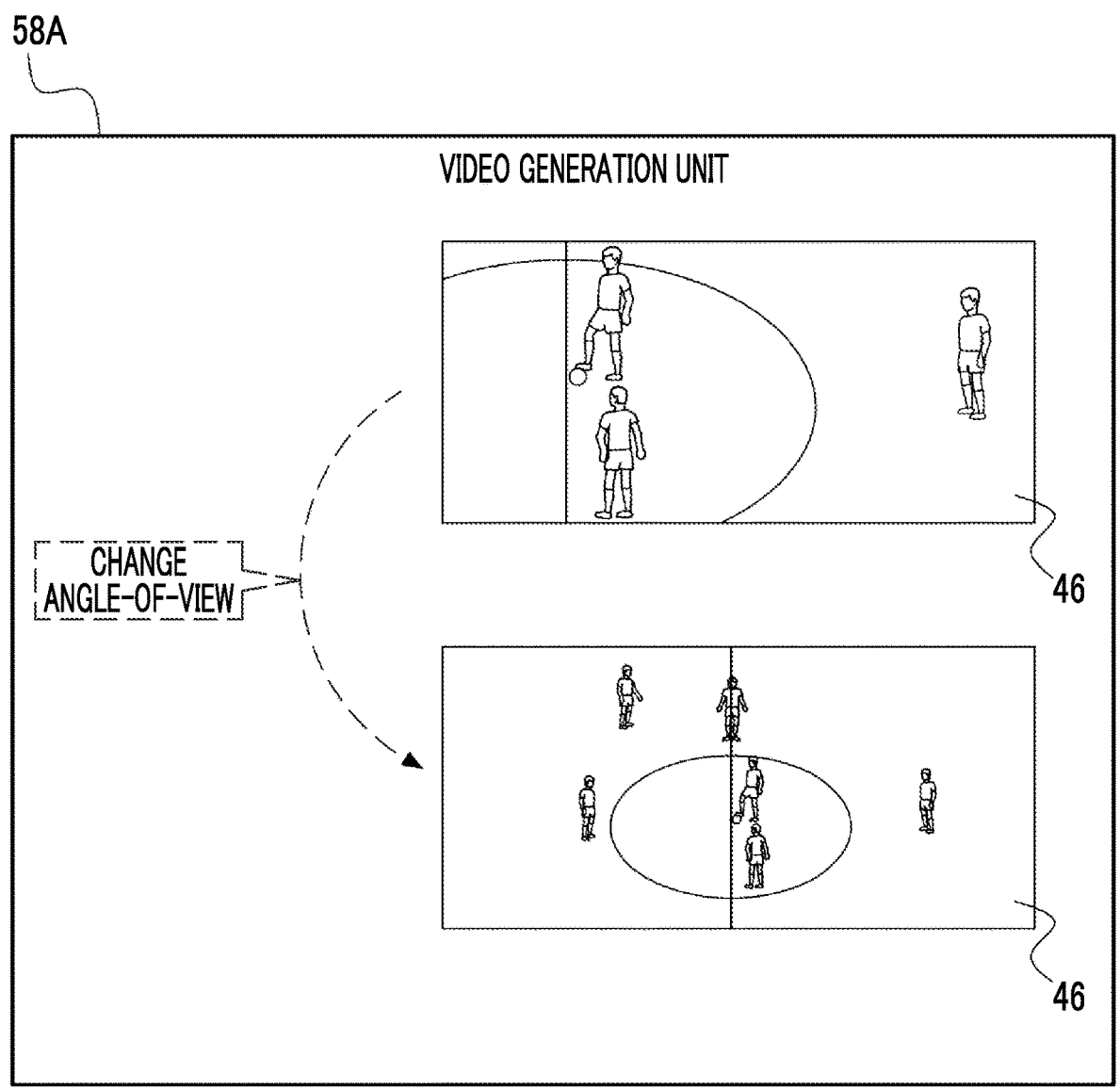
FIG. 13 is a state transition diagram showing an example of an aspect in which an angle of view of the virtual viewpoint video generated by the video generation unit of the information processing apparatus according to the embodiment is changed.

For example, as shown in FIG. 13, in a case in which the angle-of-view information is changed, the video generation unit 58A regenerates the virtual viewpoint video 46 with the change in the angle-of-view information. In a case in which the virtual viewpoint video 46 is regenerated by the video generation unit 58A according to the angle-of-view information, the third position association information is also regenerated by the video generation unit 58A based on the first position association information and the second position association information. Moreover, the regenerated third position association information is provided to the latest virtual viewpoint video 46 by the video generation unit 58A.

Figure 14:
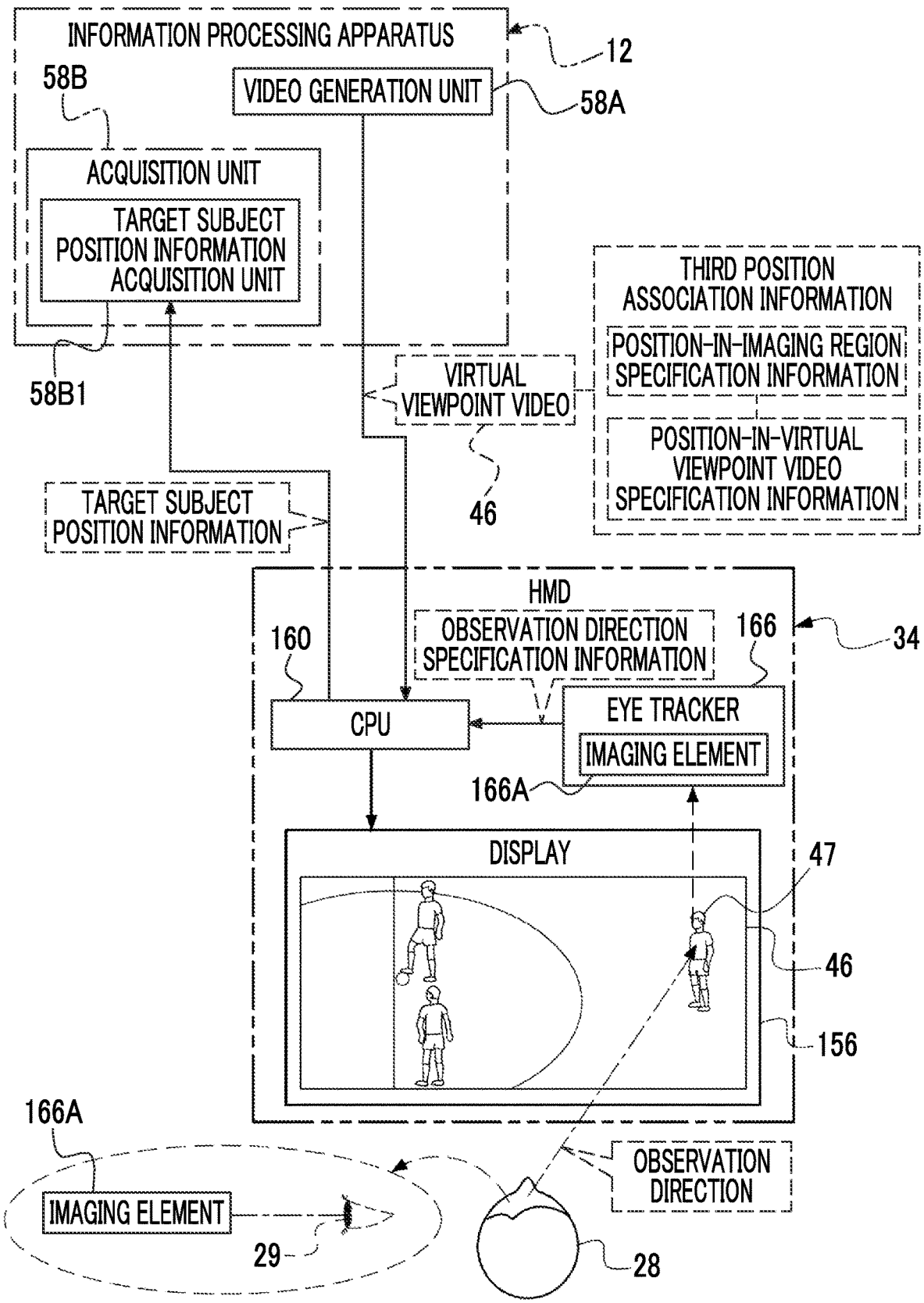
FIG. 14 is a conceptual diagram provided for describing examples of process contents in the information processing apparatus and the HMD according to the embodiment.

For example, as shown in FIG. 14, the video generation unit 58A transmits the virtual viewpoint video 46 and the third position association information to the HMD 34. In the HMD 34, the CPU 160 receives the virtual viewpoint video 46 and the third position association information transmitted from the video generation unit 58A, and displays the received virtual viewpoint video 46 on the display 156.

Here, the imaging element 166A images eyes 29 of the viewer 28 in a state in which the virtual viewpoint video 46 is displayed on the display 156. The eye tracker 166 detects the observation direction based on the eye image obtained by imaging the eyes 29 by the imaging element 166A, and outputs observation direction specification information for specifying the detected observation direction to the CPU 160.

The CPU 160 specifies a position at which the viewer 28 directs attention (hereinafter, referred to as an "attention position") in the display 156 (specifically, the screen 156A shown in FIG. 2) based on the observation direction specification information and position-in-virtual viewpoint video specification information included in the third position association information. Moreover, the CPU 160 derives target subject position information based on the specified attention position and the third position association information.

The target subject position information includes subject position-in-imaging region information and subject position-in-virtual viewpoint video information. The subject position-in-imaging region information is information indicating the position of the target subject in the imaging region (hereinafter, also referred to as a "target subject position"). Here, as an example of the subject position-in-imaging region information, the three-dimensional coordinate for specifying the target subject position in the imaging region is adopted. The subject position-in-virtual viewpoint video information is information (for example, an address for specifying the position of the pixel) for specifying the position of a target subject image 47 in the virtual viewpoint video 46 (hereinafter, also referred to as a "target subject image position"). The target subject position information is information in which the subject position-in-imaging region information and the subject position-in-virtual viewpoint video information are associated with each other in a state in which the correspondence between the target subject position and the target subject image position can be specified.

The CPU 160 derives the target subject position information based on the third position association information and a detection result by the eye tracker 166, that is, the observation direction specification information. Specifically, the CPU 160 acquires the position-in-imaging region specification information and the position-in-virtual viewpoint video specification information corresponding to the attention position as the target subject position information from the third position association information. The CPU 160 transmits the acquired target subject position information to the information processing apparatus 12.

Figure 15:
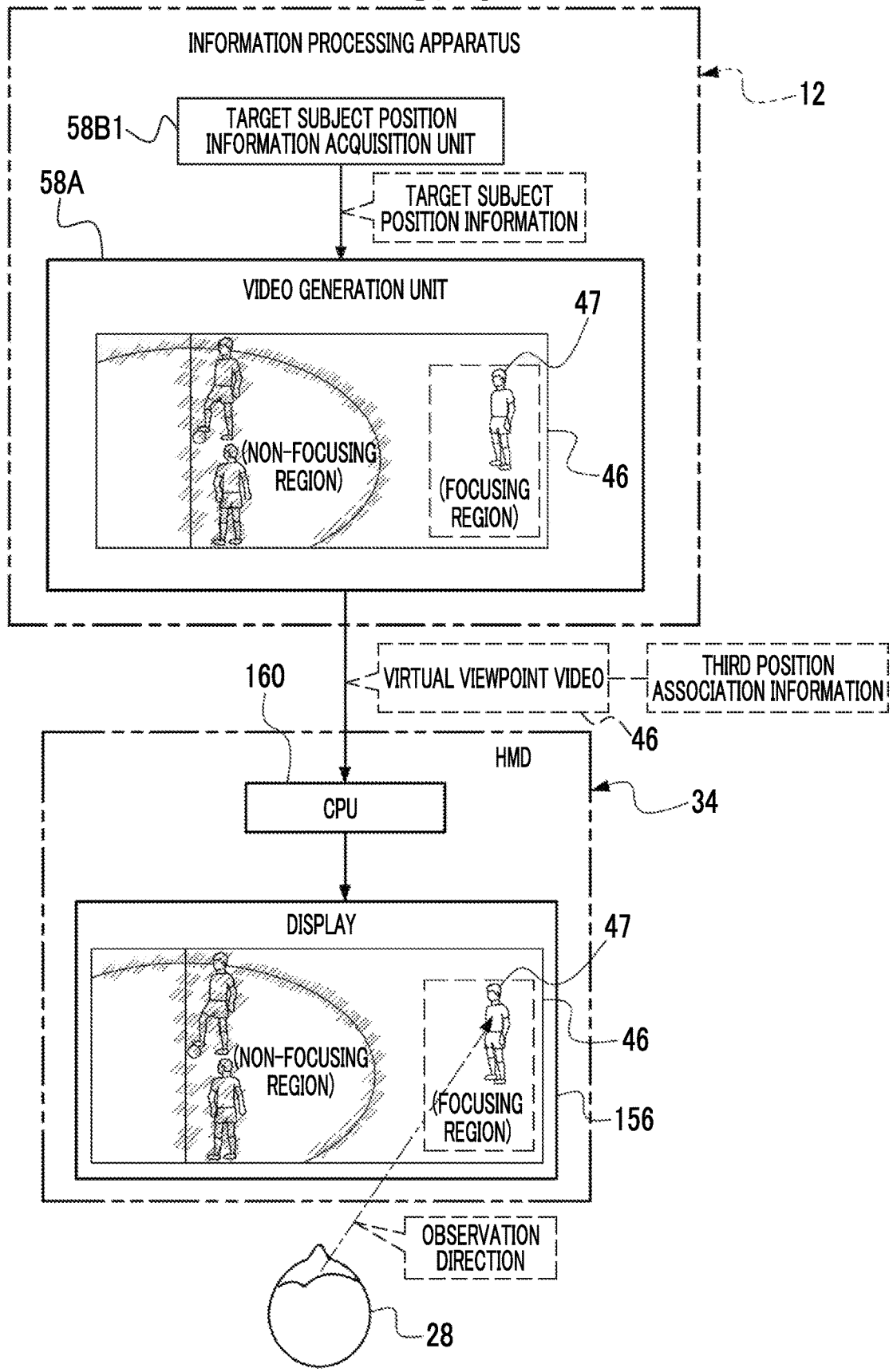
FIG. 15 is a conceptual diagram showing an example of process content in which the virtual viewpoint video that is in focus with respect to a target subject image is generated according to target subject position information by the video generation unit of the information processing apparatus according to the embodiment, and the generated virtual viewpoint video is displayed on the HMD.

In the information processing apparatus 12, the acquisition unit 58B comprises a target subject position information acquisition unit 58B1. The target subject position information acquisition unit 58B1 acquires the target subject position information. Here, the target subject position information transmitted from the CPU 160 of the HMD 34 is acquired by being received by the target subject position information acquisition unit 58B1. For example, as shown in FIG. 15, the target subject position information acquisition unit 58B1 outputs the target subject position information to the video generation unit 58A. Moreover, the video generation unit 58A generates the virtual viewpoint video 46 by using the bird's-eye view video 46A and the imaging video 46B based on the viewpoint/visual line/angle-of-view information and the target subject position information described above. Specifically, the video generation unit 58A generates the virtual viewpoint video 46 that is in focus with respect to the target subject image position specified by the position-in-virtual viewpoint video specification information included in the target subject position information input by the target subject position information acquisition unit 58B1. That is, the video generation unit 58A generates the virtual viewpoint video 46 that is in focus with respect to the target subject image 47 more than the image in a periphery of the target subject image 47. Here, a state in which the target subject image 47 is in focus more than the images in a periphery of the target subject image 47 means that a contrast value of the target subject image 47 is higher than contrast values of the images in a periphery of the target subject image 47.

For example, as shown in FIG. 15, the virtual viewpoint video 46 is roughly classified into a focused region in which the target subject image 47 is positioned and a peripheral region of the target subject image 47, that is, a non-focused region having lower contrast value than the focused region. Here, the target subject image 47 is an example of a "virtual viewpoint target subject image" according to the technology of the present disclosure. The virtual viewpoint video 46 having the focused region and the non-focused region is transmitted to the HMD 34 by the video generation unit 58A in a state in which the third position association information is provided. Moreover, in the HMD 34, the CPU 160 receives the virtual viewpoint video 46 and the third position association information transmitted from the video generation unit 58A. Moreover, the CPU 160 displays the received virtual viewpoint video 46 on the display 156.

Figure 16:
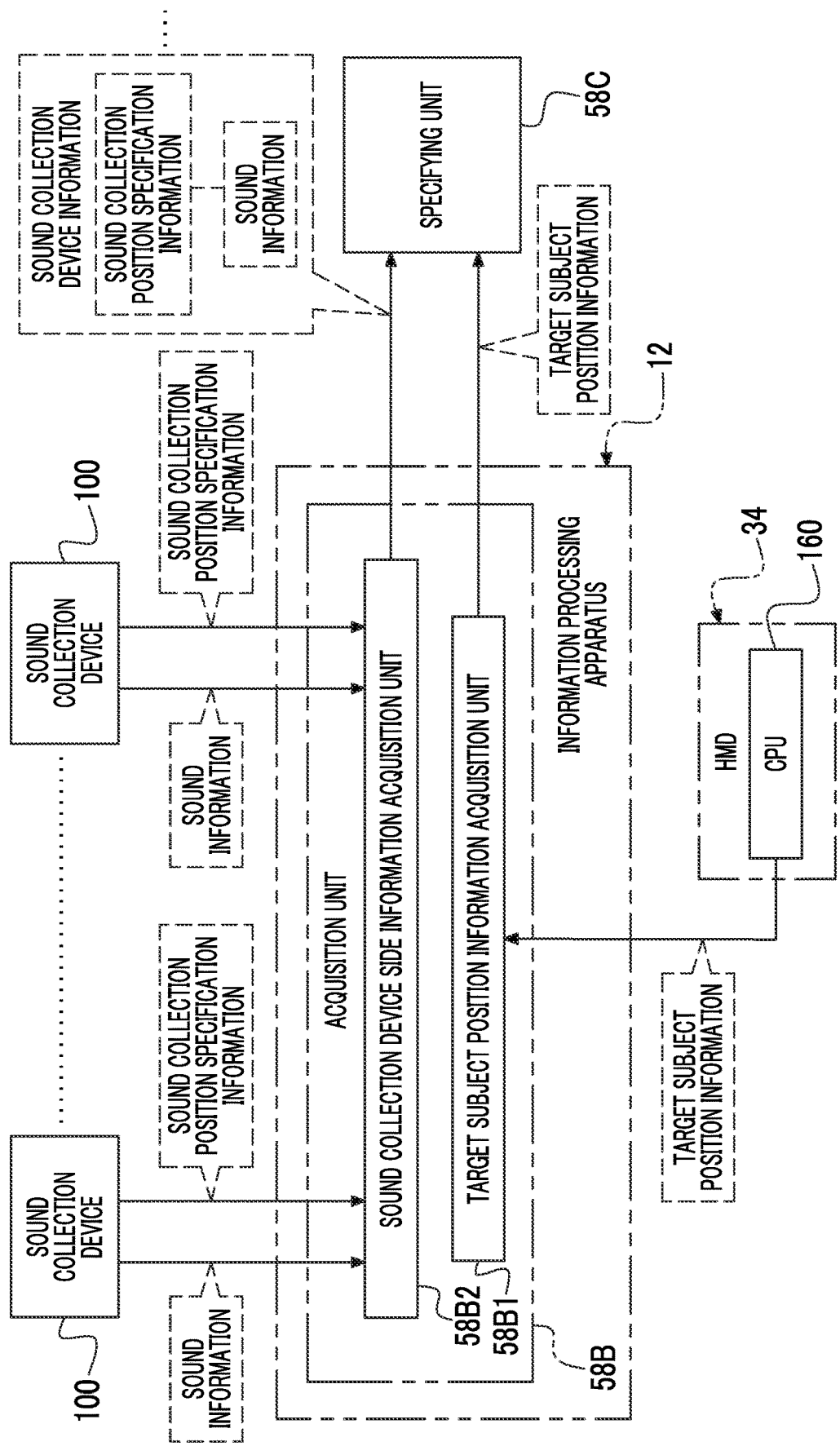
FIG. 16 is a block diagram provided for describing an example of process content of an acquisition unit and a specifying unit of the information processing apparatus according to the embodiment.

For example, as shown in FIG. 16, the acquisition unit 58B comprises a sound collection device side information acquisition unit 58B2 in addition to the target subject position information acquisition unit 58B1. The target subject position information acquisition unit 58B1 outputs target subject position specification information acquired from the HMD 34 to the specifying unit 58C.

The sound collection device 100 transmits the sound information and sound collection position specification information indicating the position of the sound collection device 100 in the imaging region (hereinafter, also referred to as a "sound collection device position") to the information processing apparatus 12. Here, as an example of the sound collection position specification information, the three-dimensional coordinate for specifying the sound collection device position in the imaging region is adopted. Note that the sound collection position specification information is an example of "sound collection device position information" according to the technology of the present disclosure.

In the information processing apparatus 12, the sound collection device side information acquisition unit 58B2 acquires the sound information and the sound collection position specification information. Here, the sound information and the sound collection position specification information transmitted from the sound collection device 100 are acquired by being received by the sound collection device side information acquisition unit 58B2. The sound collection device side information acquisition unit 58B2 generates sound collection device information based on the sound information acquired from the sound collection device 100 and the sound collection position specification information. The sound collection device information is information in which the sound information and the sound collection position specification information are associated with each other for each sound collection device 100. The sound collection device side information acquisition unit 58B2 outputs the generated sound collection device information to the specifying unit 58C.

Figure 17:
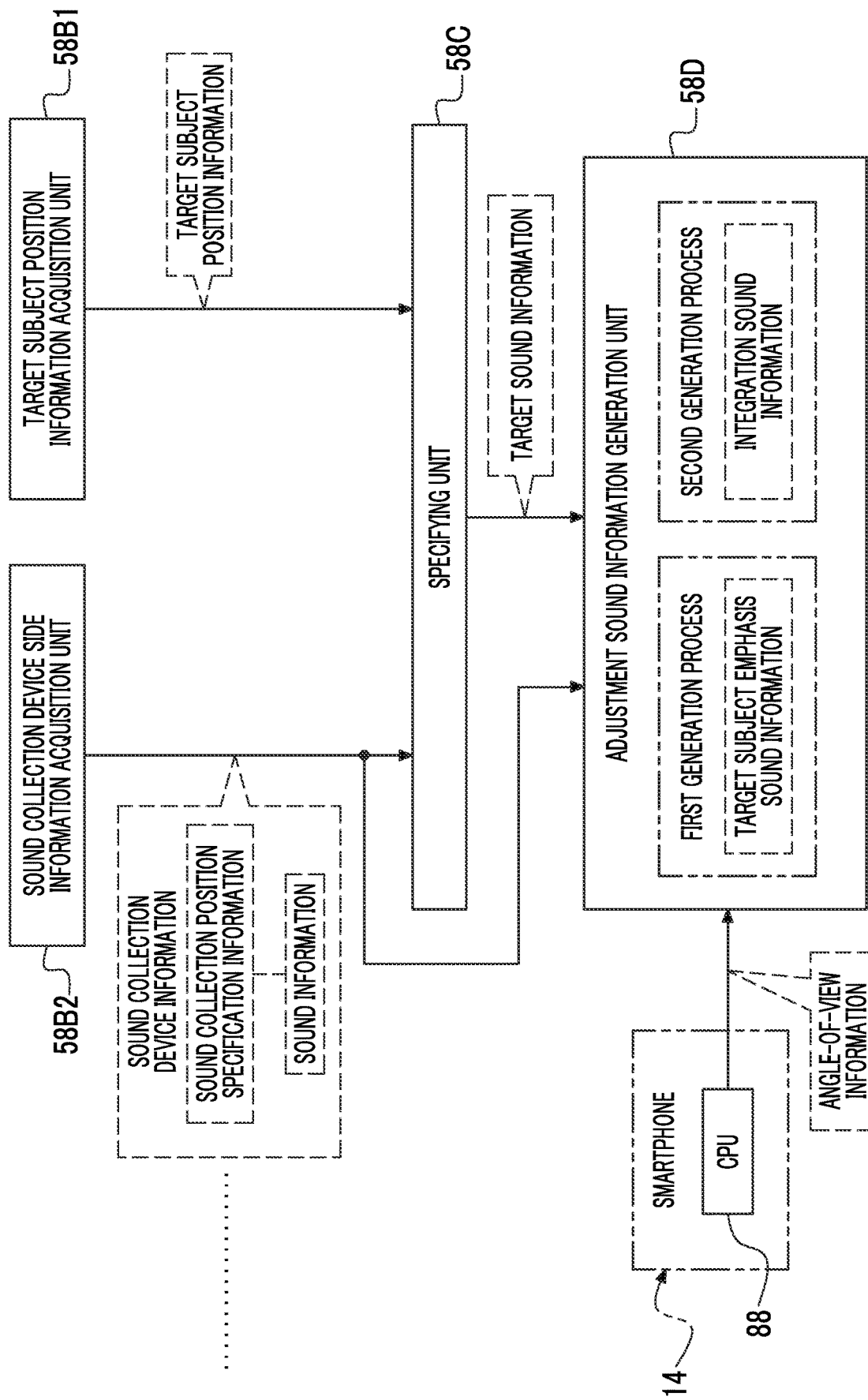
FIG. 17 is a block diagram provided for describing examples of process contents of a sound collection device side information acquisition unit, a target subject position information acquisition unit, the specifying unit, and an adjustment sound information generation unit of the information processing apparatus according to the embodiment.

For example, as shown in FIG. 17, the specifying unit 58C acquires the target subject position information from the target subject position information acquisition unit 58B1 and acquires the sound collection device information from the sound collection device side information acquisition unit 58B2. Moreover, the specifying unit 58C specifies the target sound in the region corresponding to the target subject from the plurality of pieces of sound information based on the target subject position information and the sound collection device information.

The specifying unit 58C acquires the sound collection device information for each of the plurality of sound collection devices 100 from the sound collection device side information acquisition unit 58B2. That is, the specifying unit 58C acquires a plurality of pieces of the sound collection device information from the sound collection device side information acquisition unit 58B2. The specifying unit 58C specifies the sound collection device information having the sound collection position specification information corresponding to the subject position-in-imaging region information included in the target subject position information from the plurality of pieces of sound collection device information. Here, the sound collection position specification information corresponding to the subject position-in-imaging region information refers to the sound collection position specification information for specifying the sound collection device position closest to the target subject position specified by the subject position-in-imaging region information among a plurality of the sound collection device positions indicated by a plurality of pieces of the sound collection position specification information included in the plurality of pieces of sound collection device information.

The specifying unit 58C specifies the sound information included in the specified sound collection device information as the target sound information indicating the target sound in the region corresponding to the target subject position.

The adjustment sound information generation unit 58D acquires the target sound information specified by the specifying unit 58C from the specifying unit 58C, and acquires the sound collection device information for each of the plurality of sound collection devices 100 from the sound collection device side information acquisition unit 58B2. The adjustment sound information generation unit 58D generates the adjustment sound information based on the acquired target sound information and the acquired sound collection device information. The adjustment sound information is roughly classified into integration sound information and target subject emphasis sound information. The integration sound information is an example of "integration sound information" and "comprehensive sound information" according to the technology of the present disclosure. The integration sound information refers to information indicating an integration sound. The integration sound is an example of an "integration sound" and a "comprehensive sound" according to the technology of the present disclosure. The integration sound refers to a sound obtained by integrating a plurality of sounds obtained by the plurality of sound collection devices 100. The target subject emphasis sound information refers to information indicating a sound (hereinafter, also referred to as a "target subject emphasis sound") including the target sound (hereinafter, also referred to as "emphasis target sound") that is emphasized more than a peripheral sound. The peripheral sound refers to a sound emitted from a region different from the region corresponding to the target subject position indicated by the subject position-in-imaging region information included in the target subject position information acquired by the specifying unit 58C.

Here, the region corresponding to the target subject position refers to, for example, the target subject itself. Note that, not limited to the above, in a case in which a center position of the target subject is set as the target subject position, the region corresponding to the target subject position may be a three-dimensional region defined by a predetermined distance from the target subject position. Examples of the three-dimensional region defined by the predetermined distance from the target subject position include a spherical region within a radius of 3 meters centered on the target subject position and 4 meter square cubic region centered on the target subject position.

Here, as an example of the peripheral sound, the sound indicated by the sound information included in the sound collection device information different from the sound collection device information in which the target sound information is included as the sound information is adopted. The emphasis target sound is realized by making the volume of the peripheral sound lower than the volume of the sound indicated by the sound information on the peripheral sound or making the volume of the target sound higher than the volume of the target sound indicated by the target sound information. Note that not limited to the above, the emphasis target sound may be realized by making the volume of the peripheral sound lower than the volume of the sound indicated by the sound information on the peripheral sound and making the volume of the target sound higher than the volume of the target sound indicated by the target sound information.

The adjustment sound information generation unit 58D selectively executes a first generation process and a second generation process. The first generation process is a process of generating the target subject emphasis sound information, and the second generation process is a process of generating the integration sound information. The adjustment sound information generation unit 58D selectively executes the first generation process and the second generation process based on the angle-of-view information acquired from the smartphone 14.

Figure 18:
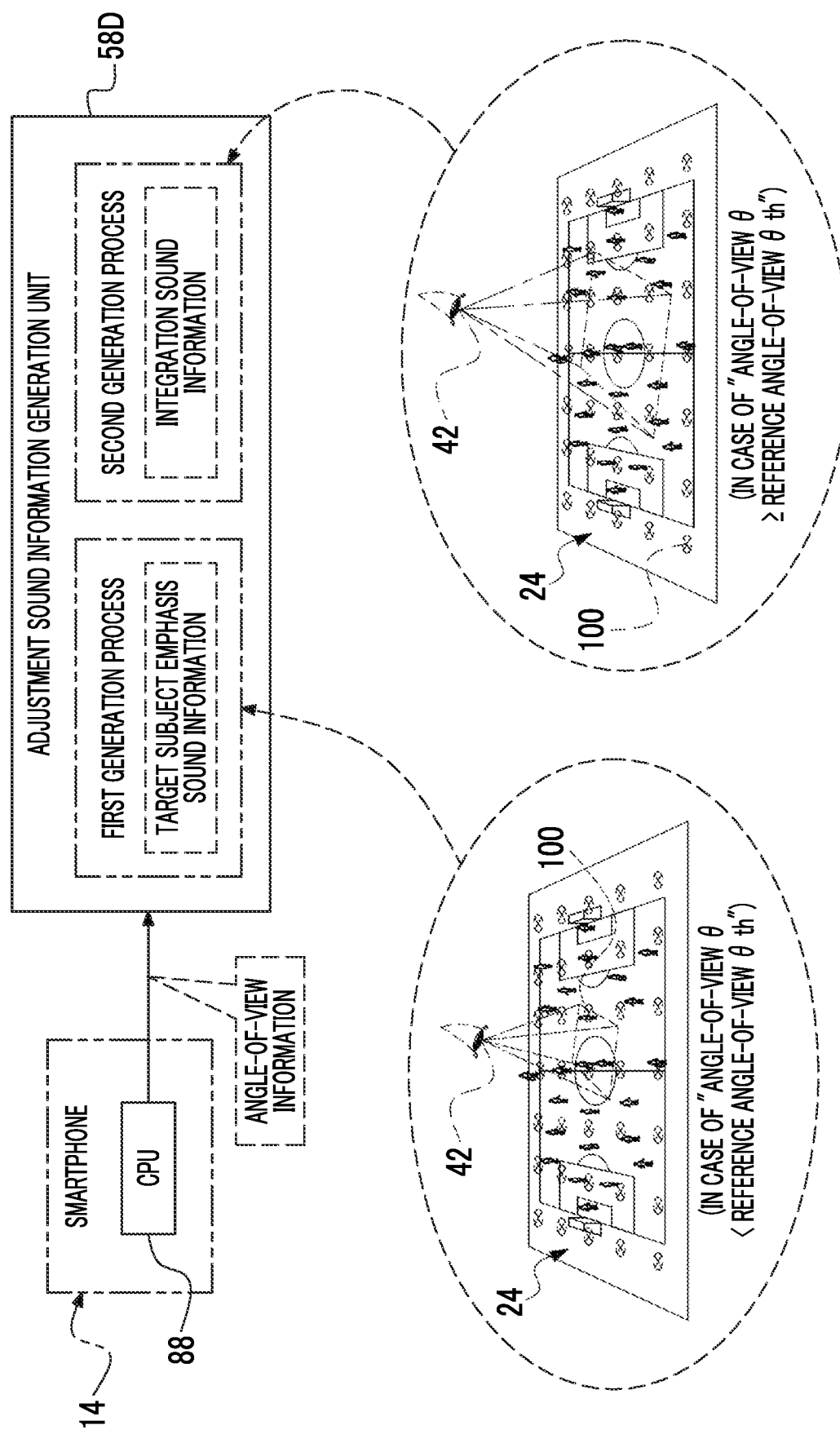
FIG. 18 is a conceptual diagram showing examples of process contents of a first generation process and a second generation process executed by the adjustment sound information generation unit of the information processing apparatus according to the embodiment.
Figure 19:
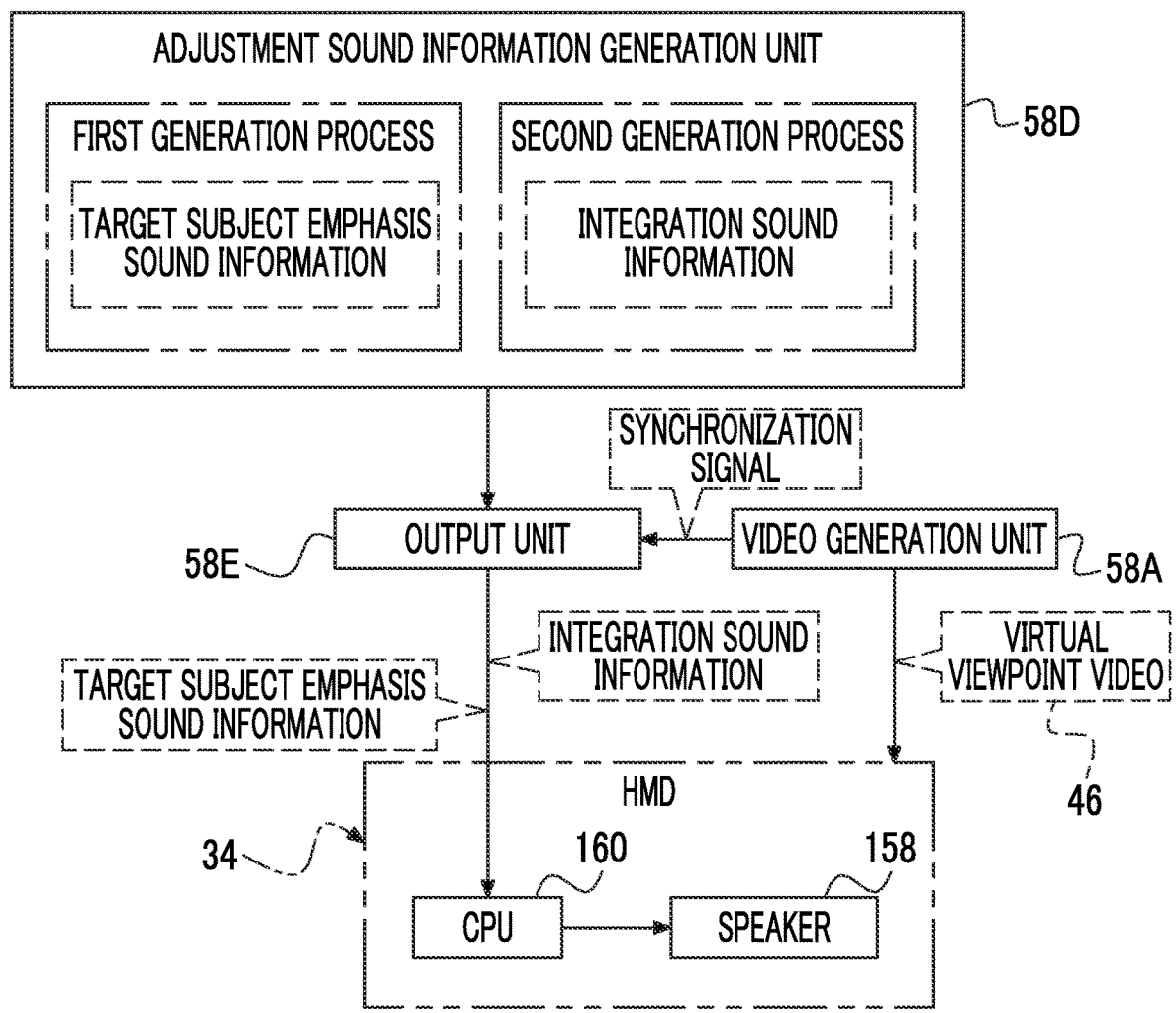
FIG. 19 is a block diagram showing an example of output of target subject emphasis sound information and integration sound information generated by the adjustment sound information generation unit of the information processing apparatus according to the embodiment.

For example, as shown in FIG. 18, the adjustment sound information generation unit 58D executes the first generation process in a case in which the angle of view indicated by the angle-of-view information is less than a reference angle of view, and executes the second generation process in a case in which the angle of view indicated by the angle-of-view information is equal to or more than the reference angle of view. In the example shown in FIG. 18, in a case in which the angle of view indicated by the angle-of-view information is defined as "θ" and the reference angle of view is defined as "$\theta_{th}$", the first generation process is executed by the adjustment sound information generation unit 58D to generate the target subject emphasis sound information in a case of "angle of view θ<reference angle of view $\theta_{th}$". In addition, the second generation process is executed by the adjustment sound information generation unit 58D to generate the integration sound information in a case of "angle of view θ≥reference angle of view $\theta_{th}$".

In a case in which a content of the virtual viewpoint video 46 displayed by the HMD does not match the target subject emphasis sound, the target subject emphasis sound may cause the discomfort to the viewer 28. Therefore, here, a fixed value derived in advance by a sensory test and/or a computer simulation is adopted as a reference angle of view $\theta_{th}$ as a lower limit value of the angle of view that does not cause the discomfort to the viewer 28 in a case in which the integration sound is output from the speaker 158 than a case in which the target subject emphasis sound is output from the speaker 158.

Note that, here, the fixed value is adopted as the reference angle of view $\theta_{th}$, but the reference angle of view is not limited to this, and a variable value that can be changed in response to the instruction received by the reception device 52, 76, or 152 may be adopted as the reference angle of view $\theta_{th}$.

The CPU 58 (see FIG. 9) is operated as the output unit 58E capable of outputting the target subject emphasis sound information generated by the adjustment sound information generation unit 58D. The output unit 58E acquires the target subject emphasis sound information from the adjustment sound information generation unit 58D and outputs the acquired target subject emphasis sound information in a case in which the target subject emphasis sound information is generated by executing the first generation process. That is, the output unit 58E transmits the target subject emphasis sound information to the HMD 34. In addition, the output unit 58E acquires the integration sound information from the adjustment sound information generation unit 58D and outputs the acquired integration sound information in a case in which the integration sound information is generated by executing the second generation process. That is, the output unit 58E transmits the integration sound information to the HMD 34.

The output of the target subject emphasis sound information and the integration sound information by the output unit 58E is performed in synchronization with the output of the virtual viewpoint video 46 to the HMD 34 by the video generation unit 58A. In this case, the video generation unit 58A outputs a synchronization signal to the output unit 58E at the timing when the output of the virtual viewpoint video 46 is started. The output of the target subject emphasis sound information and the integration sound information by the output unit 58E is performed in response to the input of the synchronization signal from the video generation unit 58A.

In the HMD 34, the target subject emphasis sound information transmitted from the output unit 58E is received by the CPU 160, and the target subject emphasis sound which is indicated by the received target subject emphasis sound information is output from the speaker 158. In addition, in the HMD 34, the integration sound information transmitted from the output unit 58E is received by the CPU 160, and the integration sound indicated by the received integration sound information is output from the speaker 158.

Next, an operation of the information processing system 10 will be described.

First, an example of a flow of the video generation process executed by the CPU 58 of the information processing apparatus 12 according to the video generation program 60A will be described with reference to FIG. 20.

Figure 20:
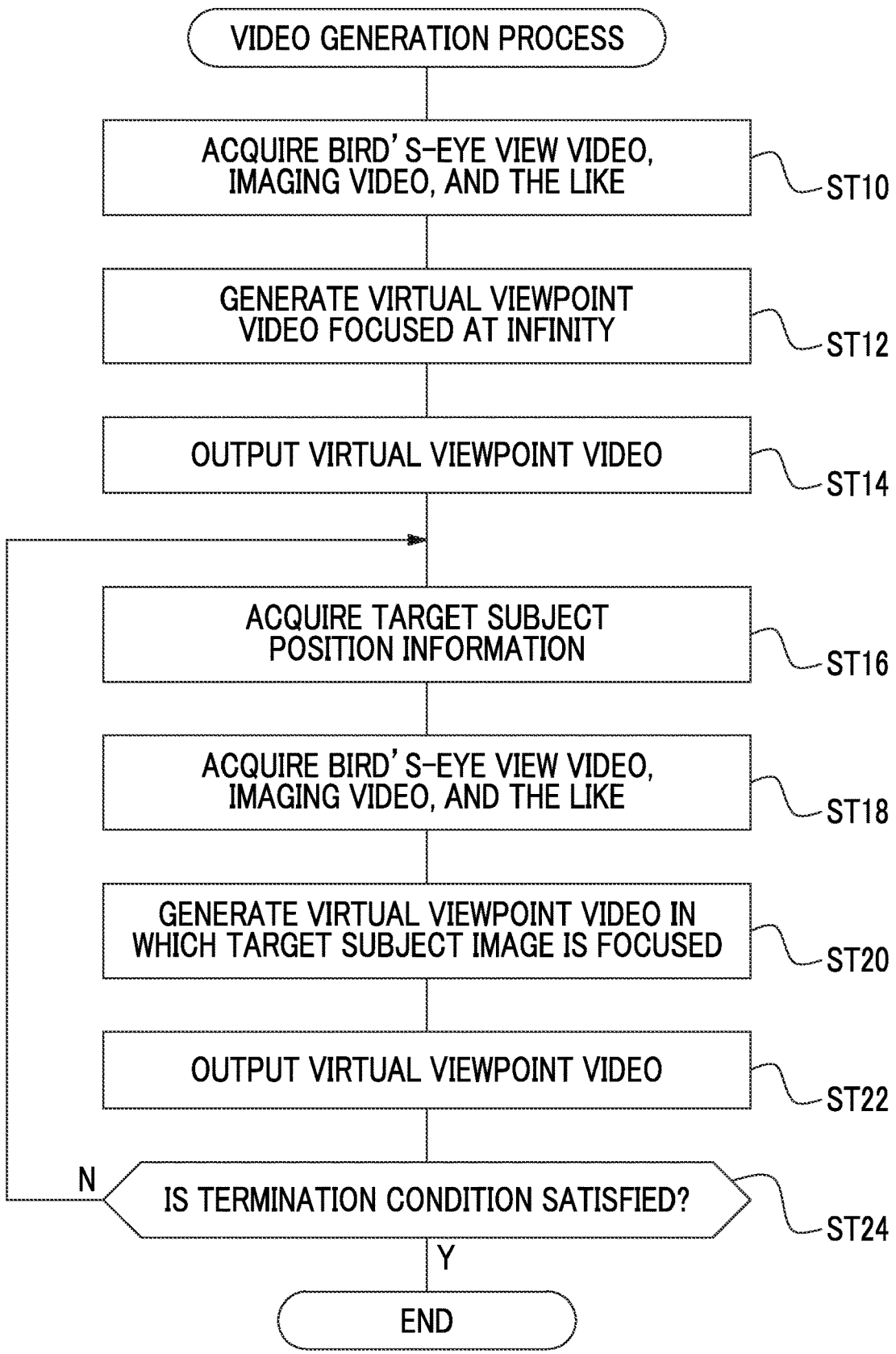
FIG. 20 is a flowchart showing an example of a flow of a video generation process according to the embodiment.

In the video generation process shown in FIG. 20, first, the video generation unit 58A acquires the bird's-eye view video 46A, the imaging video 46B, and the viewpoint/visual line/angle-of-view information in step ST10, and then the video generation process proceeds to step ST12.

In step ST12, the video generation unit 58A generates the virtual viewpoint video 46 that is in focus at infinity by using the bird's-eye view video 46A and the imaging video 46B, which are acquired step ST10, based on the viewpoint/visual line/angle-of-view information acquired in step ST10, and then the video generation process proceeds to step ST14.

In step ST14, the video generation unit 58A outputs the virtual viewpoint video 46 generated in step ST12 to the HMD 34, and then the video generation process proceeds to step ST16. The virtual viewpoint video 46 output to the HMD 34 by the execution of the process of step ST14 is displayed on the display 156 in the HMD 34 and is visually recognized by the viewer 28.

In step ST16, the target subject position information acquisition unit 58B1 acquires the target subject position information derived by the CPU 160 based on the detection result by the eye tracker 166, and then the video generation process proceeds to step ST18.

In step ST18, the video generation unit 58A acquires the bird's-eye view video 46A, the imaging video 46B, and the viewpoint/visual line/angle-of-view information, and then the video generation process proceeds to step ST20.

In step ST20, the video generation unit 58A generates the virtual viewpoint video 46 that is in focus with respect to the target subject image 47 by using the bird's-eye view video 46A and the imaging video 46B, which are acquired step ST18, based on the viewpoint/visual line/angle-of-view information acquired in step ST18 and the target subject position information acquired in step ST16, and then the video generation process proceeds to step ST22.

In step ST22, the video generation unit 58A outputs the virtual viewpoint video 46 generated in step ST20 to the HMD 34, and then the video generation process proceeds to step ST24. The virtual viewpoint video 46 output to the HMD 34 by the execution of the process of step ST22 is displayed on the display 156 in the HMD 34 and is visually recognized by the viewer 28.

In step ST24, the CPU 58 determines whether or not a condition for terminating the video generation process (video generation process termination condition) is satisfied. Examples of the video generation process termination condition include a condition that an instruction for terminating the video generation process is received by the reception device 52, 76, or 152. In a case in which the video generation process termination condition is not satisfied in step ST24, a negative determination is made, and the video generation process proceeds to step ST16. In a case in which the video generation process termination condition is satisfied in step ST24, a positive determination is made, and the video generation process is terminated.

Next, an example of a flow of the sound generation process executed by the CPU 58 of the information processing apparatus 12 according to the sound generation program 60B will be described with reference to FIGS. 21 and 22. Note that, here, the description will be made on the premise that the synchronization signal is output from the video generation unit 58A to the output unit 58E at the timing when the output of the virtual viewpoint video 46 by the video generation unit 58A is started.

Figure 21:
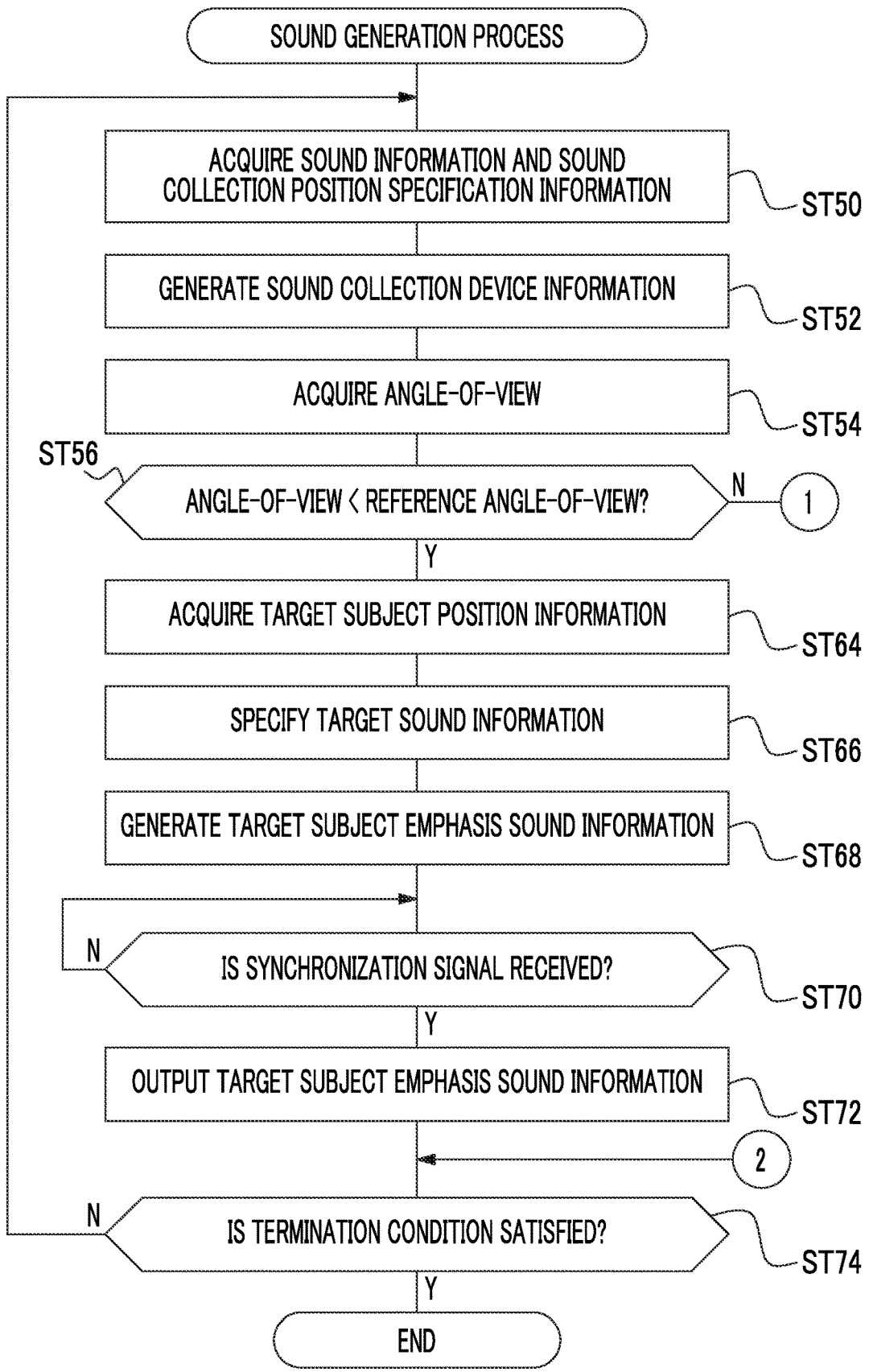
FIG. 21 is a flowchart showing an example of a flow of a sound generation process according to the embodiment.

In the sound generation process shown in FIG. 21, first, the sound collection device side information acquisition unit 58B2 acquires the sound information and the sound collection position specification information from each of the plurality of sound collection devices 100 in step ST50, and then the sound generation process proceeds to step ST52.

In step ST52, the sound collection device side information acquisition unit 58B2 generates the sound collection device information for each of the plurality of sound collection devices 100 based on the sound information and the sound collection position specification information, which are acquired in step ST50, and then the sound generation process proceeds to step ST54.

In step ST54, the adjustment sound information generation unit 58D acquires the angle-of-view information from the smartphone 14, and then the sound generation process proceeds to step ST56.

In step ST56, the adjustment sound information generation unit 58D determines whether or not the angle of view indicated by the angle-of-view information acquired in step ST54 is less than the reference angle of view. In step ST56, in a case in which the angle of view indicated by the angle-of-view information acquired in step ST54 is equal to or more than the reference angle of view, a negative determination is made, and the sound generation process proceeds to step ST58 shown in FIG. 22. In step ST56, in a case in which the angle of view indicated by the angle-of-view information acquired in step ST54 is less than the reference angle of view, a positive determination is made, and the sound generation process proceeds to step ST64.

Figure 22:
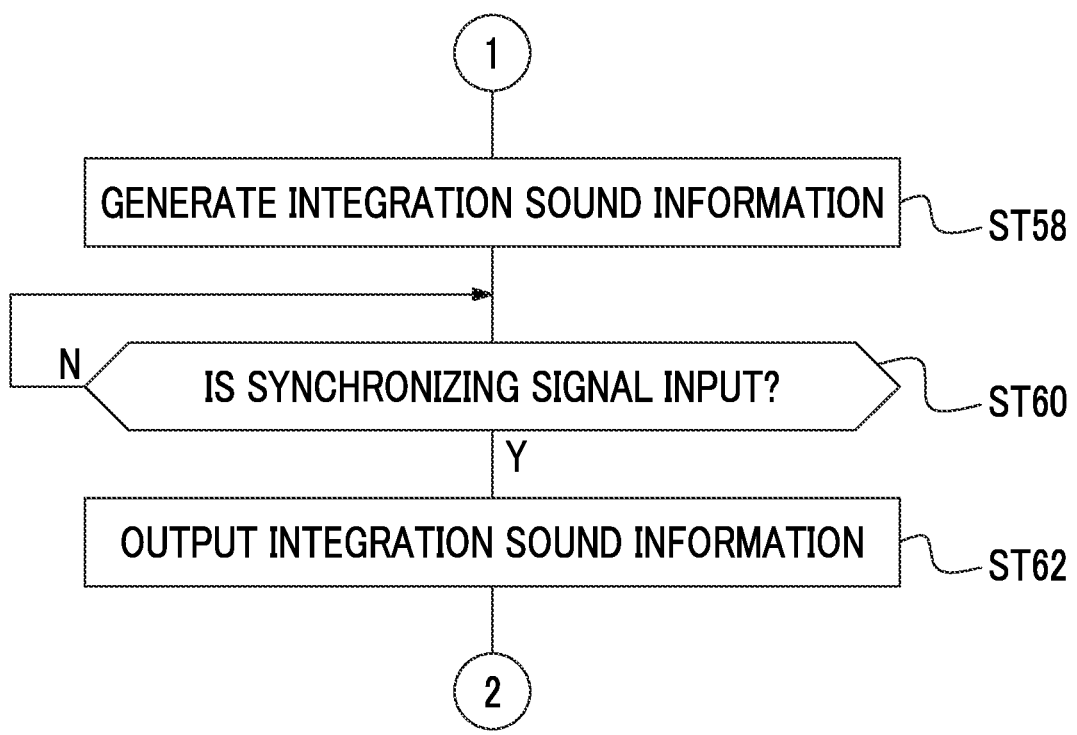
FIG. 22 is a continuation of the flowchart shown in FIG. 21.

In step ST58 shown in FIG. 22, the adjustment sound information generation unit 58D generates the integration sound information based on the sound collection device information generated in step ST52, and then the sound generation process proceeds to step ST60.

In step ST60, the output unit 58E determines whether or not the synchronization signal is input from the video generation unit 58A. In step ST60, in a case in which the synchronization signal is not input from the video generation unit 58A, a negative determination is made, and the determination in step ST60 is made again. In a case in which the synchronization signal is input from the video generation unit 58A in step ST60, a positive determination is made, and the sound generation process proceeds to step ST62.

In step ST62, the output unit 58E outputs the integration sound information generated in step ST58 to the HMD 34, and then the sound generation process proceeds to step ST74 shown in FIG. 21. The integration sound indicated by the integration sound information output to the HMD 34 by the execution of the process of step ST62 is output from the speaker 158 in the HMD 34 and heard by the viewer 28.

In step ST64 shown in FIG. 21, the target subject position information acquisition unit 58B1 acquires the target subject position information from the HMD 34, and then the sound generation process proceeds to step ST66.

In step ST66, the specifying unit 58C specifies the target sound information based on the sound collection device information generated in step ST52 and the target subject position information acquired in step ST64, and then the sound generation process proceeds to step ST68.

In step ST68, the adjustment sound information generation unit 58D generates the target subject emphasis sound information based on the sound collection device information generated in step ST50 and the target sound information specified in step ST66, and then the sound generation process proceeds to step ST70.

In step ST70, the output unit 58E determines whether or not the synchronization signal is input from the video generation unit 58A. In step ST70, in a case in which the synchronization signal is not input from the video generation unit 58A, a negative determination is made, and the determination in step ST70 is made again. In a case in which the synchronization signal is input from the video generation unit 58A in step ST70, a positive determination is made, and the sound generation process proceeds to step ST72.

In step ST72, the output unit 58E outputs the target subject emphasis sound information generated in step ST68 to the HMD 34, and then the sound generation process proceeds to step ST74. The target subject emphasis sound indicated by the target subject emphasis sound information output to the HMD 34 by the execution of the process of step ST72 is output from the speaker 158 in the HMD 34 and heard by the viewer 28.

In step ST74, the CPU 58 determines whether or not a condition for terminating the sound generation process (sound generation process termination condition) is satisfied. Examples of the sound generation process termination condition include a condition that an instruction for terminating the sound generation process is received by the reception device 52, 76, or 152. In a case in which the sound generation process termination condition is not satisfied in step ST74, a negative determination is made, and the sound generation process proceeds to step ST50. In a case in which the sound generation process termination condition is satisfied in step ST74, a positive determination is made, and the sound generation process is terminated.

As described above, in the information processing apparatus 12, the target subject position information acquisition unit 58B1 acquires the target subject position information from the HMD 34, and the sound collection device side information acquisition unit 58B2 acquires the sound information and the sound collection position specification information from each of the plurality of sound collection devices 100. In addition, the specifying unit 58C specifies the target sound in the region corresponding to the target subject position from the plurality of pieces of sound information based on the sound collection position specification information and the target subject position information. Moreover, in a case in which the virtual viewpoint video 46 is generated, the target subject emphasis sound information is generated by the adjustment sound information generation unit 58D. The target subject emphasis sound information is the information indicating the target subject emphasis sound. The target subject emphasis sound is a sound including the emphasis target sound in which the target sound is emphasized more than the sound (peripheral sound) emitted from the region different from the region corresponding to the target subject position indicated by the target subject position information acquired by the target subject position information acquisition unit 58B1. Therefore, it is possible to contribute to the listening of the sound emitted from the region corresponding to the target subject position indicated by the generated virtual viewpoint video 46 by the viewer 28.

In addition, in the information processing apparatus 12, the adjustment sound information generation unit 58D selectively executes the first generation process and the second generation process. The target subject emphasis sound information is generated in the first generation process, and the integration sound information is generated in the second generation process. Therefore, it is possible to selectively generate the target subject emphasis sound information and the integration sound information.

In addition, in the information processing apparatus 12, the first generation process is executed in a case in which the angle of view indicated by the angle-of-view information is less than the reference angle of view, and the second generation process is executed in a case in which the angle of view indicated by the angle-of-view information is equal to or more than the reference angle of view. Therefore, it is possible to selectively generate the target subject emphasis sound information and the integration sound information depending on the angle of view.

In addition, in the information processing apparatus 12, the eye tracker 166 detects the observation direction of the viewer 28 who observes the virtual viewpoint video 46 in a state in which the virtual viewpoint video 46 is displayed on the display 156 of the HMD 34. Here, the CPU 160 generates the target subject position information based on the third position association information and the detection result by the eye tracker 166, and the generated target subject position information is acquired by the target subject position information acquisition unit 58B1. The target subject position information acquired by the target subject position information acquisition unit 58B1 is used for specifying the target sound information by the specifying unit 58C, and the target sound information specified by the specifying unit 58C is used for generating the target subject emphasis sound information by the adjustment sound information generation unit 58D. Therefore, it is possible to suppress erroneous generation of the information indicating the sound emitted from the position of the direction irrelevant to the observation direction of the viewer 28 as the target subject emphasis sound information.

In addition, in the information processing apparatus 12, the visual line direction of the viewer 28 is detected as the observation direction by the eye tracker 166 based on the eye image obtained by imaging the eyes 29 of the viewer 28 by the imaging element 166A. Therefore, it is possible to detect the observation direction with higher accuracy as compared to a case in which the direction different from the visual line direction of the viewer 28 is detected as the observation direction.

In addition, in the information processing apparatus 12, the HMD 34 is mounted on the viewer 28, and the HMD 34 is provided with the eye tracker 166. Therefore, as compared to a case in which the eye tracker 166 is not provided on the HMD 34, it is possible to detect the observation direction with higher accuracy in a state in which the HMD 34 is mounted on the viewer 28.

In addition, in the information processing apparatus 12, the target subject image is the image in the virtual viewpoint video 46 that is more in focus than the image in a periphery of the target subject image. Therefore, it is possible to specify the position at which the target subject emphasis sound is emitted from the virtual viewpoint video 46.

Further, in the information processing apparatus 12, the plurality of sound collection devices 100 are fixed in the imaging region. Therefore, it is possible to easily acquire the sound collection position specification information as compared to a case in which the plurality of sound collection devices 100 are moved.

Note that in the embodiment described above, the aspect example has been described in which the target subject position information acquisition unit 58B1 acquires the target subject position information based on the detection result by the eye tracker 166, but the technology of the present disclosure is not limited to this. For example, the target subject position information acquisition unit 58B1 may acquire the target subject position information based on the instruction received by the reception device 52, 76, or 152. In this case, first, in a state in which the distribution video (here, for example, the virtual viewpoint video 46) is displayed by the HMD 34, the indication information for indicating the target subject image position in the distribution video is received by the reception device 52, 76, or 152. Moreover, the target subject position information acquisition unit 58B1 acquires the target subject position information based on the third position association information and the indication information received by the reception device 52, 76, or 152. That is, the target subject position information acquisition unit 58B1 acquires the target subject position information by deriving the position-in-imaging region specification information corresponding to the target subject image position as indicated by the indication information as the target subject position information from the third position association information.

With the present configuration, it is possible to suppress the erroneous generation of the sound information indicating the sound emitted from the position that is not intended by the viewer 28 as the target subject position as the target subject emphasis sound information as compared to a case in which the indication of the target subject position is given by using the image irrelevant to the imaging region. Note that, here, the reception device 52, 76, or 152 is an example of a "reception device (acceptor)" according to the technology of the present disclosure.

In addition, in the embodiment described above, the aspect example has been described in which the target subject emphasis sound information is not generated in a case in which the angle of view indicated by the angle-of-view information is equal to or more than the reference angle of view, but the technology of the present disclosure is not limited to this. For example, the target subject emphasis sound information may not be generated in a case in which a frequency at which the observation direction of the viewer 28 changes per unit time (hereinafter, referred to as an "observation direction change frequency") is equal to or more than a predetermined frequency.

Figure 23:
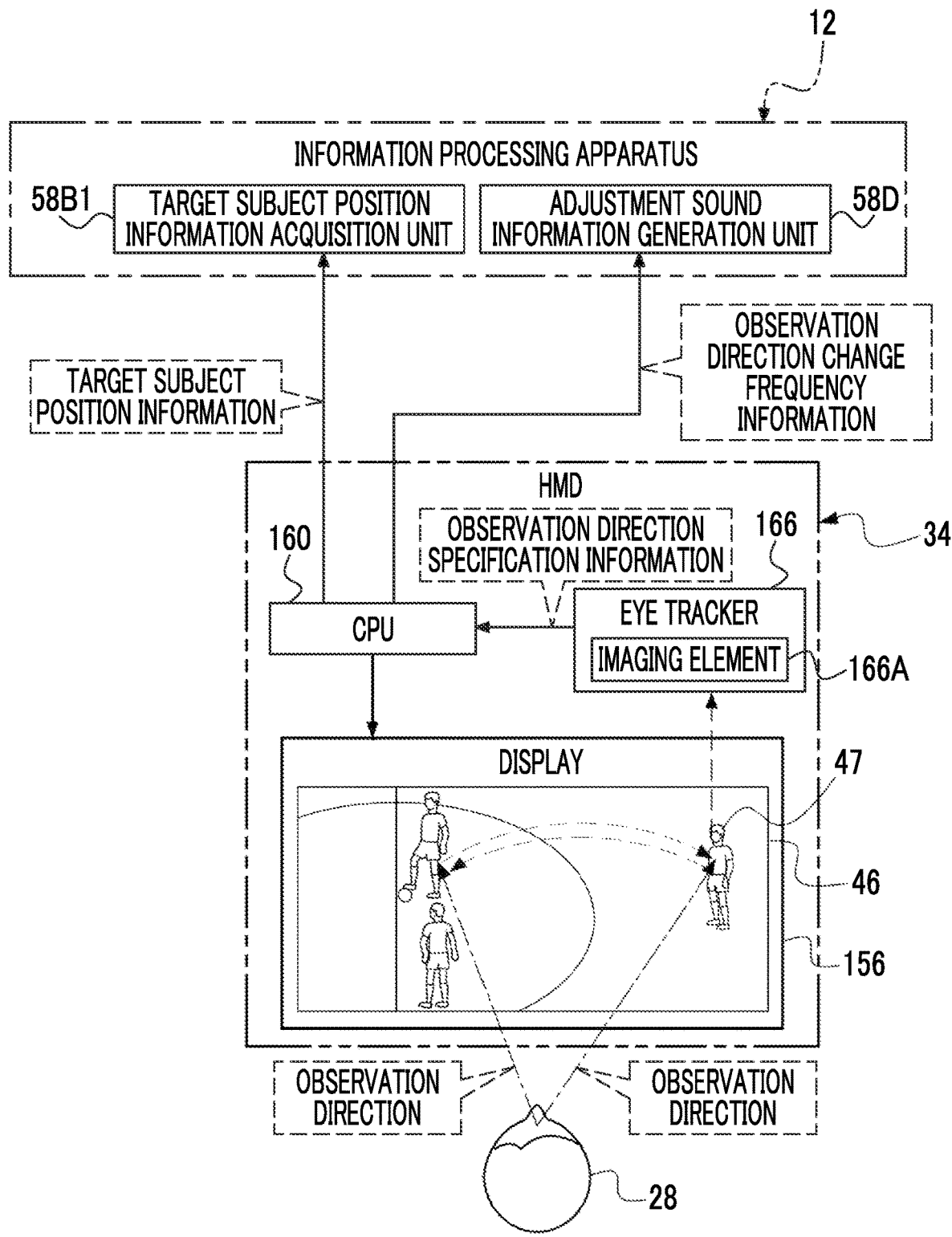
FIG. 23 is a conceptual diagram provided for describing an example of process contents in the HMD and the information processing apparatus in a case in which an observation direction of a viewer is frequently changed.

In this case, the first generation process and the second generation process need only be selectively executed by the adjustment sound information generation unit 58D depending on the observation direction change frequency. In a case in which the first generation process and the second generation process are selectively executed depending on the observation direction change frequency, for example, as shown in FIG. 23, first, in the HMD 34, the CPU 160 calculates the observation direction change frequency (for example, N times/seconds) based on the observation direction specification information. The CPU 160 outputs observation direction change frequency information indicating the calculated frequency to the adjustment sound information generation unit 58D. The adjustment sound information generation unit 58D executes the first generation process or the second generation process by referring to the observation direction change frequency information. That is, in a case in which the observation direction change frequency is equal to or more than the predetermined frequency, the second generation process is executed without executing the first generation process. In addition, in a case in which the observation direction change frequency is less than the predetermined frequency, the first generation process is executed without executing the second generation process.

In a case in which the target subject emphasis sound is output from the speaker 158 in a state in which the observation direction is not determined, the target subject emphasis sound may cause the discomfort to the viewer 28. Therefore, here, a fixed value derived in advance by a sensory test and/or a computer simulation is adopted as the predetermined frequency as a lower limit value of the observation direction change frequency that does not cause the discomfort to the viewer 28 in a case in which the integration sound is output from the speaker 158 than a case in which the target subject emphasis sound is output from the speaker 158.

Note that, here, although the fixed value is adopted as the predetermined frequency, the variable value that can be changed in response to the instruction received by the reception device 52, 76, or 152 may be adopted as the predetermined frequency.

Figure 24:
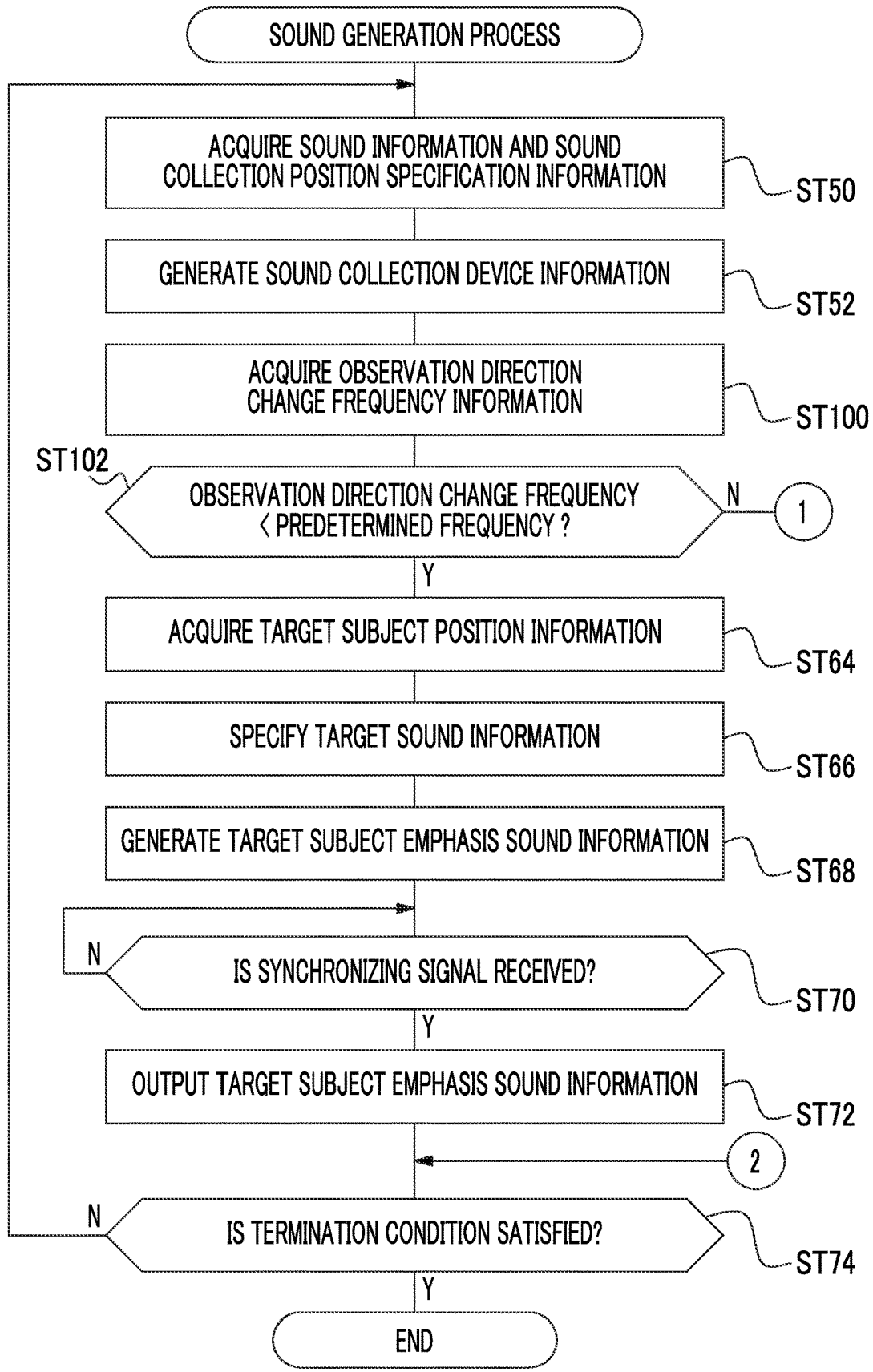
FIG. 24 is a flowchart showing a first modification example of the flow of the sound generation process according to the embodiment.
Figure 25:
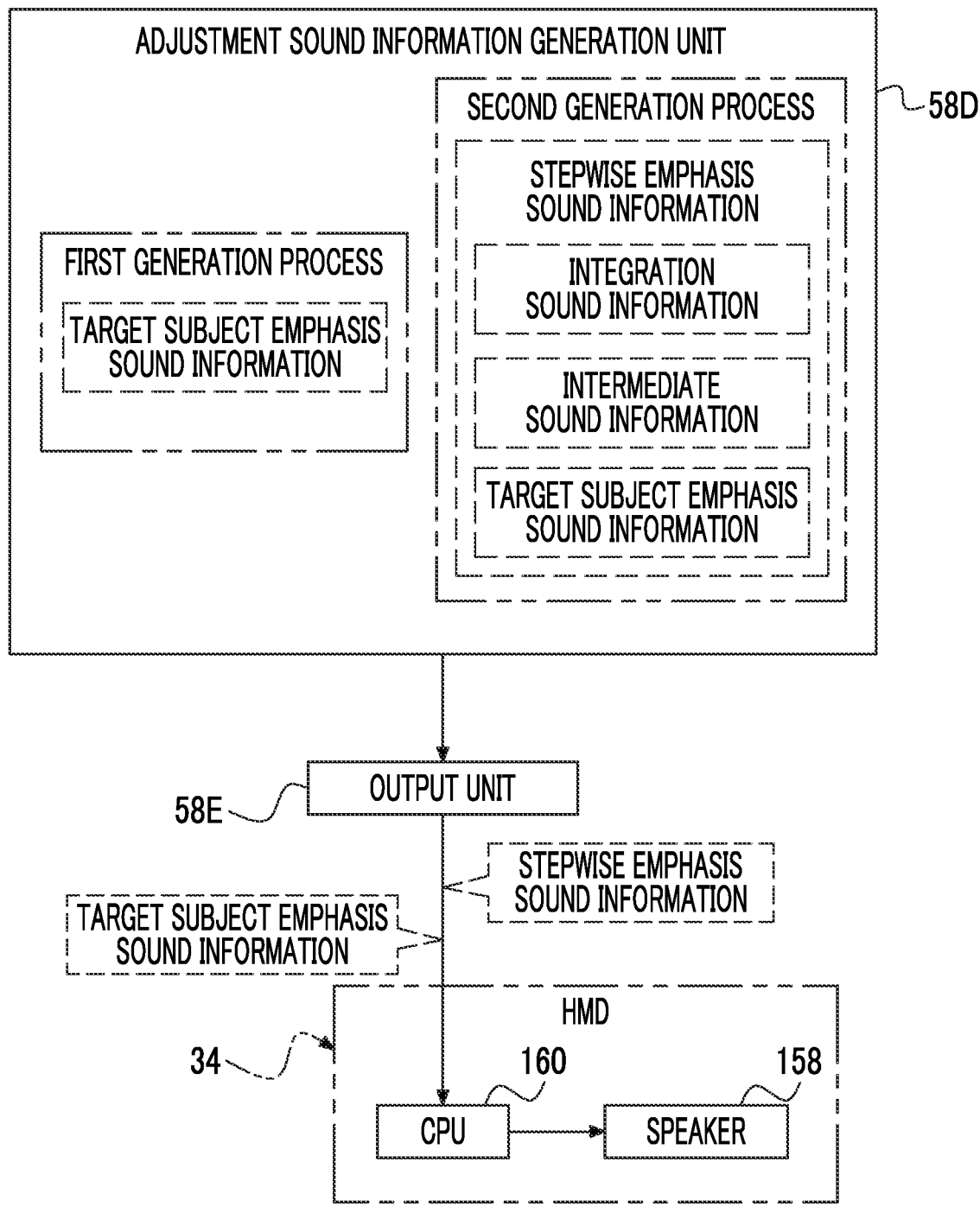
FIG. 25 is a block diagram showing a modification example of the second generation process executed by the adjustment sound information generation unit of the information processing apparatus according to the embodiment.

In a case in which the first generation process and the second generation process are selectively executed depending on the observation direction change frequency, for example, as shown in FIG. 24, the sound generation process executed by the CPU 160 is different from the sound generation process shown in FIG. 21 in that step ST100 is provided instead of step ST54 and step ST102 is provided instead of step ST56.

In step ST100, the adjustment sound information generation unit 58D acquires the observation direction change frequency information from the HMD 34, and then the sound generation process proceeds to step ST102.

In step ST102, the adjustment sound information generation unit 58D determines whether or not the observation direction change frequency indicated by the observation direction change frequency information acquired in step ST100 is less than the predetermined frequency. In step ST102, in a case in which the observation direction change frequency indicated by the observation direction change frequency information acquired in step ST100 is equal to or more than the predetermined frequency, a negative determination is made, and the sound generation process proceeds to step ST58 shown in FIG. 22. In step ST102, in a case in which the observation direction change frequency indicated by the observation direction change frequency information acquired in step ST100 is less than the predetermined frequency, a positive determination is made, and the sound generation process proceeds to step ST64.

With the present configuration, it is possible to reduce the discomfort given to the viewer 28 due to the frequent switching of the target subject emphasis sound as compared to a case in which the target subject emphasis sound is also switched as the target subject is frequently switched.

Note that in the example shown in FIG. 24, in a case in which the observation direction change frequency is equal to or more than the predetermined frequency, the sound generation process proceeds to step ST58 shown in FIG. 22, but the technology of the present disclosure is not limited to this. For example, in a case in which the observation direction change frequency is equal to or more than the predetermined frequency and the angle of view indicated by the angle-of-view information is equal to or more than the reference angle of view, the sound generation process may proceed to step ST58 shown in FIG. 22.

In addition, in the example shown in FIG. 24, in a case in which the observation direction change frequency is less than the predetermined frequency, the sound generation process proceeds to step ST64, but the technology of the present disclosure is not limited to this. For example, in a case in which the observation direction change frequency is less than the predetermined frequency and the angle of view indicated by the angle-of-view information is less than the reference angle of view, the sound generation process may proceed to step ST58 shown in FIG. 22.

Note that, here, although the aspect example has been described in which the target subject emphasis sound information is not generated in a case in which the observation direction change frequency is equal to or more than the predetermined frequency, the technology of the present disclosure is not limited to this. For example, in a case in which the observation direction change frequency is equal to or more than the predetermined frequency, the target subject emphasis sound information may be generated, and the generated target subject emphasis sound information may not be output by the output unit 58E. In this case as well, since the target subject emphasis sound is not output from the speaker 158, it is possible to reduce the discomfort given to the viewer 28 due to the frequent switching of the target subject emphasis sound as compared to a case in which the target subject emphasis sound is also switched as the target subject is frequently switched.

In addition, in the embodiment described above, the aspect example has been described in which in a case in which the angle of view indicated by the angle-of-view information is equal to or more than the reference angle of view, the target subject emphasis sound information is not generated, but the technology of the present disclosure is not limited to this. For example, in a case in which the angle of view indicated by the angle-of-view information is equal to or more than the reference angle of view, the target subject emphasis sound information may be generated, and the generated target subject emphasis sound information may not be output by the output unit 58E.

In addition, in the embodiment described above, the aspect example has been described in which the integration sound information is generated by executing the second generation process by the adjustment sound information generation unit 58D, but the technology of the present disclosure is not limited to this. For example, the adjustment sound information generation unit 58D may execute the second generation process to generate stepwise emphasis sound information. The stepwise emphasis sound information is information including the integration sound information, intermediate sound information, and the target subject emphasis sound information. The intermediate sound information is information indicating an intermediate sound in which the target subject sound is emphasized more than the integration sound and suppressed more than the target subject emphasis sound. In this case, in a case in which the observation direction change frequency is equal to or more than the predetermined frequency, the output unit 58E outputs the integration sound information, the intermediate sound information, and the target subject emphasis sound information, which are generated by the adjustment sound information generation unit 58D, to the HMD 34 in order of the integration sound information, the intermediate sound information, and the target subject emphasis sound information.

Figure 26:
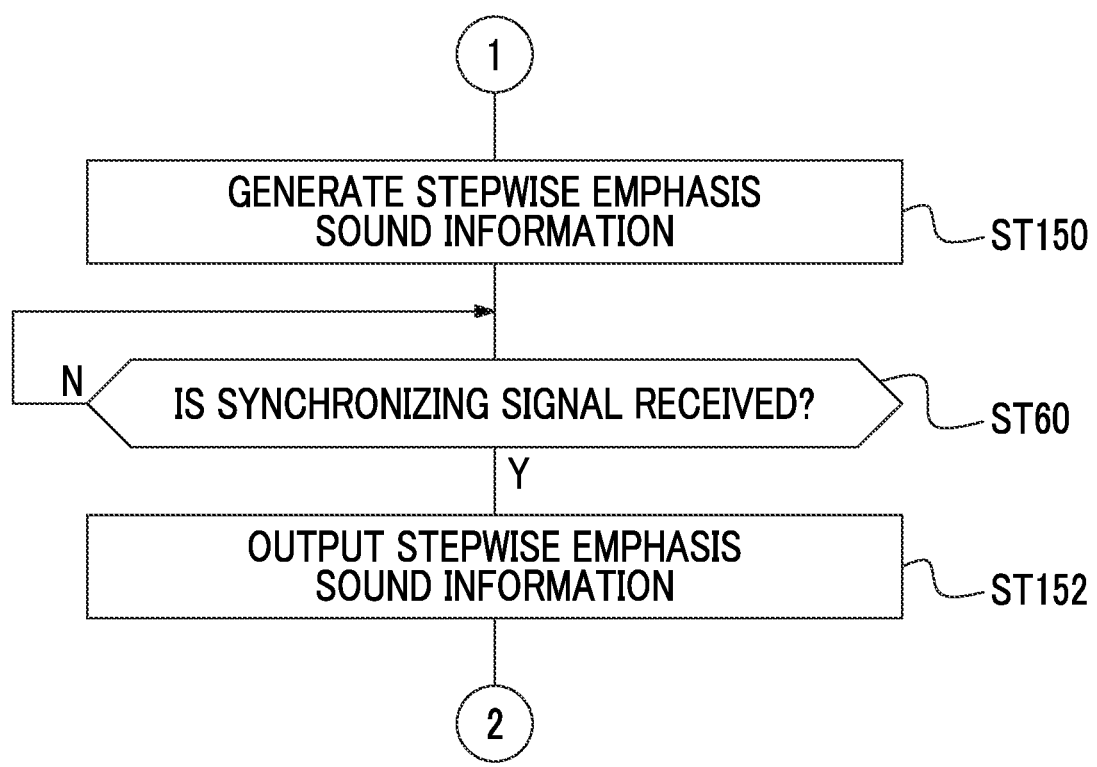
FIG. 26 is a flowchart showing a second modification example of the flow of the sound generation process according to the embodiment.

In this case, the sound generation process executed by the CPU 58 (see FIG. 26) is different from the sound generation process shown in FIG. 22 in that step ST150 is provided instead of step ST58 and step ST152 is provided instead of step ST62. The stepwise emphasis sound information is generated by the adjustment sound information generation unit 58D in step ST150 shown in FIG. 26, and the stepwise emphasis sound information generated in step ST150 is output to the HMD 34 by the output unit 58E in step ST152.

With the present configuration, the integration sound information, the intermediate sound information, and the target subject emphasis sound information are output to the HMD 34 from the speaker 158 in order of the integration sound, the intermediate sound, and the target subject emphasis sound, and are heard by the viewer 28. With the present configuration, it is possible to reduce the discomfort given to the viewer 28 due to the frequent switching of the target subject emphasis sound as compared to a case in which the target subject emphasis sound is also switched as the target subject is frequently switched.

Note that the intermediate sound information may be information including a plurality of pieces of sound information subdivided such that the volume is gradually increased in a non-step manner or a multi-step manner.

In addition, in the embodiment described above, the information indicating the emphasis sound including the emphasis target sound is adopted as the target subject emphasis sound information, but the target subject emphasis sound information may be information indicating the sound including the emphasis target sound and not including the peripheral sound. As a result, it is possible to contribute to easy listening of the target sound as compared to a case in which the target subject emphasis sound information is the information indicating the sound including the peripheral sound in addition to the emphasis target sound.

Figure 27:
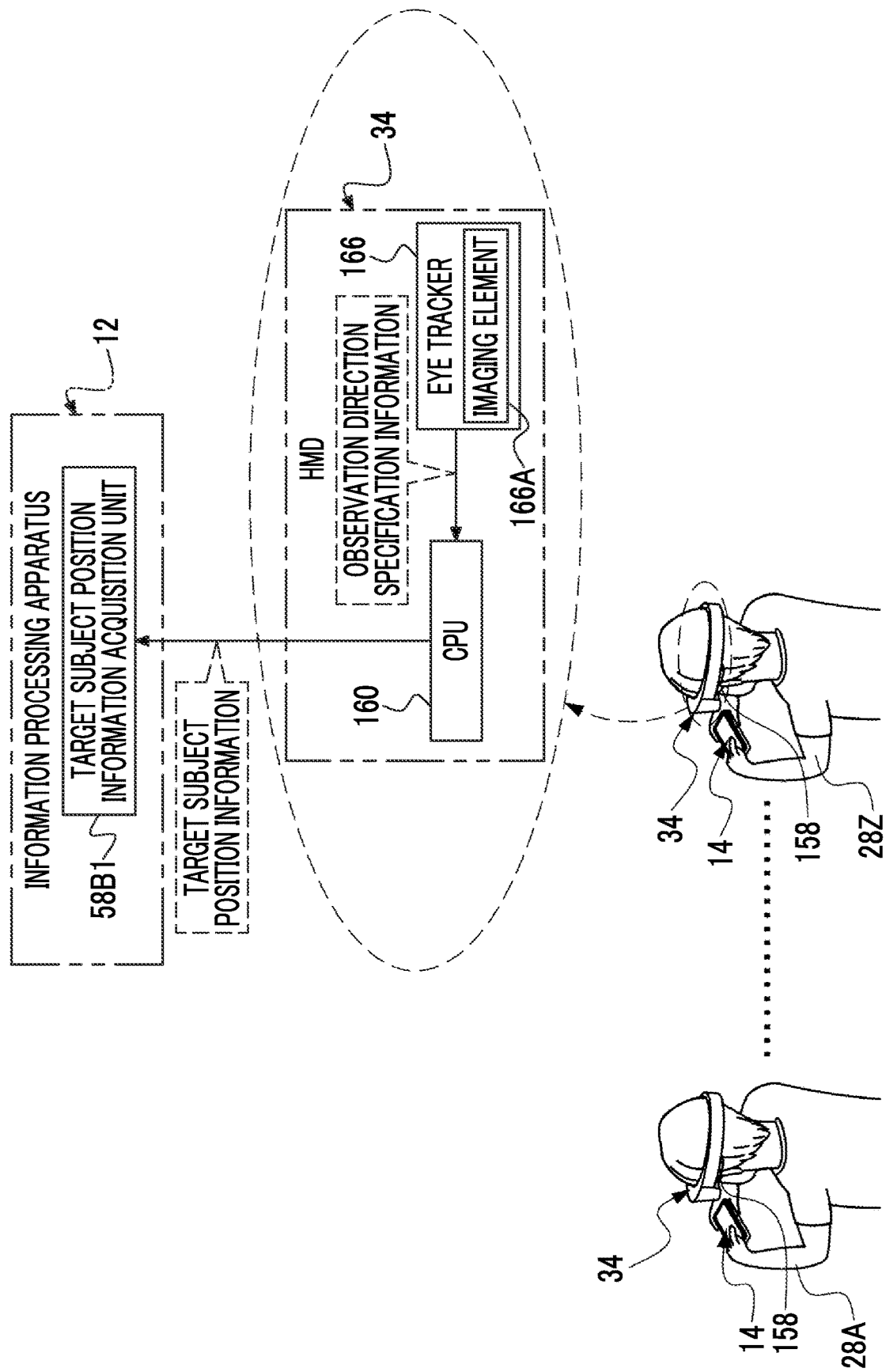
FIG. 27 is a conceptual diagram provided for describing an example of process contents in the HMD and the information processing apparatus in a case in which a plurality of the viewers mount the HMD.

In addition, in the embodiment described above, the HMD 34 has been described as an example, but the technology of the present disclosure is not limited to this. For example, as shown in FIG. 27, the target subject position information may be acquired by the target subject position information acquisition unit 58B1 based on the detection result by the eye tracker 166 provided in the specific HMD 34 among a plurality of the HMDs 34 and the third position association information. In the example shown in FIG. 27, the HMD 34 is mounted on each of viewers 28A to 28Z (hereinafter, in a case in which a distinction is not necessary, the viewers 28A to 28Z are simply referred to as "viewer" without reference numerals). The target subject position information acquisition unit 58B1 acquires the target subject position information based on the detection result by the eye tracker 166 provided in the HMD 34 mounted on any of the viewers 28A to 28Z and the third position association information. With the present configuration, it is possible to generate the target subject emphasis sound information corresponding to the target subject at which the viewer who mounts the specific HMD 34 among the plurality of HMDs 34 directs attention.

Figure 28:
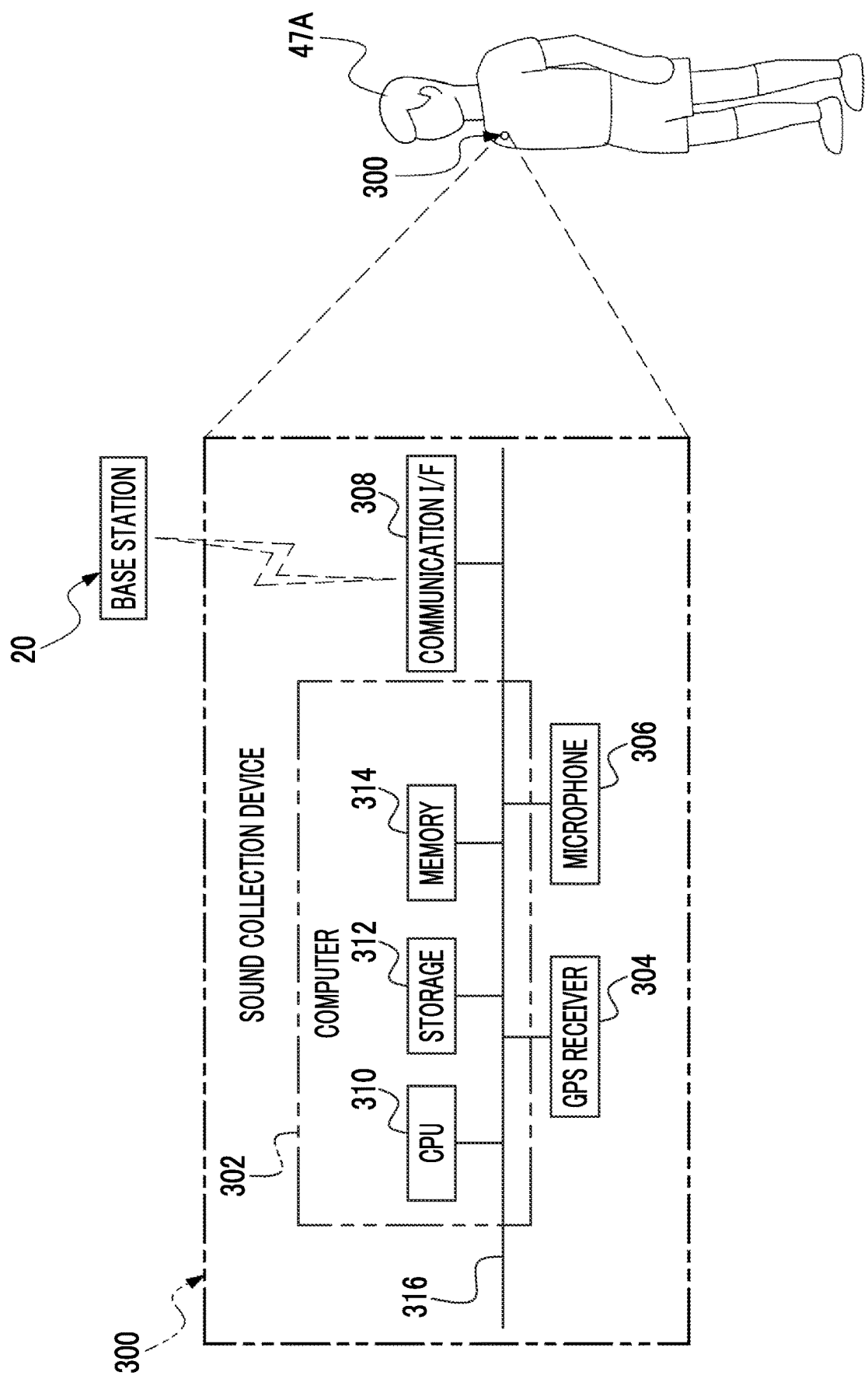
FIG. 28 is a block diagram showing an example of a configuration of the sound collection device attached to a target subject.

In addition, in the embodiment described above, the aspect example has been described in which the plurality of sound collection devices 100 are fixed in the imaging region, but the technology of the present disclosure is not limited to this. For example, as shown in FIG. 28, a sound collection device 300 may be attached to a target subject 47A. The sound collection device 300 comprises a computer 302, a GPS receiver 304, a microphone 306, a communication I/F 308, and a bus line 316. The computer 302 comprises a CPU 310, a storage 312, and a memory 314. Note that in the example shown in FIG. 28, for convenience of illustration, one bus line is shown as the bus line 316, but a data bus, an address bus, a control bus, and the like are included in the bus line 316 similar to the bus lines 64, 94, and 170 described in the embodiment above.

The computer 302 corresponds to the computer 200 shown in FIG. 8. The microphone 306 corresponds to the microphone 207 shown in FIG. 8. The communication I/F 308 corresponds to the communication I/F 218 shown in FIG. 8. The CPU 310 corresponds to the CPU 210 shown in FIG. 8. The storage 312 corresponds to the storage 212 shown in FIG. 8. The memory 314 corresponds to the memory 214 shown in FIG. 8.

The GPS receiver 304 receives radio waves from a plurality of GPS satellites (not shown) depending on the instruction from the CPU 310, and outputs reception result information indicating a reception result to the CPU 310. The CPU 310 calculates GPS information indicating latitude, longitude, and altitude based on reception result information input from the GPS receiver 304. The CPU 310 performs the wireless communication with the information processing apparatus 12 via the base station 20 to transmit the sound information obtained from the microphone 306 to the information processing apparatus 12 and to transmit the GPS information to the information processing apparatus 12 as the sound collection position specification information. As a result, the position of the target subject 47A in the imaging region, that is, the target subject position is specified by the information processing apparatus 12. Here, the aspect example has been described in which the GPS information is used as the sound collection position specification information, but the technology of the present disclosure is not limited to this, and any information may be used as long as the position of the sound collection device 300 in the imaging region can be specified by the information. In addition, a plurality of the sound collection devices 300 may be attached to the target subject 47A.

With the present configuration, it is possible to easily obtain the target sound as compared to a case in which the sound collection device 300 is not attached to the target subject 47A.

Note that, here, although the aspect example has been described in which the sound collection device 300 is attached to only one target subject 47A, but the technology of the present disclosure is not limited to this. For example, the sound collection device 300 may be attached to each of a plurality of persons (for example, a player and/or a referee in the soccer field 24) who can be the target subject present in the imaging region. With the present configuration, it is possible to easily obtain the target sound even in a case in which the target subject is switched between the plurality of persons, as compared to a case in which the sound collection device 300 is not attached to each of the plurality of persons in the imaging region.

In addition, in the embodiment described above, the aspect example has been described in which the plurality of sound collection devices 300 are fixed in the imaging region, but the plurality of sound collection devices 300 and the sound collection device 300 attached to each of the plurality of persons may be used in combination.

In addition, in the embodiment described above, the aspect example has been described in which the volume of the sound information obtained by the sound collection device 100 is not changed and used by the information processing apparatus 12, but the technology of the present disclosure is not limited to this. For example, the volume may be made different among a plurality of sounds indicated by the plurality of pieces of sound information obtained by the plurality of sound collection devices 100.

Figure 29:
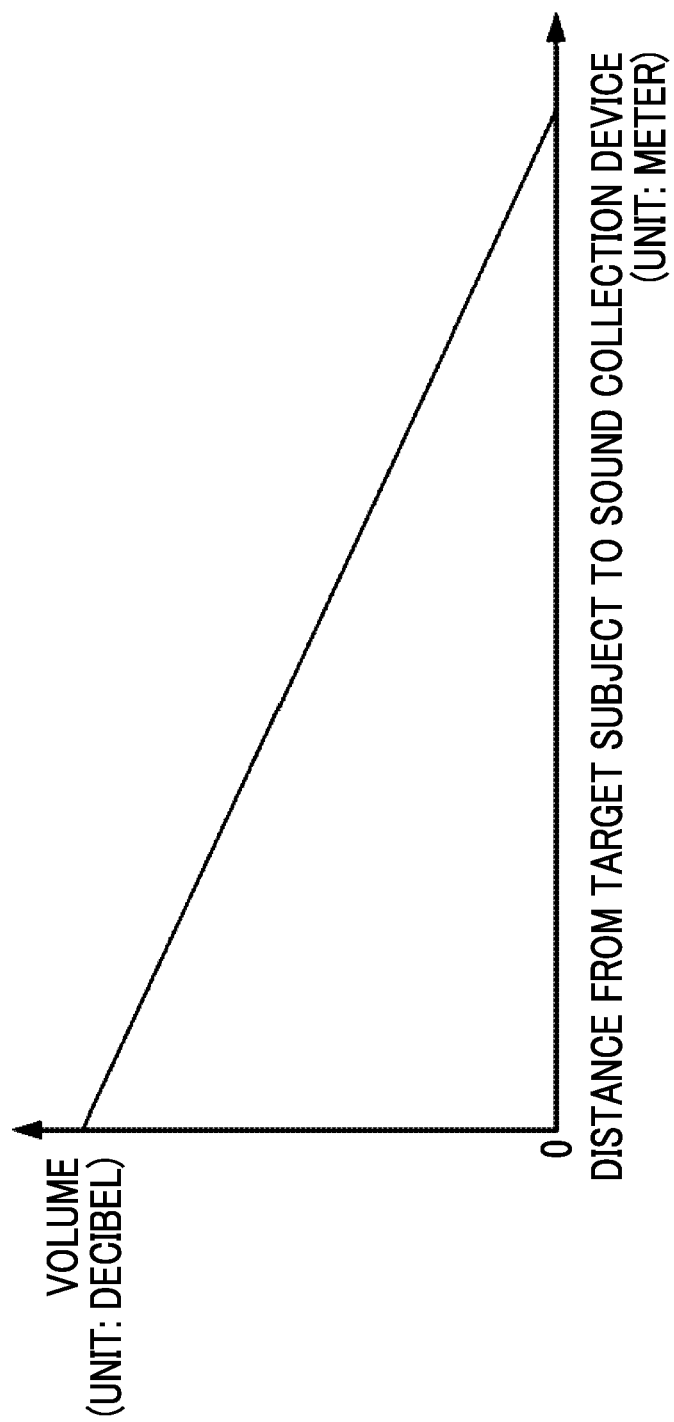
FIG. 29 is a graph showing an example of a correlation between a distance from a target subject position to the sound collection device and a volume of a sound indicated by the sound information.

In this case, the specifying unit 58C specifies a positional relationship between the target subject position and the plurality of sound collection devices 100 by using the sound collection position specification information acquired by the sound collection device side information acquisition unit 58B2 and the target subject position information acquired by the target subject position information acquisition unit 58B1. Moreover, the adjustment sound information generation unit 58D controls the sound information such that the sound indicated by the sound information is the sound adjusted to be smaller as the sound is positioned farther from the target subject position depending on the positional relationship specified by the specifying unit 58C, for example, as shown in FIG. 29. The sound information controlled in this way is used, for example, for generating the target subject emphasis sound information and the integration sound information by the adjustment sound information generation unit 58D. With the present configuration, even in a state in which the target sound and the peripheral sound are mixed, it is possible to contribute to the distinguishable hearing of the target sound and the peripheral sound.

Note that in the example shown in FIG. 29, the aspect has been described in which volume of the sound indicated by the sound information is attenuated linearly with respect to the distance from the target subject position to the sound collection device 100, but the technology of the present disclosure is not limited to this, and the volume of the sound indicated by the sound information may be attenuated non-linearly with respect to the distance from the target subject position to the sound collection device 100. In addition, the volume of the sound indicated by the sound information may be attenuated in a stepwise manner. In a case in which the volume is attenuated in a stepwise manner, a time interval of the same volume may be gradually shortened or lengthened.

Figure 30:
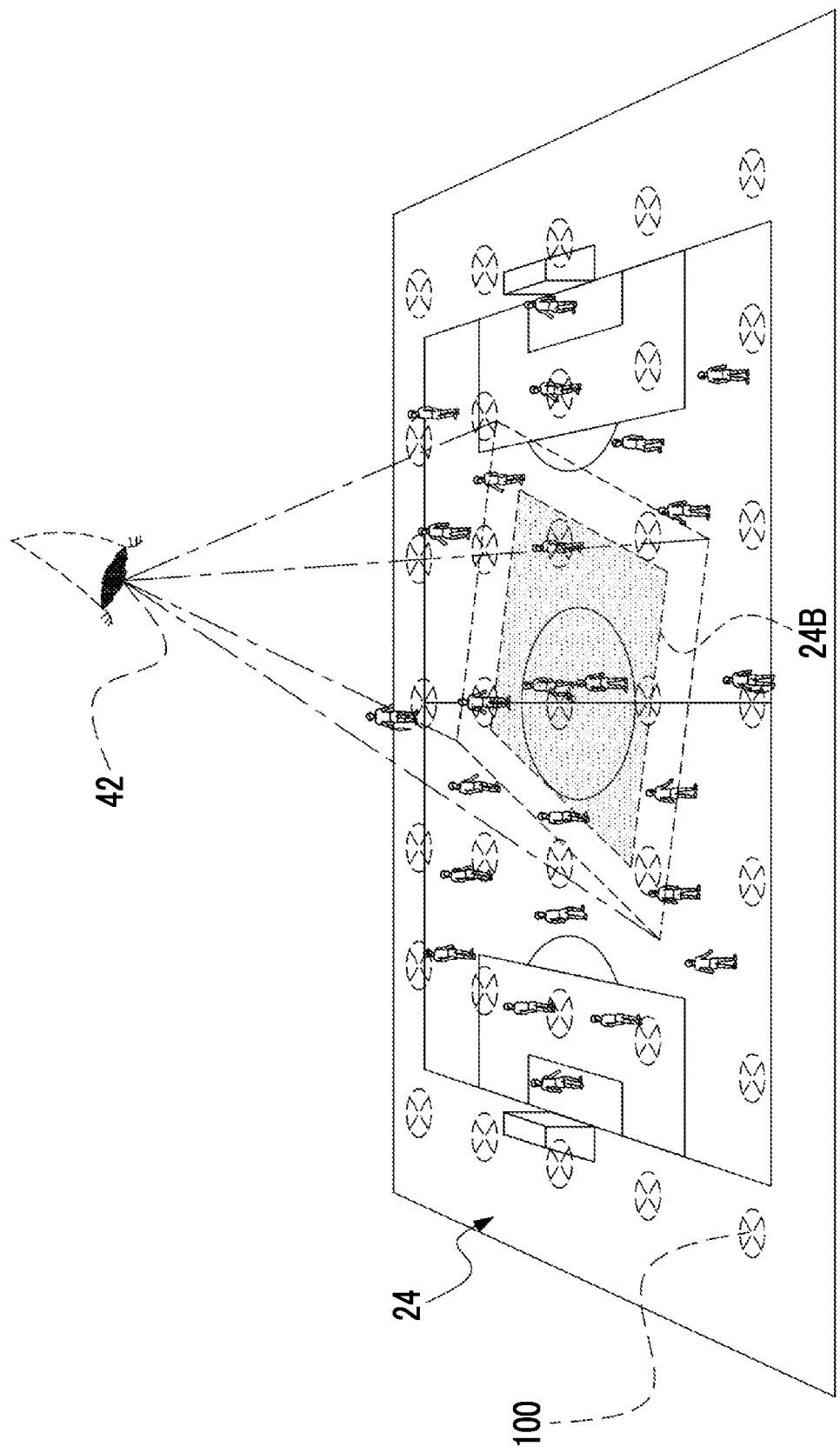
FIG. 30 is a conceptual diagram showing an example of an aspect in which a field of view from the viewpoint position surrounds a reference region.

In addition, in the embodiment described above, the aspect example has been described in which the first generation process is executed in a case in which the angle of view indicated by the angle-of-view information is less than the reference angle of view, and the second generation process is executed in a case in which the angle of view indicated by the angle-of-view information is equal to or more than the reference angle of view, the technology of the present disclosure is not limited to this. For example, as shown in FIG. 30, the second generation process may be executed in a case in which the visual field in a case in which the imaging region is observed from the viewpoint position 42 is the visual field that surrounds a preset reference region 24B in the soccer field 24.

Figure 31:
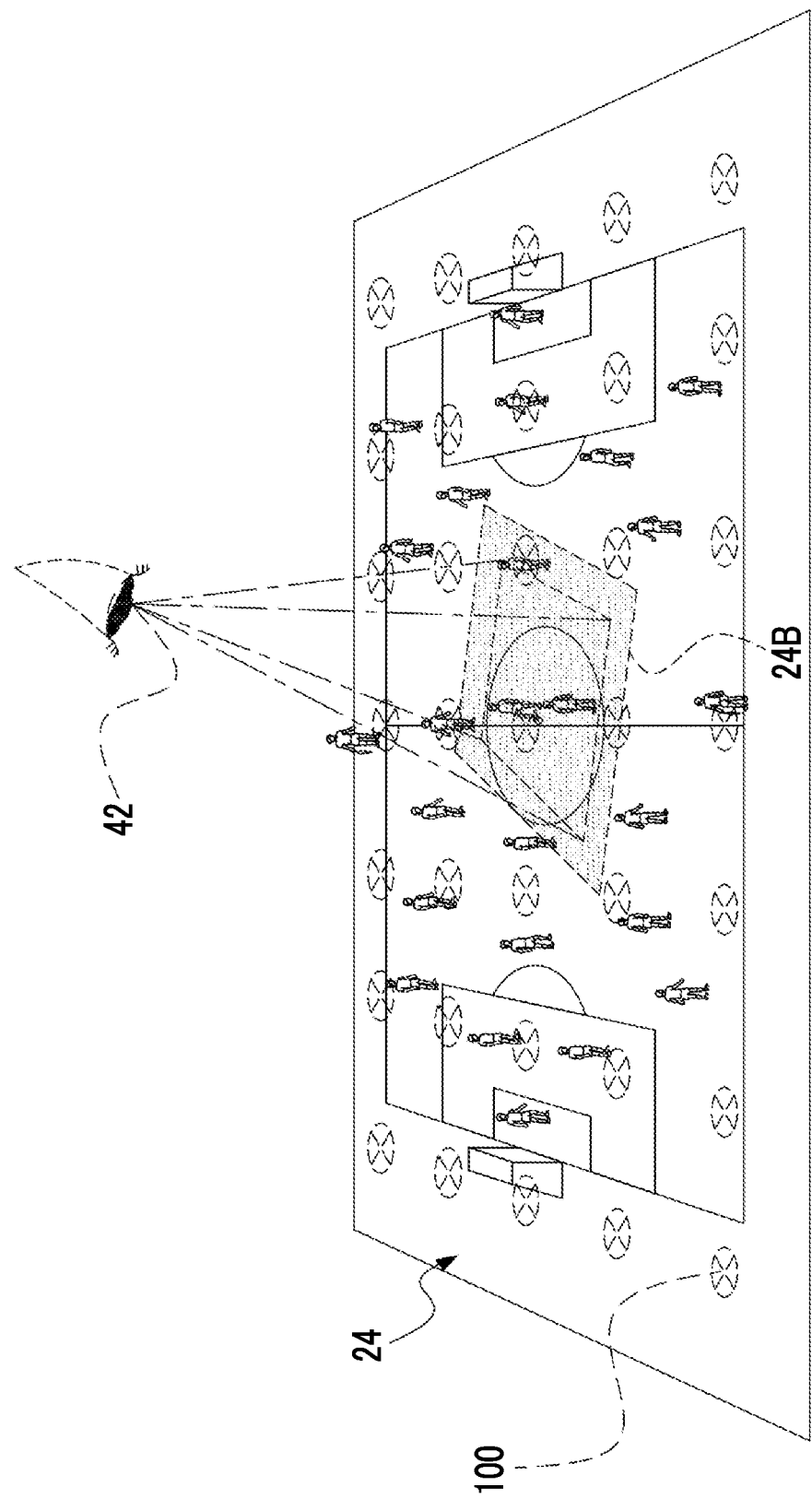
FIG. 31 is a conceptual diagram showing an example of an aspect in which the field of view from the viewpoint position is within the reference region.

On the other hand, for example, as shown in FIG. 31, the first generation process may be executed in a case in which the visual field in a case in which the imaging region is observed from the viewpoint position 42 is within the reference region 24B.

Note that the determination as to whether or not the visual field in a case in which the imaging region is observed from the viewpoint position 42 is the visual field that surrounds the reference region 24B need only be made by determining whether or not the image showing the whole reference region 24B is included in the virtual viewpoint video 46 generated by the video generation unit 58A by the CPU 58.

Figure 32:
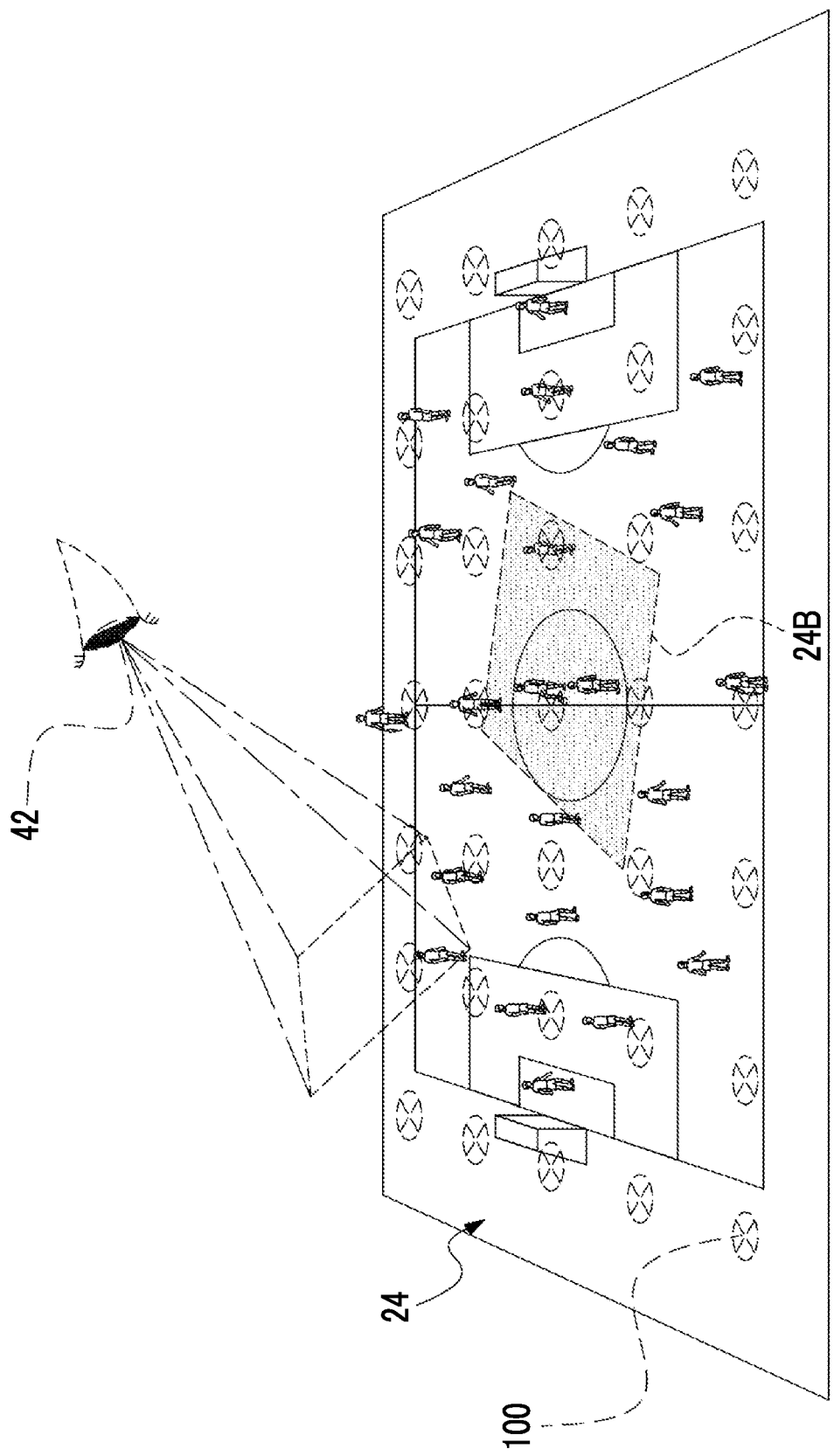
FIG. 32 is a conceptual diagram showing an example of an aspect in which the field of view from the viewpoint position is out of the reference region.

In addition, for example, as shown in FIG. 32, in a case in which the reference region 24B is not within in the visual field from the viewpoint position 42, the second generation process may be executed without executing the first generation process. Note that in the examples shown in FIGS. 30 to 32, a rectangular region is adopted as the reference region 24B, but the shape of the reference region 24B is not limited to this, and may be another shaped region, such as a circular region or a polygon region other than a rectangle.

In addition, in the embodiment described above, the aspect example has been described in which the CPU 58 of the information processing apparatus 12 executes the video generation process and the sound generation process (hereinafter, in a case in which a distinction is not necessary, referred to as "information processing apparatus side process"), but the technology of the present disclosure is not limited to this, and the information processing apparatus side process may be executed by the terminal device or distributed or may be executed by a plurality of devices, such as the smartphone 14 and the HMD 34.

Figure 33:
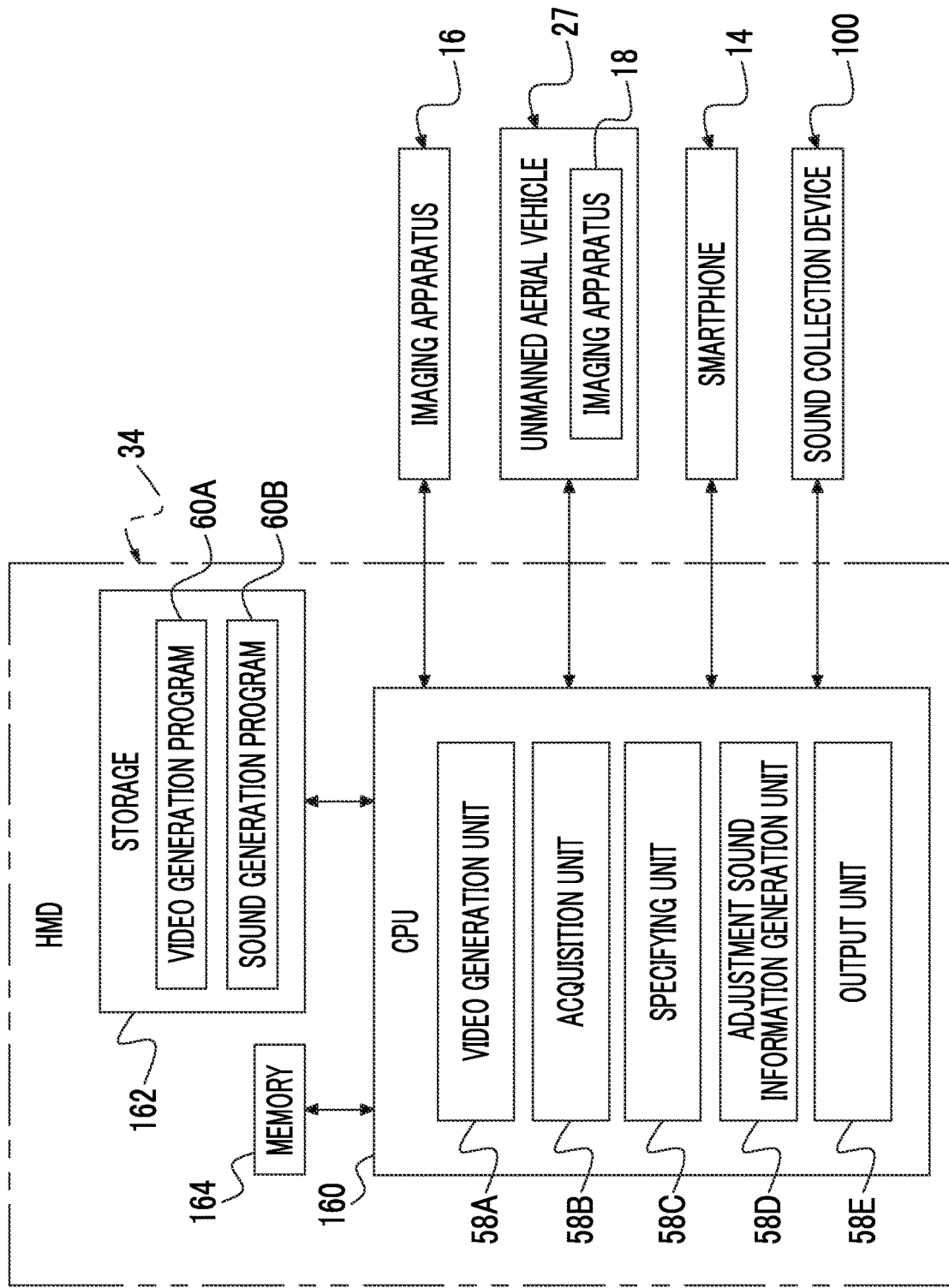
FIG. 33 is a block diagram showing a modification example of the configuration of the HMD according to the embodiment.

In addition, the HMD 34 may be caused to execute the information processing apparatus side process. In this case, for example, as shown in FIG. 33, the information processing apparatus program is stored in the storage 162 of the HMD 34. The CPU 160 executes the video generation process by being operated as the video generation unit 58A and the acquisition unit 58B according to the video generation program 60A. In addition, the CPU 160 executes the sound generation process by being operated as the acquisition unit 58B, the specifying unit 58C, the adjustment sound information generation unit 58D, and the output unit 58E according to the sound generation program 60B.

In addition, in the embodiment described above, the HMD 34 has been described as an example, but the technology of the present disclosure is not limited to this, and the HMD 34 can be substituted with various devices equipped with an arithmetic device, such as a smartphone, a tablet terminal, a head-up display, or a personal computer.

In addition, in the embodiment described above, the soccer stadium 22 has been described as an example, but it is merely an example, and any place, such as a baseball stadium, a rugby stadium, a curling stadium, an athletics stadium, a swimming pool, a concert hall, an outdoor music hall, and a theater venue, may be adopted as long as the plurality of imaging apparatuses and the plurality of sound collection devices 100 can be installed.

In addition, in the embodiment described above, the wireless communication method using the base station 20 has been described as an example, but it is merely an example, and the technology of the present disclosure is established even in the wired communication method using the cable.

In addition, in the embodiment described above, the unmanned aerial vehicle 27 has been described as an example, but the technology of the present disclosure is not limited to this, and the imaging region may be imaged by the imaging apparatus 18 suspended by a wire (for example, a self-propelled imaging apparatus that can move along the wire).

In addition, in the above description, the computers 50, 70, 100, 150, 200, and 302 have been described as examples, but the technology of the present disclosure is not limited to theses. For example, instead of the computers 50, 70, 100, 150, 200, and/or 302, a device including an ASIC, an FPGA, and/or a PLD may be applied. In addition, instead of the computers 50, 70, 100, 150, 200, and/or 302, a combination of a hardware configuration and a software configuration may be used.

Figure 34:
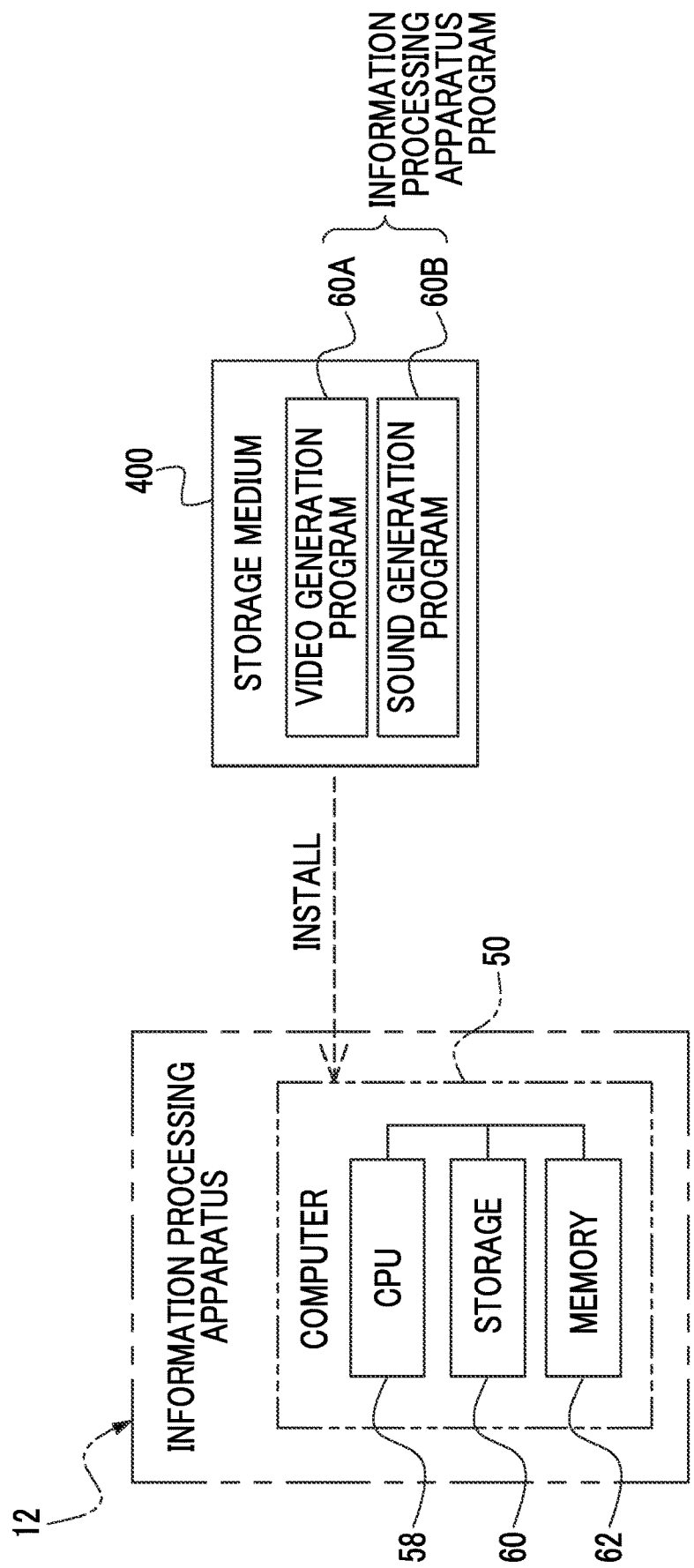
FIG. 34 is a block diagram showing an example of an aspect in which an information processing apparatus program according to the embodiment in a storage medium in which the information processing apparatus program is stored is installed in a computer of the information processing apparatus.

In addition, in the embodiment described above, the information processing apparatus program is stored in the storage 60, but the technology of the present disclosure is not limited to this, and as shown in FIG. 34, for example, the information processing apparatus program may be stored in any portable storage medium 400, such as an SSD or a USB memory, which is a non-transitory storage medium. In this case, the information processing apparatus program stored in the storage medium 400 is installed in the computer 50, and the CPU 58 executes the information processing apparatus side process according to the information processing apparatus program.

In addition, the information processing apparatus program may be stored in a storage unit of another computer or a server device connected to the computer 50 via a communication network (not shown), and the information processing apparatus program may be downloaded to the information processing apparatus 12 in response to the request of the information processing apparatus 12. In this case, the information processing apparatus side process based on the downloaded information processing apparatus program is executed by the CPU 58 of the computer 50.

In addition, in the embodiment described above, the CPU 58 has been described as an example, but the technology of the present disclosure is not limited to this, and a GPU may be adopted. In addition, a plurality of CPUs may be adopted instead of the CPU 58. That is, the information processing apparatus side process may be executed by one processor or a plurality of physically separated processors. In addition, instead of the CPUs 88, 160, 210, and/or 310, a GPU may be adopted, a plurality of CPUs may be adopted, or one processor or a plurality of physically separated processors may be adopted to execute various processes.

The following various processors can be used as a hardware resource for executing the information processing apparatus side process. Examples of the processor include a CPU, which is a general-purpose processor that functions as software, that is, the hardware resource for executing the information processing apparatus side process according to the program, as described above. In addition, another example of the processor includes a dedicated electric circuit which is a processor having a circuit configuration specially designed for executing a specific process, such as an FPGA, a PLD, or an ASIC. A memory is also built in or connected to each processor, and each processor executes the information processing apparatus side process by using the memory.

The hardware resource for executing the information processing apparatus side process may be configured by one of the various processors, or may be a combination of two or more processors of the same type or different types (for example, a combination of a plurality of FPGAs or a combination of a CPU and an FPGA). In addition, the hardware resource for executing the information processing apparatus side process may be one processor.

As an example of configuring the hardware resource with one processor, first, as represented by a computer such as a client computer or a server, there is a form in which one processor is configured by a combination of one or more CPUs and software, and the processor functions as the hardware resource for executing the information processing apparatus side process. Secondly, as represented by SoC, there is an aspect in which a processor that realizes the functions of the whole system including a plurality of the hardware resources for executing the information processing apparatus side process with one IC chip is used. In this way, the information processing apparatus side process is realized by using one or more of the various processors described above as the hardware resource.

Further, as the hardware structure of these various processors, more specifically, an electric circuit in which circuit elements such as semiconductor elements are combined can be used.

In addition, the information processing apparatus side process described above is merely an example. Therefore, it is needless to say that unnecessary steps may be deleted, new steps may be added, or the process order may be changed within a range that does not deviate from the gist.

The contents described and shown above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the contents described and shown above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated in the present specification by referring to the same extent as a case in which individual document, patent application, and technical standard are specifically and individually noted to be incorporated by reference.

Regarding the embodiment described above, the following supplementary note will be further disclosed.

(Supplementary Note 1)

An information processing apparatus including a processor, and a memory built in or connected to the processor, in which the processor acquires a plurality of pieces of sound information indicating sounds obtained by a plurality of sound collection devices scattered in an imaging region, a sound collection device position information indicating a position of each of the plurality of sound collection devices in the imaging region, and a target subject position information indicating a position of a target subject in the imaging region, specifies a target sound of a region corresponding to the position of the target subject from the plurality of pieces of sound information based on the acquired sound collection device position information and the acquired target subject position information, and generates target subject emphasis sound information indicating a sound including a target subject emphasis sound in which the specified target sound is emphasized more than a sound emitted from a region different from the region corresponding to the position of the target subject indicated by the acquired target subject position information based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information in a case in which a virtual viewpoint video is generated by using a plurality of images obtained by imaging the imaging region by a plurality of imaging apparatuses in a plurality of directions.

What is claimed is:

1. An information processing apparatus comprising:
a processor; and
a memory built in or connected to the processor,
wherein the processor
acquires a plurality of pieces of sound information indicating sounds obtained by a plurality of sound collection devices, a sound collection device position information indicating a position of each of the plurality of sound collection devices, and a target subject position information indicating a position of a target subject in an imaging region,
specifies a target sound of a region corresponding to the position of the target subject from the plurality of pieces of sound information based on the acquired sound collection device position information and the acquired target subject position information, and
generates target subject emphasis sound information indicating a sound including a target subject emphasis sound in which the specified target sound is emphasized more than a sound emitted from a region different from the region corresponding to the position of the target subject indicated by the acquired target subject position information in a case in which a virtual viewpoint video is generated, based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information, by using a plurality of images obtained by imaging the imaging region by a plurality of imaging apparatuses in a plurality of directions.

2. The information processing apparatus according to claim 1,
wherein the processor selectively executes a first generation process of generating the target subject emphasis sound information, and a second generation process of generating, based on the acquired sound information, integration sound information indicating an integration sound obtained by integrating a plurality of the sounds obtained by the plurality of sound collection devices.

3. The information processing apparatus according to claim 2,
wherein the processor executes the first generation process in a case in which the angle of view indicated by the angle-of-view information is less than a reference angle of view, and executes the second generation process in a case in which the angle of view indicated by the angle-of-view information is equal to or more than the reference angle of view.

4. The information processing apparatus according to claim 1,
wherein indication information for indicating a position of a target subject image showing the target subject in an imaging region image showing the imaging region is received by a reception device in a state in which the imaging region image is displayed by a display device, and
the processor acquires the target subject position information based on correspondence information indicating a correspondence between a position in the imaging region and a position in the imaging region image showing the imaging region, and the indication information received by the reception device.

5. The information processing apparatus according to claim 1,
wherein an observation direction of a person who observes an imaging region image showing the imaging region is detected by a detector in a state in which the imaging region image is displayed by a display device, and
the processor acquires the target subject position information based on correspondence information indicating a correspondence between a position in the imaging region and a position in the imaging region image showing the imaging region, and a detection result by the detector.

6. The information processing apparatus according to claim 5,
wherein the detector includes an imaging element, and detects a visual line direction of the person as the observation direction based on an eye image obtained by imaging eyes of the person by the imaging element.

7. The information processing apparatus according to claim 5,
wherein the display device is a head mounted display mounted on the person, and
the detector is provided on the head mounted display.

8. The information processing apparatus according to claim 7,
wherein a plurality of the head mounted displays are present, and
the processor acquires the target subject position information based on the detection result by the detector provided on a specific head mounted display among the plurality of head mounted displays, and the correspondence information.

9. The information processing apparatus according to claim 5,
wherein the processor does not generate the target subject emphasis sound information in a case in which a frequency at which the observation direction changes per unit time is equal to or more than a predetermined frequency.

10. The information processing apparatus according to claim 5,
wherein the processor
is able to output the generated target subject emphasis sound information, and
does not output the generated target subject emphasis sound information in a case in which a frequency at which the observation direction changes per unit time is equal to or more than a predetermined frequency.

11. The information processing apparatus according to claim 5,
wherein the processor
generates comprehensive sound information indicating a comprehensive sound obtained by integrating a plurality of the sounds obtained by the plurality of sound collection devices, and intermediate sound information indicating an intermediate sound in which the target sound is emphasized more than the comprehensive sound and suppressed more than the target subject emphasis sound, and
outputs the generated comprehensive sound information, the generated intermediate sound information, and the generated target subject emphasis sound information in order of the comprehensive sound information, the intermediate sound information, and the target subject emphasis sound information in a case in which a frequency at which the observation direction changes per unit time is equal to or more than a predetermined frequency.

12. The information processing apparatus according to claim 1,
wherein the target subject emphasis sound information is information indicating a sound including the target subject emphasis sound and not including the sound emitted from the different region.

13. The information processing apparatus according to claim 1,
wherein the processor specifies a positional relationship between the position of the target subject and the plurality of sound collection devices by using the acquired sound collection device position information and the acquired target subject position information, and
the sound indicated by each of the plurality of pieces of sound information is a sound adjusted to be smaller as the sound is positioned farther from the position of the target subject depending on the positional relationship specified by the processor.

14. The information processing apparatus according to claim 1,
wherein a virtual viewpoint target subject image showing the target subject included in the virtual viewpoint video is an image that is in focus more than images in a periphery of the virtual viewpoint target subject image in the virtual viewpoint video.

15. The information processing apparatus according to claim 1,
wherein the sound collection device position information is information indicating the position of the sound collection device fixed in the imaging region.

16. The information processing apparatus according to claim 1,
wherein at least one of the plurality of sound collection devices is attached to the target subject.

17. The information processing apparatus according to claim 1,
wherein the plurality of sound collection devices are attached to a plurality of objects including the target subject in the imaging region.

18. The information processing apparatus according to claim 1,
wherein the processor is configured to:
generate the target subject emphasis sound information or output the generated target subject emphasis sound information, in cases in which an observation direction of a person observing an imaging region image is determined in a state where the imaging region image showing the imaging region is displayed on a display device, and
not generate the target subject emphasis sound information or not output the generated target subject emphasis sound information, in cases in which the observation direction is not determined in a state where the imaging region image is displayed on the display device.

19. An information processing method comprising:
acquiring a plurality of pieces of sound information indicating sounds obtained by a plurality of sound collection devices, a sound collection device position information indicating a position of each of the plurality of sound collection devices, and a target subject position information indicating a position of a target subject in an imaging region;
specifying a target sound of a region corresponding to the position of the target subject from the plurality of pieces of sound information based on the acquired sound collection device position information and the acquired target subject position information; and
generating target subject emphasis sound information indicating a sound including a target subject emphasis sound in which the specified target sound is emphasized more than a sound emitted from a region different from the region corresponding to the position of the target subject indicated by the acquired target subject position information in a case in which a virtual viewpoint video is generated, based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information, by using a plurality of images obtained by imaging the imaging region by a plurality of imaging apparatuses in a plurality of directions.

20. A non-transitory computer-readable storage medium storing a program for causing a computer to execute a process comprising:
    acquiring a plurality of pieces of sound information indicating sounds obtained by a plurality of sound collection devices, a sound collection device position information indicating a position of each of the plurality of sound collection devices, and a target subject position information indicating a position of a target subject in an imaging region;
    specifying a target sound of a region corresponding to the position of the target subject from the plurality of pieces of sound information based on the acquired sound collection device position information and the acquired target subject position information; and
    generating target subject emphasis sound information indicating a sound including a target subject emphasis sound in which the specified target sound is emphasized more than a sound emitted from a region different from the region corresponding to the position of the target subject indicated by the acquired target subject position information in a case in which a virtual viewpoint video is generated, based on viewpoint position information indicating a position of a virtual viewpoint with respect to the imaging region, visual line direction information indicating a virtual visual line direction with respect to the imaging region, angle-of-view information indicating an angle of view with respect to the imaging region, and the target subject position information, by using a plurality of images obtained by imaging the imaging region by a plurality of imaging apparatuses in a plurality of directions.

* * * * *